(12) United States Patent
Wray et al.

(10) Patent No.: US 8,763,411 B2
(45) Date of Patent: Jul. 1, 2014

(54) METHODS, DEVICES AND SYSTEMS FOR EXTRACTION OF THERMAL ENERGY FROM A HEAT CONDUCTING METAL CONDUIT

(75) Inventors: Daniel X. Wray, Minden, NV (US); Robert J. Wray, Midland, TX (US); Henry Cutbirth, Manahans, TX (US)

(73) Assignee: Biofilm IP, LLC, Minden, NV (US)

( * ) Notice: Subject to any disclaimer, the term of this patent is extended or adjusted under 35 U.S.C. 154(b) by 404 days.

(21) Appl. No.: 13/161,411

(22) Filed: Jun. 15, 2011

(65) Prior Publication Data

US 2011/0308259 A1 Dec. 22, 2011

Related U.S. Application Data

(60) Provisional application No. 61/517,070, filed on Apr. 12, 2011, provisional application No. 61/399,746, filed on Jul. 16, 2010, provisional application No. 61/397,759, filed on Jun. 15, 2010.

(51) Int. Cl.
*F25C 1/18* (2006.01)

(52) U.S. Cl.
USPC .................................. 62/67; 62/293

(58) Field of Classification Search
CPC .......... F25B 21/00; F25B 21/01; F25B 21/02; F25B 21/03; F25B 21/04; F17C 9/02
USPC ........ 62/3.1, 3.2, 3.3, 66, 67, 293, 51.3, 50.2; 165/154, 168, 287; 137/13; 219/538; 138/89, 97
See application file for complete search history.

(56) References Cited

U.S. PATENT DOCUMENTS

| | | | | |
|---|---|---|---|---|
| 2,257,727 A | * | 10/1941 | Bennett et al. | 138/99 |
| 2,701,452 A | * | 2/1955 | Hopkins | 62/347 |
| 3,041,850 A | | 7/1962 | Nunn et al. | 62/293 |

(Continued)

FOREIGN PATENT DOCUMENTS

| | | |
|---|---|---|
| DE | 39 03 009 | 8/1990 |
| GB | 1 584 189 | 2/1981 |

(Continued)

OTHER PUBLICATIONS

Letter/Written Disclosure of the Supplemental Information Disclosure Statement for the above-referenced application, mailed on Jun. 4, 2013, 2 pages.

(Continued)

*Primary Examiner* — Mohammad M Ali
(74) *Attorney, Agent, or Firm* — McKenna Long & Aldridge LLP; Frank J. Miskiel; Stephanie Seidman

(57) ABSTRACT

Provided are methods, devices and systems for controlled removal of thermal energy from a fluid within a thermally conducting metal conduit. The system allows for the in situ formation of a reversible plug that can stop the flow of fluid through the conduit, particularly without inducing thermally induced stress fractures or breaches in the conduit. The devices and systems include a thermal transfer device that can be adapted to be in thermal communication with a thermal conducting metal conduit containing a fluid, particularly a flowing fluid. The devices and systems allows for controlled re-heating of the conduit without inducing thermally induced stress fractures or breaches in the conduit to restore fluid flow through the conduit.

43 Claims, 19 Drawing Sheets

(56) References Cited

U.S. PATENT DOCUMENTS

| | | | | |
|---|---|---|---|---|
| 3,293,877 | A * | 12/1966 | Barnes | 62/223 |
| 3,498,071 | A | 3/1970 | Tremont | 137/15.08 |
| 3,516,935 | A | 6/1970 | Monforte et al. | 252/62.56 |
| 3,530,680 | A | 9/1970 | Marvin | 61/72.3 |
| 3,623,337 | A | 11/1971 | Tremont | 62/233 |
| 3,631,870 | A | 1/1972 | Livingston | 137/13 |
| 3,693,665 | A | 9/1972 | Veerling | 138/149 |
| 3,695,301 | A | 10/1972 | Pittman | 138/97 |
| 3,738,424 | A | 6/1973 | Osmun et al. | 166/298 |
| 3,742,723 | A | 7/1973 | Grise | 137/315.01 |
| 3,760,598 | A | 9/1973 | Jakob et al. | 62/74 |
| 3,768,273 | A | 10/1973 | Missimer | 62/84 |
| 3,793,716 | A | 2/1974 | Smith-Johannsen | 29/611 |
| 3,814,574 | A | 6/1974 | Darley | 431/338 |
| 3,815,377 | A | 6/1974 | Tyree, Jr. | 62/62 |
| 3,857,255 | A | 12/1974 | Elwood et al. | 62/193 |
| 3,865,145 | A | 2/1975 | Mckay et al. | 138/113 |
| 3,872,682 | A | 3/1975 | Shook | 62/114 |
| 3,905,424 | A | 9/1975 | Elwood et al. | 169/46 |
| 3,971,416 | A | 7/1976 | Johnson | 138/33 |
| 4,013,097 | A | 3/1977 | Calandra | 138/93 |
| 4,095,747 | A | 6/1978 | Anderson | 239/288.5 |
| 4,112,706 | A | 9/1978 | Brister | 62/50.1 |
| 4,165,571 | A | 8/1979 | Chang et al. | 37/322 |
| 4,219,224 | A | 8/1980 | Hanley | 285/47 |
| 4,220,012 | A | 9/1980 | Brister | 62/130 |
| 4,238,640 | A | 12/1980 | Tweed et al. | 174/87 |
| 4,267,699 | A | 5/1981 | Bahrenbug | 62/66 |
| 4,283,935 | A | 8/1981 | Eguchi et al. | 374/44 |
| 4,350,027 | A | 9/1982 | Tyree, Jr. | 62/374 |
| 4,370,862 | A * | 2/1983 | Brister | 62/66 |
| RE31,450 | E | 11/1983 | Smith et al. | 73/999.999 |
| 4,416,118 | A * | 11/1983 | Brister | 62/66 |
| 4,421,656 | A | 12/1983 | Donatelli | 507/127 |
| 4,422,338 | A | 12/1983 | Smith | 73/861.356 |
| 4,428,204 | A * | 1/1984 | Brister | 62/62 |
| 4,441,328 | A | 4/1984 | Brister | 62/53 |
| 4,492,095 | A * | 1/1985 | Brister | 62/293 |
| 4,509,343 | A * | 4/1985 | Brister | 62/51.1 |
| 4,533,123 | A | 8/1985 | O'leary | 261/61 |
| 4,535,597 | A | 8/1985 | Missimer et al. | 62/55.5 |
| 4,593,529 | A * | 6/1986 | Birochik | 62/3.3 |
| 4,597,267 | A | 7/1986 | Forrest | 62/55.5 |
| 4,597,699 | A | 7/1986 | Ramunas | 409/232 |
| 4,634,050 | A | 1/1987 | Shippee | 239/14.2 |
| 4,642,994 | A | 2/1987 | Barclay | 62/3 |
| 4,729,664 | A | 3/1988 | Kamiwano | 366/230 |
| 4,789,104 | A | 12/1988 | Anderson | 239/455 |
| 4,829,770 | A | 5/1989 | Hashimoto | 62/3.1 |
| 4,849,611 | A | 7/1989 | Whitney et al. | 219/538 |
| 4,934,196 | A | 6/1990 | Romano | 73/861.356 |
| 4,951,474 | A | 8/1990 | DiNovo et al. | 62/114 |
| 4,956,976 | A | 9/1990 | Kral et al. | 62/610 |
| 5,019,761 | A | 5/1991 | Kraft | 318/568.11 |
| 5,076,930 | A | 12/1991 | Rubin | 210/634 |
| 5,099,650 | A | 3/1992 | Crunkleton | 62/6 |
| 5,105,843 | A | 4/1992 | Condron et al. | 137/13 |
| 5,124,466 | A | 6/1992 | Azechi | 556/425 |
| 5,125,427 | A | 6/1992 | Cantu et al. | 137/13 |
| 5,324,159 | A | 6/1994 | Nowobilski et al. | 414/301 |
| 5,352,304 | A | 10/1994 | DeArdo et al. | 148/336 |
| 5,357,756 | A | 10/1994 | Lubell | 62/3.1 |
| 5,385,025 | A | 1/1995 | Kellett | 62/50.1 |
| 5,403,089 | A | 4/1995 | Kuo et al. | 366/132 |
| 5,522,419 | A | 6/1996 | Sand | 137/216 |
| 5,527,330 | A | 6/1996 | Tovey | 606/167 |
| 5,548,965 | A * | 8/1996 | Chen et al. | 62/66 |
| 5,582,239 | A | 12/1996 | Tsunoda et al. | 165/76 |
| 5,608,159 | A * | 3/1997 | Carcone et al. | 73/49.8 |
| 5,680,770 | A * | 10/1997 | Hall et al. | 62/293 |
| 5,738,772 | A | 4/1998 | Bartasis et al. | 204/406 |
| 5,743,095 | A | 4/1998 | Gschneidner et al. | 62/3.1 |
| 5,743,637 | A | 4/1998 | Ogier | 366/163.2 |
| 5,787,722 | A | 8/1998 | Jenkins | 62/305 |
| 5,836,167 | A | 11/1998 | Clouston et al. | 62/66 |
| RE36,244 | E | 7/1999 | Matthews | 166/250.01 |
| 5,944,686 | A | 8/1999 | Patterson et al. | 604/22 |
| 5,993,167 | A | 11/1999 | Mochizuki | 417/174 |
| 6,041,621 | A | 3/2000 | Olszewski et al. | 62/613 |
| 6,041,811 | A | 3/2000 | Walter et al. | 137/334 |
| 6,070,416 | A | 6/2000 | Germain et al. | 62/63 |
| 6,105,388 | A | 8/2000 | Acharya | 62/612 |
| 6,129,290 | A | 10/2000 | Nikkanen | 239/2.2 |
| 6,141,972 | A | 11/2000 | Evans | 62/50.2 |
| 6,164,078 | A | 12/2000 | Lak et al. | 62/47.1 |
| 6,183,573 | B1 | 2/2001 | Fujiwara et al. | 148/336 |
| 6,185,953 | B1 | 2/2001 | Sada et al. | 62/324.4 |
| 6,212,891 | B1 | 4/2001 | Minta et al. | 62/50.7 |
| 6,301,923 | B1 | 10/2001 | Bonaquist et al. | 62/402 |
| 6,363,729 | B1 | 4/2002 | Brahmbhatt et al. | 62/51.1 |
| 6,446,441 | B1 | 9/2002 | Dean | 62/3.1 |
| 6,450,775 | B1 | 9/2002 | Hutchinson et al. | 417/198 |
| 6,464,148 | B1 | 10/2002 | Costa et al. | 239/2.2 |
| 6,467,274 | B2 | 10/2002 | Barclay et al. | 62/3.1 |
| 6,526,759 | B2 | 3/2003 | Zimm et al. | 62/3.1 |
| 6,568,429 | B2 | 5/2003 | Lundman | 138/91 |
| 6,589,366 | B1 | 7/2003 | Gschneidner et al. | 148/301 |
| 6,598,412 | B1 * | 7/2003 | Chen | 62/293 |
| 6,658,864 | B2 | 12/2003 | Thomas et al. | 62/63 |
| 6,676,772 | B2 | 1/2004 | Saito et al. | 148/301 |
| 6,684,112 | B1 | 1/2004 | Cheng | 700/28 |
| 6,708,511 | B2 | 3/2004 | Martin | 62/201 |
| 6,710,020 | B2 | 3/2004 | Tenne et al. | 508/103 |
| 6,722,145 | B2 | 4/2004 | Podtchereniaev et al. | 62/217 |
| 6,739,137 | B2 | 5/2004 | Minovitch | 62/3.1 |
| 6,826,915 | B2 | 12/2004 | Wada et al. | 62/3.1 |
| 6,843,065 | B2 | 1/2005 | Flynn | 62/156 |
| 6,962,164 | B2 | 11/2005 | Lull et al. | 137/2 |
| 7,013,668 | B2 | 3/2006 | Kyees | 62/390 |
| 7,028,768 | B2 | 4/2006 | Aler et al. | 165/219 |
| 7,036,598 | B2 | 5/2006 | Skjærseth et al. | 166/339 |
| 7,062,926 | B2 | 6/2006 | Clulow et al. | 62/74 |
| 7,063,754 | B2 | 6/2006 | Fukamichi et al. | 148/301 |
| 7,066,730 | B2 | 6/2006 | Macaluso | 432/225 |
| 7,069,729 | B2 | 7/2006 | Bruck et al. | 62/3.1 |
| 7,069,981 | B2 | 7/2006 | Valensa et al. | 165/164 |
| 7,076,959 | B2 | 7/2006 | Lewis | 62/3.1 |
| 7,083,800 | B1 | 8/2006 | Terren et al. | 424/401 |
| 7,111,467 | B2 | 9/2006 | Apparao et al. | 62/79 |
| 7,114,340 | B2 | 10/2006 | Pecharsky et al. | 62/3.1 |
| 7,121,344 | B2 | 10/2006 | Fenton et al. | 166/339 |
| 7,185,501 | B2 | 3/2007 | Steinbach | 62/79 |
| 7,218,523 | B2 | 5/2007 | Hamman | 361/718 |
| 7,234,310 | B2 | 6/2007 | Flynn et al. | 62/114 |
| 7,235,212 | B2 | 6/2007 | Kuehmann et al. | 420/38 |
| 7,263,852 | B2 | 9/2007 | Bacchus | 62/305 |
| 7,272,951 | B2 | 9/2007 | Kyees | 62/390 |
| 7,273,479 | B2 | 9/2007 | Littrup et al. | 606/21 |
| 7,378,065 | B2 | 5/2008 | Filippi et al. | 422/198 |
| 7,407,600 | B2 | 8/2008 | Eaton et al. | 252/73 |
| 7,415,830 | B2 | 8/2008 | Wyatt et al. | 62/6 |
| 7,441,412 | B2 | 10/2008 | Jensen | 62/121 |
| 7,461,691 | B2 | 12/2008 | Vinegar et al. | 166/60 |
| 7,481,064 | B2 | 1/2009 | Kitanovski et al. | 62/3.1 |
| 7,497,086 | B2 | 3/2009 | Atkins et al. | 62/50.1 |
| 7,546,873 | B2 | 6/2009 | Kim et al. | 166/245 |
| 7,562,831 | B2 | 7/2009 | Costa et al. | 239/2.2 |
| 7,596,955 | B2 | 10/2009 | Muller et al. | 62/3.1 |
| 7,603,865 | B2 | 10/2009 | Shin et al. | 62/3.1 |
| 7,648,597 | B2 | 1/2010 | Nagao et al. | 148/547 |
| 7,707,898 | B2 | 5/2010 | Oddie | 73/861.92 |
| 7,727,463 | B2 | 6/2010 | Arai et al. | 420/104 |
| 7,730,777 | B2 | 6/2010 | Anzai et al. | 73/204.11 |
| 7,740,287 | B2 | 6/2010 | Eide | 285/261 |
| 7,783,384 | B2 | 8/2010 | Kraft | 700/245 |
| 7,921,657 | B2 | 4/2011 | Littrup et al. | 62/64 |
| 8,099,964 | B2 | 1/2012 | Saito et al. | 62/3.1 |
| 8,104,293 | B2 | 1/2012 | Barve et al. | 62/3.1 |
| 2002/0139125 | A1 | 10/2002 | Kunkel et al. | 62/64 |
| 2004/0020642 | A1 | 2/2004 | Vinegar et al. | 166/245 |
| 2004/0244498 | A1 | 12/2004 | Chen et al. | 73/861.19 |
| 2005/0092483 | A1 | 5/2005 | Vinegar et al. | 166/60 |
| 2005/0288873 | A1 | 12/2005 | Urdaneta et al. | 137/487.5 |
| 2007/0144181 | A1 | 6/2007 | Kitanovski et al. | 62/3.1 |

(56) References Cited

U.S. PATENT DOCUMENTS

| | | |
|---|---|---|
| 2007/0191990 A1 | 8/2007 | Duan et al. .................... 700/282 |
| 2008/0048047 A1 | 2/2008 | Zurecki et al. .................... 239/8 |
| 2009/0019860 A1 | 1/2009 | Sakurada et al. ................ 62/3.1 |
| 2009/0158749 A1 | 6/2009 | Sandeman et al. ............... 62/3.1 |
| 2009/0217675 A1 | 9/2009 | Kobayashi et al. .............. 62/3.1 |
| 2009/0281671 A1 | 11/2009 | Duan et al. .................... 700/282 |
| 2010/0071383 A1 | 3/2010 | Zhang et al. ..................... 62/3.1 |
| 2012/0064022 A1 | 3/2012 | Wray ......................... 424/70.12 |
| 2013/0152608 A1 | 6/2013 | Wray ............................. 62/50.7 |

FOREIGN PATENT DOCUMENTS

| | | |
|---|---|---|
| WO | WO 82/01408 | 4/1982 |
| WO | WO 97/11326 | 3/1997 |
| WO | WO 2011/159355 | 12/2011 |

OTHER PUBLICATIONS

Certified English language translation of German Patent Publication No. DE 39 03 009, 19 pages.

English language abstract of German Patent Publication No. DE 39 03 009, European Patent Office, 2 pages.

Partial International Search Report, issued Feb. 13, 2012, in connection with corresponding International Patent Application No. PCT/US2011/001083, 2 pages.

International Search Report and Written Opinion, issued Jun. 4, 2012, in connection with corresponding International Patent Application No. PCT/US2011/001083, 23 pages.

Response to Written Opinion submitted Sep. 3, 2012, in connection with corresponding International Patent Application No. PCT/US2011/001083, 47 pages.

Written Opinion, issued Feb. 5, 2013, in connection with in connection with corresponding International Patent Application No. PCT/US2011/001083, 5 pages.

Response to Written Opinion, submitted Mar. 5, 2013, in connection with in connection with corresponding International Patent Application No. PCT/US2011/001083, 36 pages.

International Preliminary Report on Patentability, issued Apr. 9, 2013, in connection with corresponding International Patent Application No. PCT/US2011/001083, 18 pages.

Partial International Search Report, issued Feb. 13, 2012, in connection with International Patent Application No. PCT/US2012/069925, 2 pages.

Letter/Written Disclosure of the Supplemental Information Disclosure Statement for the above-referenced application, submitted Jan. 31, 2014, 2 pages.

Barden A.J. and R. Standen, "Developments in Subsea Pipe Freezing for Deepwater Applications," BJ Process and Pipeline Services Publication, 5 pages.

Rule 161(1) and 162 Communication, issued Jan. 25, 2013, in connection with corresponding European Patent Application No. 11740742.9, 2 pages.

Response to Communication persuant to Rules 161(1) and 162, submitted Jun. 27, 2013, in connection with corresponding European Patent Application No. 11740742.9, 21 pages.

International Search Report and Written Opinion, issued Sep. 2, 2013, in connection with International Patent Application No. PCT/US2012/069925, 16 pages.

Translated Summary of Office Action, in connection with corresponding Eurasian Patent Application Serial No. 201300018, 2 pages.

Voluntary amendment, submitted Nov. 15, 2013, and instructions for amendment, in connection with corresponding Chinese Patent Application No. 201180039434.4, 24 pages.

Response to International Search Report and Written Opinion, submitted Nov. 28, 2013, in connection with International Patent Application No. PCT/US2012/069925, 39 pages.

Response to Office Action, submitted Dec. 3, 2013, and instructions for response, in connection with corresponding Eurasian Patent Application Serial No. 201300018, 57 pages.

Examiner's Report, issued Jan. 13, 2014, in connection with corresponding Canadian Patent Application No. 2,802,346, 3 pages.

Letter/Written Disclosure of the Information Disclosure Statement for the above referenced application, mailed on Nov. 18, 2011, 2 pages.

Gedik et al.,"Magnetic refrigeration technology applications on near-room temperature," 5th International Advanced Technologies Symposium (IATS'09), May 13-15, 2009, Karabuk, Turkey, 7 pages.

Gschneidner et al., "Recent developments in magnetic refrigeration," Materials Science Forum 315-317:69-76 (1999).

Southwestern Petroleum Short Course [online], "Cryogenic valve offers oil and gas industry options for surface flow line and well pressure control," Published on 2011 [retrieved on Oct. 20, 2011] [retrieved from the Internet:<URL:swpshortcourse.org/program/abstracts/28-cryogenic-valve-offers-oil-and-gas-industry-options-surface-flow-line-and-well-] [1 page].

\* cited by examiner

METHODS, DEVICES AND SYSTEMS FOR EXTRACTION OF THERMAL ENERGY FROM A HEAT CONDUCTING METAL CONDUIT

RELATED APPLICATIONS

Benefit of priority is claimed to U.S. Provisional Application No. 61/517,070 to Daniel X. Wray, Robert J. Wray and Henry Cutbirth, entitled "METHODS, DEVICES AND SYSTEMS FOR EXTRACTION OF THERMAL ENERGY FROM A HEAT CONDUCTING METAL CONDUIT," filed Apr. 12, 2011, and to U.S. Provisional Application No. 61/399,746 to Daniel X. Wray and Robert J. Wray, entitled "METHODS, DEVICES AND SYSTEMS FOR EXTRACTION OF THERMAL ENERGY FROM A HEAT CONDUCTING METAL CONDUIT," filed Jul. 16, 2010, and to U.S. Provisional Application No. 61/397,759 to Daniel X. Wray, entitled "METHODS, DEVICES AND SYSTEMS FOR EXTRACTION OF THERMAL ENERGY FROM A HEAT CONDUCTING METAL CONDUIT," filed Jun. 15, 2010.

This application also is related to corresponding International Application No. PCT/US2011/001083, filed the same day herewith, entitled "METHODS, DEVICES AND SYSTEMS FOR EXTRACTION OF THERMAL ENERGY FROM A HEAT CONDUCTING METAL CONDUIT," which also claims priority to U.S. Provisional Application Ser. Nos. 61/517,070; 61/399,746 and 61/397,759.

The subject matter of each of the above-referenced applications is incorporated by reference in its entirety.

FIELD

This invention relates generally to cooling of a material. Provided are methods, devices and systems that allow extraction of thermal energy from a heat conducting metal conduit containing a liquid fluid such that the conduit is reduced to a temperature below which at least a portion of the liquid fluid therein becomes a solid thereby reversibly plugging the conduit without inducing thermally induced stress fractures or breaches in the conduit.

BACKGROUND

Metal conduits, such as gas, water and oil pipelines, can fail due to age, fatigue, corrosion, abuse, neglect and when used in the environment, natural forces that can fracture or rupture the pipe. There have been many attempts in the past to provide an effective method to stopper or plug a broken conduit, such as a pipe, carrying a gas, water or oil, in order to permit repairs to be made to the broken conduit. For example, U.S. Pat. No. 5,778,919 describes inflatable stoppers that can be placed in a pipeline and inflated in order to stop gas flowing through a pipeline while repairing the pipeline. U.S. Pat. No. 6,568,429 describes inflatable plugs that can be used to isolate defined sections of a conduit. U.S. Pat. No. 4,013,097 describes an apparatus for damming the flow of fluid in a pipeline, where the apparatus contains an inflatable bladder. The device is placed within a pipe and the bladder is inflated, thereby sealing the pipeline.

In some conduits, the pressure of the contents in the conduit is high, and inflatable bladders would be insufficient to plug a broken pipe. For example, deep sea oil wells exhibit a high pressure at the wellhead. U.S. Pat. No. 7,121,344 describes a system for installing a plug in a sub-sea wellhead. U.S. Pat. No. RE36,244 describes an apparatus for plugging a burning or gushing well. The apparatus includes a hollow tubular plug body sized for insertion into the well casing. The plug body is inserted into the well casing and locked in place by actuating a retainer module. A seal is then formed between the peripheral surface of the plug body and the well casing. The hollow internal passageway of the tubular plug body is closed by operation of a valve assembly, thereby plugging the pipe. Placement of the plug body requires a gantry assembly upon which the plug body is suspended above the well casing. U.S. Pat. No. 7,036,598 describes an intervention module for well intervention operations in a pressurized sub-sea well with a wellhead disposed on the sea floor. The drawbacks of these and other known intervention systems include the time and cost connected with known well intervention techniques, and in particular in connection with intervention in sub-sea wells, and the possible fracture or damage of the pipe by misaligned placement of the plug body.

Accordingly, a need exists for methodologies and devices that allow for plugging or stopping the flow of a fluid through a conduit with minimized loss of structural integrity of the conduit. It is, among the objects herein, to provide such methodologies and devices and systems for plugging or stopping the flow of a fluid through a conduit.

SUMMARY

Provided is a cooling or freezing system for controlled removal of thermal energy from a thermal conducting metal conduit and a fluid contained therein. The system allows for the in situ formation of a reversible plug that can stop the flow of fluid through a conduit. The system includes a thermal transfer device that can be adapted to be in thermal communication with a thermal conducting metal conduit containing a liquid fluid. The thermal transfer device can act as a heat sink for controlled extraction of thermal energy from the heat conducting metal conduit containing a liquid fluid such that the conduit is reduced to a temperature below which at least a portion of the liquid fluid therein becomes a solid thereby plugging the conduit without inducing thermally induced stress fractures or breaches in the conduit. The device allows for controlled re-heating of the conduit without inducing thermally induced stress fractures or breaches in the conduit to restore fluid flow through the conduit. In some embodiments, the thermal transfer device can contain liquid refrigerant fluids, such as alcohol/solid $CO_2$ slurries, or other liquid refrigerants, such as those containing liquid nitrogen, liquid helium, liquid argon, liquid neon, liquid xenon or liquid carbon dioxide in combination with solvents. Also provided are methods of halting the flow of a liquid fluid through a metal conduit by reducing the temperature of the conduit to a temperature at or below which the liquid fluid freezes to form a solid and thereby blocking the flow of liquid through the conduit.

Also provided is a chiller or freezing system for extracting thermal energy from a conduit containing a fluid. The system includes a thermal transfer device having a thermal transfer surface in thermal communication with the conduit and a control system adapted to adjust the heat extraction from the conduit by the thermal transfer device in response to a targeted temperature within the conduit. The thermal transfer device of the system can include a Peltier device, a magnetic refrigerator, a liquid-containing heat exchange unit or combinations thereof. In some embodiments in which the thermal transfer device includes a liquid-containing heat exchange unit through which a liquid refrigerant flows, the system can deliver unidirectional flow of liquid refrigerant to the thermal transfer surface of the heat exchange unit that is in thermal contact with the conduit to cool the conduit. The flow of liquid can be laminar or turbulent or a combination of the two. The systems provided herein also can include an intake circuit coupled to a liquid refrigerant supply module and adapted for providing a flow of refrigerant liquid to the heat exchange unit. The systems also can include an exhaust circuit including a vent tube adapted to vent the liquid refrigerant from the system.

The systems provided herein can include a control system adapted to adjust the flow rates of a liquid refrigerant in the intake circuit to adjust the temperature of the heat exchange unit in response to a desired cooling rate of the conduit and measured temperatures within the conduit. The intake circuit can include an in-line mixer adapted to mix the two or more liquid refrigerants to produce a temperature modulated liquid refrigerant. In some embodiments, the control system operatively adjusts the flow rates of the modulated liquid refrigerant to adjust the temperature of the heat exchange unit.

In the systems provided herein in which the thermal transfer unit is a liquid-containing heat exchange unit, the heat exchange unit can use a liquid refrigerant. Any liquid refrigerant known in the art can be used. The liquid refrigerant can include a cryogen and a liquid solvent. In some embodiments, the cryogen is liquid nitrogen, liquid oxygen, liquid helium, liquid neon, liquid methane, liquid natural gas, liquid argon, liquid nitrous oxide, liquid carbon dioxide or solid carbon dioxide or combinations thereof. In some embodiments, the liquid solvent is selected from among carbon tetrachloride, m-dichlorobenzene, nitromethane, bromobenzene, acetonitrile, chlorobenzene, m-xylene, n-butyl amine, n-octane, chloroform, t-butyl amine, trichloroethylene, butyl acetate, ethyl acetate, heptane, cyclopentane, hexane, methanol, cyclohexane, isooctane, acetaldehyde, methyl cyclohexane, m-pentane, 1,5-hexadiene, isopentane, 3-heptanone, cyclohexanone, diethyl carbitol, carbitol acetate, ethanol, acetone, isopropanol, ethyl methyl ketone, diethyl ether and combinations thereof. In particular, the liquid refrigerant includes liquid nitrogen or dry ice or a combination thereof with one or more solvents, such as methanol, ethanol, propanol, acetone or blends thereof. The temperature of the liquid refrigerant can be less than −20° C. or less than −40° C. or less than −50° C. or less than −60° C. or less than −80° C. or less than −100° C. In particular, the temperature of the liquid refrigerant is between −20° C. and −250° C. or between −40° C. and −60° C. In some embodiments, the liquid refrigerant is liquid argon, which has a boiling point of about −186° C.

In some embodiments, the thermal transfer device includes a thermal transfer surface and the surface is fabricated from a thermally conductive material selected from among copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. The thermally conductive material can be formed of a single metallic conductor or multiple metallic conductors. In some embodiments, the thermally conductive material comprises substantially pure copper, a copper alloy, substantially pure aluminum, an aluminum alloy, substantially pure silver, a silver alloy, substantially pure gold, and a gold alloy and mixtures or combinations thereof.

The heat exchange unit also can include a non-conducting portion. The non-conducting portion can be fabricated from or include a thermally non-conducting material. Any thermally non-conducting material can be used. In some embodiments, the thermally non-conducting material is selected from among butane, krypton, trichloro-methane, xenon, 1,1,2-trichloro-trifluoroethane, 1,2-dichlorotetrafluoroethane, tetrafluoro-ethane, argon, carbon dioxide, diethyl ether, isobutane, pentane, perfluoro-cyclobutane, propane, tetrafluoromethane, CFC-11, HCFC-141b, methanol, ethanol, glycerol, ether, acetone, ethylene glycol, thermally non-conducting silicone fluid containing glass, such as glass fibers or glass beads, propylene glycol, acrylic glass, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester and combinations thereof.

The thermal transfer devices provided herein contain particles, filings, turnings, shavings, pellets or beads of a thermally conductive metal. Including the filings, turnings, shavings, pellets or beads of a thermally conductive metal reduces or eliminates the Leidenfrost effect. The filings, turnings, shavings, pellets or beads of a thermally conductive metal within the heat exchange unit increase surface area and can channel fluid flow or induce turbulence, which can increase the efficiency of thermal transfer.

The chiller system or cryo-thermodynamic valve system provided herein also can include a thermal isolation means for thermally isolating the thermal exchange unit, the underlying conduit and at least a portion of the conduit on one or both sides of a point of attachment of the thermal exchange unit from the environment. The thermal isolation means encompasses or envelopes the thermal exchange unit, the underlying conduit and at least a portion of the conduit on one or both sides of a point of attachment of the thermal exchange unit. The system also can include a thermal isolation means for thermally isolating the vent discharge tube and/or the pipes of the system, such as the pipes of the intake circuit and/or the exhaust circuit, from the environment. In some embodiments, the thermal isolation means includes an insulating jacket. The jacket can be attached to the conduit or the vent tube to form an airtight seal creating a space between the jacket and the conduit or between the jacket and the vent tube. Any air or water in the space can be displaced with a material having a thermal conductivity less than water. Examples of materials having a thermal conductivity less than water include xenon, dichlorodifluoro-methane, butane, krypton, trichloromethane, 1,1,2-trichloro-trifluoroethane, 1,2-dichlorotetrafluoroethane, tetrafluoroethane, argon, carbon dioxide, diethyl ether, isobutane, pentane, perfluoro-cyclobutane, propane, tetrafluoromethane, CFC-11, HCFC-141b, methanol, ethanol, glycerol, ether, acetone, ethylene glycol, thermally non-conducting silicone fluid containing glass, such as glass fibers or glass beads, propylene glycol or a combination thereof.

The jacket also can include on the surface of the jacket adjacent to the external environment a layer or coating of a thermally insulating material. The thermally insulating layer or coating can include any material that is substantially thermally non-conductive, such as bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2- trichloro-trifluoroethane, 1,2-dichloro-tetrafluoroethane, tetrafluoroethane, argon, carbon dioxide, diethyl ether, isobutane, pentane, perfluoro-cyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

The chiller system or cryo-thermodynamic valve system provided herein also can include one or more heating elements. For example, a heating element can be disposed at the distal end of the conduit or vent discharge tube in order to minimize or prevent ice formation. One or more heaters can be disposed along the path of the exhaust circuit and discharge vent tube to raise the temperature of the vented liquid refrigerant to at least ambient temperatures prior to venting from the system. The chiller system or cryo-thermodynamic valve system also can include a pump for pumping liquid refrigerant through the system. In embodiments in which the thermal transfer device includes a liquid refrigerant, the system includes a refrigerant supply module, which can contain a liquid refrigerant and can contain a source of cryogen and a source of one or more solvents and a mixing device to mix the cryogen with one or more solvents to for in a liquid refrigerant having a particular temperature. The preparation of liquid refrigerant by the refrigerant supply module can be computer controlled. The computer module can be in communication with the refrigerant supply module to prepare refrigerant liquids having different temperatures by varying the proportion and type of solvent mixed with the cryogen. The system also can include one or more flow-control metering valves to control or modulate the flow of refrigerant liquid through the system. The computer module with a computer processor can be in communication with one or more of the valves to control or modulate the operation of the one or more flow-control metering valves of the system.

The chiller system or cryo-thermodynamic valve system also can include thermal monitoring devices. The thermal monitoring devices can be attached to one or more points of the conduit to monitor a thermal gradient or the thermal monitoring devices can be attached at the interface between thermal transfer device and the conduit to monitor the temperature at the interface. The computer module of the system can control or be in communication with the thermal monitoring devices.

The chiller system or cryo-thermodynamic valve system also can include a Peltier module as a thermal exchange device or a component thereof. In such systems, the system also includes a system for supplying electrical energy to the Peltier module; a cooling head thermally coupled to the cold side of the Peltier module, where the cooling head has a concave curved surface; a heat dissipation element thermally coupled to the hot side of the Peltier module; and a reservoir for a thermally conductive liquid thermally coupled to the heat dissipation element.

Also provided is a method of controlled rate freezing or chilling of a thermally conductive conduit containing a fluid, including the steps of attaching a thermal transfer device to the conduit; and activating the thermal transfer unit to extract thermal energy from the conduit and the fluid contained therein at a controlled rate and thereby minimize thermal stress to the conduit. The thermal transfer device can include a thermoelectric module, a Peltier device, a magnetic thermal transfer device, a magnetic refrigerator, a liquid-containing heat exchange unit or combinations thereof.

In methods where the thermal transfer device includes a liquid-containing heat exchange unit containing a liquid refrigerant, the heat exchange unit is in thermal contact with the conduit. The method further includes mixing a cryogen with a solvent to produce a temperature adjusted liquid refrigerant at a selected temperature. Any cryogen can be used. For example, the cryogen can be selected from among liquid nitrogen, liquid oxygen, liquid helium, liquid neon, liquid argon, liquid nitrous oxide, liquid carbon dioxide or solid carbon dioxide or combinations thereof. In the methods provided, the heat is extracted from the conduit at a desired cooling rate by delivering a uni-directional flow of the temperature adjusted liquid refrigerant to the heat exchange unit, and promptly exhausting the liquid refrigerant from the heat exchange unit. The flow of refrigerant can be laminar or turbulent or a combination of the two. The method also can include the step of modulating the pressure and flow rate of the liquid refrigerant prior to delivering the unidirectional flow through the heat exchange unit.

Also provided is a method of controlled rate freezing of a conduit containing a fluid, the method including the steps of: (i) placing a thermal exchange unit in thermal contact with a conduit containing a fluid therein; (ii) activating the thermal exchange unit so that thermal energy is withdrawn from the conduit and the fluid therein and transferred to the thermal exchange unit; and (iii) promptly dissipating the heat absorbed by the thermal exchange unit so as to prevent recirculation of the heat from thermal exchange unit back to the conduit.

Also provided is a method of controlled rate freezing of a conduit containing a fluid, the method including the steps of: (i) placing a liquid refrigerant heat exchange unit in thermal contact with a conduit containing a fluid therein; (ii) preparing a liquid refrigerant by mixing a liquid cryogen with a solvent to produce a cold liquid refrigerant at a selected temperature profile, the temperature profile corresponding to a desired cooling rate of the conduit and the fluid within the conduit; (iii) delivering a uni-directional flow of the temperature adjusted liquid refrigerant through the heat exchange unit to cool the conduit and its contents; and (iv) promptly exhausting the liquid refrigerant from the heat exchanger so as to prevent recirculation of the liquid refrigerant within the heat exchange unit. The flow of refrigerant can be laminar or turbulent or a combination thereof.

Also provided is a complete, forced-circulation, liquid cooling system for cooling or freezing a conduit containing a fluid. The system includes one or more heat exchange units thermally coupled to the conduit for receiving cooled liquid refrigerant and generating heated liquid refrigerant by transfer of heat from the conduit to the liquid refrigerant; a liquid refrigerant supply module; a liquid refrigerant pathway for delivery of the liquid refrigerant from the liquid refrigerant supply module to the heat exchange unit; a venting pathway for delivery of the liquid refrigerant from the heat exchange unit to an output vent; and a forced circulation means disposed between the heat exchange unit and the liquid refrigerant supply module forcing transportation, at accelerated rates, of cooled liquid refrigerant from the liquid refrigerant supply module to the heat transfer units and of heated liquid coolant from the heat exchange units to the venting pathway; where pressure and flow rate of the liquid refrigerant are modulated to provide unidirectional flow through the heat exchange unit. The flow can be laminar or turbulent or a combination of the two. In some embodiments, one or more heat transfer units have an inlet for receiving liquid refrigerant from the refrigerant supply module and an outlet for discharging heated liquid refrigerant from the heat exchange unit for transporting to the venting pathway, wherein the inlet is disposed below the outlet for enhancing convective circulation of the liquid coolant.

Also provided is a CryoPlug cryo-thermodynamic valve system for forming a frozen plug in a conduit by freezing at least a portion of a fluid contained therein. The cryo-thermodynamic valve system includes a thermal transfer device containing a liquid-containing heat exchange unit having a thermal transfer surface in thermal communication with the conduit; a cryogen injection device for injecting cryogen through an injector into the fluid in the conduit; and a control system to adjust the flow of a refrigerant to the thermal transfer device and/or the flow of cryogen through the injector. The system can deliver a unidirectional flow of liquid refrigerant to the thermal transfer surface of the heat exchange unit that is in thermal contact with the conduit to cool the conduit. The flow of refrigerant can be laminar or turbulent or a combination of the two. The system also can include an intake circuit coupled to a liquid refrigerant supply module and adapted for providing a flow of refrigerant liquid to the heat exchange unit. The system can include an exhaust circuit including a vent tube adapted to vent the liquid refrigerant from the system after it has absorbed thermal energy from the conduit. The system also can include a recirculating circuit that directs the liquid refrigerant from the system after it has absorbed thermal energy from the conduit to a refrigeration system that removes the absorbed thermal energy and recirculates the refrigerant back to a refrigerant supply module.

The intake circuit of the system can include an in-line mixer adapted to mix the two or more liquid refrigerants to produce a temperature modulated liquid refrigerant. The refrigerant of the CryoPlug cryo-thermodynamic valve system can include a cryogen and a liquid solvent. The cryogen can be liquid nitrogen, liquid oxygen, liquid helium, liquid neon, liquid methane, liquid natural gas, liquid argon, liquid nitrous oxide, liquid carbon dioxide or combinations thereof. The solvent can be selected from among carbon tetrachloride, m-dichlorobenzene, nitromethane, bromobenzene, acetonitrile, chloro-benzene, m-xylene, n-butyl amine, n-octane, chloroform, t-butyl amine, trichloroethylene, butyl acetate, ethyl acetate, heptane, cyclopentane, hexane, methanol, cyclohexane, isooctane, acetaldehyde, methyl cyclohexane, m-pentane, 1,5-hexadiene, isopentane, 3-heptanone, cyclohexanone, diethyl carbitol, carbitol acetate, ethanol, acetone, isopropanol, ethyl methyl ketone, diethyl ether and combinations thereof.

In some embodiments, the cryo-thermodynamic valve system can include a thermal transfer device that includes a thermal transfer surface. The surface can be fabricated from a thermally conductive material, such as copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof.

In some embodiments, the cryo-thermodynamic valve system can include a conduit containing a channel for delivery of cryogen to the cryogen injector device. The channel for delivery of cryogen can be within an inner annulus of the well casing or in a channel in the well casing. In embodiments of the cryo-thermodynamic valve system that include a refrigeration system to regenerate spent refrigerant, the refrigeration system can include one or more heat exchangers. The refrigeration system can be a closed loop refrigeration system. The system also can include an ultra-low temperature refrigeration system. The refrigeration system can include a compressor, a condenser, a filter drier and/or a heat exchange unit. In some embodiments, the refrigeration system includes a reciprocating compressor, a rotary compressor, a screw compressor, a scroll compressor or a combination of any two of these compressors.

The cryo-thermodynamic valve system can include a pump for pumping liquid refrigerant from a refrigerant supply module through the heat exchange unit. The refrigerant supply module can include a source of cryogen and a source of one or more solvents and a mixing device to mix the cryogen with one or more solvents.

The cryo-thermodynamic valve system also can include a computer module. The computer module can be in communication with the refrigerant supply module and can direct the refrigerant supply module to prepare refrigerant liquids having different temperatures by varying the proportion and type of solvent mixed with the cryogen. The CryoPlug cryo-thermodynamic valve system can include one or more flow-control metering valves to control or modulate the flow of refrigerant liquid through the heat exchange unit or the flow of cryogen to the cryogen injector unit. The computer module of the system, which includes a computer processor, can be in communication with one or more of the valves to control or modulate the operation of the one or more flow-control metering valves of the system. The system also can contain thermal monitoring devices and the computer module can control or be in communication with the thermal monitoring devices.

Also provided are methods for temporarily preventing the flow of oil in a pipeline. The methods include attaching a thermal transfer device to the pipeline so that it is in thermal contact with at least one portion of the pipeline; and installing a cryogen injector module that when activated injects cryogen into the fluid in the pipeline, where the thermal transfer device and injection of cryogen remove sufficient thermal energy to cause the oil in the pipeline to freeze and form a frozen plug of oil that prevents oil from flowing through the pipeline. In the methods, the cryogen injector device can be positioned closer to the source of fluid flowing through the pipeline relative to the thermal transfer device so that the injection of cryogen into the fluid cools the fluid before the fluid reaches the area of the pipeline to which the thermal transfer device is attached. In some embodiments, the thermal transfer device can be activated for a sufficient time to form a frozen plug of fluid that prevents flow of the fluid through the conduit. Once the frozen plug is formed, the thermal transfer device can remain activated for a sufficient time to maintain a frozen plug of fluid securely attached to the inner wall of the pipeline, thereby preventing flow of fluid past the plug in the pipeline.

In some methods, the CryoPlug cryo-thermodynamic valve system is attached to an intact conduit and is activated as an emergency shut off mechanism of the conduit in case of failure or breach of the conduit above the point of attachment of the cryo-thermodynamic valve system. In such methods, the cryo-thermodynamic valve system can be attached to a breached or broken conduit. In these methods, the methods further include as a step identifying a breach site in a conduit; attaching a thermal transfer device to an intact area of the conduit below the breach; attaching below the thermal transfer device a cryogen injector device; and activating the thermal transfer device and the cryogen injector or injector device, thereby putting the cryo-thermodynamic valve system into active mode, for a sufficient time to form a frozen plug of fluid that prevents flow of the fluid through the conduit. The CryoPlug cryo-thermodynamic valve system can be maintained in active mode until repairs are made to the conduit.

In the methods, the plugging can be reversed so that the oil flow can resume through the conduit. To accomplish this, the method further includes as a step increasing the temperature of the thermal transfer device or a portion thereof so that it donates thermal energy to the plug within the conduit, thereby increasing the temperature of at least a portion of the frozen plug and melting the frozen plug and restoring flow of the fluid through the pipe. In some embodiments, the heat exchange unit includes one or more heating channels that traverses a portion of the length or the full length of the heat exchange unit. The heating channel(s) includes a means of heating the channel to provide heat unilaterally or directionally to the plug of frozen flow formed within the conduit. This directed application of thermal energy to the plug allows for directed melting of the plug, such as to form a channel through the plug through which liquid fluid can flow. This prevents launching the frozen plug through the conduit, and permits controlled restoration of flow through the conduit.

Also provided are methods for temporarily isolating an oil well. The methods include attaching a thermal transfer device to a portion of a producing tubular in the oil well so that it is in thermal contact with at least one portion of the producing tubular; and installing a cryogen injector module to a portion of a producing tubular so that when activated the injector module injects cryogen into the oil in the producing tubular, where the injection of cryogen into the oil reduces the temperature of the oil before it comes into contact with the area of the producing tubular to which the thermal transfer device is attached, and the thermal transfer device extracts sufficient thermal energy from the oil that it freezes and forms a plug of frozen oil that reversibly attaches to the side walls of the producing tubular. In some embodiments, the thermal transfer device is incorporated into the well casing, producing tubular, or other tubular. In some methods, the cryogen can be liquid nitrogen, liquid oxygen, liquid helium, liquid neon, liquid methane, liquid natural gas, liquid argon, liquid nitrous oxide, liquid carbon dioxide, solid carbon dioxide or combinations thereof. The thermal transfer device can include a liquid heat exchange unit that contains a refrigerant.

In the methods, the refrigerant can include a cryogen and a solvent. In some methods, the refrigerant includes (a) liquid nitrogen, liquid oxygen, liquid helium, liquid neon, liquid methane, liquid natural gas, liquid argon, liquid nitrous oxide, liquid carbon dioxide or solid carbon dioxide or combinations thereof and (b) a solvent selected from among carbon tetrachloride, m-dichlorobenzene, nitromethane, bromobenzene, acetonitrile, chlorobenzene, m-xylene, n-butyl amine, n-octane, chloroform, t-butyl amine, trichloroethylene, butyl acetate, ethyl acetate, heptane, cyclopentane, hexane, methanol, cyclohexane, isooctane, acetaldehyde, methyl cyclohexane, m-pentane, 1,5-hexadiene, isopentane, 3-heptanone, cyclohexanone, diethyl carbitol, carbitol acetate, ethanol, acetone, isopropanol, ethyl methyl ketone, diethyl ether and combinations thereof.

In some embodiments, the method includes providing a refrigerant or cryogen to a heat exchange unit and venting the spent refrigerant or cryogen into the environment. In some methods, a refrigerant or cryogen is provided to the heat exchange unit and the spent refrigerant or cryogen is recirculated to a heat exchange unit and the spent refrigerant or cryogen is regenerated by passing it through a closed loop refrigeration system. In some methods, the refrigeration system is an ultra-low temperature refrigeration system. In some methods, the refrigeration system includes a compressor, a condenser, a filter drier and/or a heat exchange unit. In some methods, the compressor can be a reciprocating compressor, a rotary compressor, a screw compressor, a scroll compressor or a combination of any two of these compressors.

In some methods, the cryogen injector or injector unit can include a drill fitted with a hollow drill bit. In these methods, activation of the cryogen injector unit includes powering of the drill so that it bores through the well casing so that the end of the hollow drill bit comes into fluid communication with the oil in the producing tubular in the well casing. Once the hollow drill bit is in fluid communication with the oil in the producing tubular, a cryogen supply can be attached directly or indirectly to the hollow drill bit to inject cryogen into the oil.

Also provided are methods for producing a controlled rate of freezing of a fluid that is contained in a thermally conducting metal conduit. The method includes (a) installing a cryogen injector unit that when activated injects cryogen into the fluid; (b) installing a thermal exchange unit in thermal contact with a conduit containing a fluid therein at a point downstream from the cryogen injector or injector unit; (c) activating the cryogen injector or injector unit to inject cryogen into the fluid and thereby reduce the temperature of the fluid; (d) activating the thermal exchange unit to absorb thermal energy by the refrigerant to form a spent refrigerant thereby withdrawing thermal energy from the conduit and the fluid therein and transferred to the thermal exchange unit; and (e) dissipating the heat absorbed by the thermal exchange unit. In these methods, the heat absorbed by the thermal exchange unit can be dissipated by venting the spent refrigerant into the environment.

In some methods, the spent refrigerant can be regenerated by passing it through a refrigeration system to remove the thermal energy that the spent refrigerant absorbed from the heat exchange unit in thermal communication with the conduit.

Also provided are methods for producing a reversible plug in a fluid that is contained in a thermally conducting metal conduit. The methods include (a) installing one or more injector unit(s) that when activated inject(s) a material into the fluid within the conduit, where the injector unit includes a cryogen injector that when activated injects cryogen; and the injector unit can include an auxiliary injector that injects a composition containing a bridging fluid or surface active agent or a combination thereof; (b) installing a thermal exchange unit in thermal contact with a conduit containing a fluid therein at a point downstream from the cryogen injector unit; (c) activating the thermal exchange unit to absorb thermal energy from the conduit and the fluid therein by the cryogen to form a spent cryogen thereby withdrawing thermal energy from the conduit and the fluid therein, where the thermal energy is transferred from the fluid to the thermal exchange unit; and (d) activating the one or more injector units to inject cryogen and bridging fluid or surface active agent or a combination thereof into the fluid to form a plug therein. The fluid in the conduit can be any fluid, including liquids, such as a hydrocarbon or water, or a gas, such as natural gas. In the methods, an auxiliary injector can inject a surface active agent, which can result in the formation of a more homogenous frozen plug and promotes better adhesion of the frozen plug to the conduit. The surface active agent can be any agent with surface activity, such as an anionic, cationic, zwitterionic, non-ionic or silicone surfactant or a combination thereof. Also provided are methods in which the auxiliary injector injects a bridging fluid. Any bridging fluid known in the art can be used. Exemplary bridging fluids include water, methanol, ethanol, isopropanol and mixtures thereof. In the methods, the thermal transfer device contains particles, filings, turnings, shavings, threads, pellets or beads of a thermally conductive metal.

In the devices, systems and methods provided herein, the length of the heat exchange unit can vary and can be designed by one skilled in the art to be of any length. The heat exchange unit can be formed from continuous pipe or multiple heat exchange units can be interconnected to form a heat exchange unit of a desired length. For example, a heat exchange unit can be of a length between 2 feet and 5000 feet. In the devices, systems and methods provided herein, the heat exchange unit can be oriented horizontally, or can be oriented between 1° and 89° from horizontal, or can be oriented vertically.

Also provided are systems where two or more heat exchange units provided herein are connected together. In some configurations, two or more heat exchange units are connected in series and refrigerant or cryogen flows from one heat exchange unit to the next before venting or exiting the system. In some configurations, two or more heat exchange units are connected in series and each heat exchange unit is connected to a separate refrigerant or cryogen supply module.

The size of the channel formed between the inner surface and the outer surface of the heat exchange units provided herein can be of any dimension, which can be determined by the skilled artisan. In some embodiments, the channel can have a width that is between about 0.05 inches to about 500 inches. The size of the channel between the inner surface and the outer surface of the heat exchange units provided herein also can be based on a ratio of the dimension of the outer surface to the dimension of the inner surface. For example, the width of the channel formed between the inner surface and the outer surface of the heat exchange unit can be between about 10% to about 500% of the inner diameter of the heat exchange unit.

In the heat exchange units provided herein, one or more heating channels that traverse a portion of the length or the full length of the heat exchange unit can be included. The heating channels are positioned so that thermal energy introduced into the heat exchange unit via the heating channel is transferred to or directed to the plug of frozen fluid within the conduit about which the heat exchange unit is connected. The heating channels can be configured to contain a fluid, such as a heated liquid or gas. The heating channels also can be configured to contain one or more heating units. Exemplary heating units include a Curie temperature heater, a temperature limited heater, a conductor-in-conduit heat source, a heater strip, a resistive heating strip, a Positive Thermal Coefficient ceramic heater, a thick film ceramic heater, a resistance wire or a resistance ribbon heating device.

Also provided herein are heat exchange devices that contain an inner conduit 2 having diameter D2; an outer conduit 2c having diameter Dc2; an end plate 3; an end plate 4; an inlet port 12 for introducing cryogen or refrigerant into the heat exchange device; and an outlet port 13 for venting cryogen or refrigerant from the heat exchange device, where the inner conduit 2 includes a pipe 2f having an outer diameter 2fD; a pipe $2a_{left}$ at the left distal end of finned pipe 2f and a pipe $2a_{right}$ at the right distal end of the pipe 2f; the end plate 3 has an opening through which a portion of conduit $2a_{left}$ passes; the end plate 4 has an opening through which a portion of conduit $2a_{right}$ passes; the end plate 3 is attached at the left of the outer conduit 2c and around conduit $2a_{left}$; the end plate 4 is attached at the right of the outer conduit 2c and around conduit $2a_{right}$; the inner conduit 2 and the outer conduit 2c form a cavity having a width Dc2 minus D2; and the cavity between the inner conduit 2 and the outer conduit 2c is filled with particles, filings, turnings, shavings, pellets or beads of a thermally conductive metal; and the pipe 2f is in thermal communication with one or more of the particles, filings, turnings, shavings, pellets or beads of the thermally conductive metal. In some embodiments, the pipe 2f includes thermally conducting fins. The fins can be configured in any geometry or position. The fins of finned pipe 2f can be configured radially or longitudinally. The fins can be configured to have the same length or to have two or more different lengths. In some embodiments, the fins can be notched or perforated or both to minimize bubble formation or collection and to minimize dead zone formation. In some embodiments, two or more of the fins of finned pipe 2f can extend the width or length of the cavity within the heat exchange unit to create one or more channels. Where multiple channels are foamed, the channels can be adjacent to each other or can be staggered around the radius of the inner conduit 2 or about the length of inner conduit 2. Individual cryogen injectors can be attached to the heat exchange unit to inject cryogen into each of the channels formed by the fins of finned pipe 2f. The heat exchange units provided herein also can include one or more baffles that modulate the flow of cryogen or refrigerant within the heat exchange unit.

The heat exchange units provided herein also can include one or more heating channels that traverse a portion of the length or the full length of the heat exchange unit and that are in thermal communication with the inner conduit 2, where the heating channels are configured to contain a fluid or to contain one or more heating units, such as a Curie temperature heater, a temperature limited heater, a conductor-in-conduit heat source, a heater strip, a resistive heating strip, a Positive Thermal Coefficient ceramic heater, a thick film ceramic heater, a resistance wire or a resistance ribbon heating device.

The heat exchange units provided herein can include an input manifold attached to 2 or more openings in the heat exchange unit to distribute the cryogen or refrigerant to two or more injection sites in the heat exchange unit. The input manifold can be configured to distribute the cryogen or refrigerant to two or more injection sites radially located in the heat exchange unit or to two or more injection sites longitudinally located in the heat exchange unit or any combination of such sites. The heat exchange units provided herein also can include a vent manifold that vents the cryogen or refrigerant from the heat exchange unit at two or more vent sites in the heat exchange unit.

Also provided is a cryo-thermodynamic valve device that includes a heat exchange device provided herein and one or more cryogen injector devices positioned upstream of the heat exchange device. When two or more cryogen injector devices are present, they can be positioned radially about the conduit leading to the intake of the heat exchange unit, or they can be positioned longitudinally (about the length of the pipe) and any combination thereof. The cryo-thermodynamic valve devices provided herein also can include an auxiliary injector device positioned upstream of the cryogen injector device. In the cryo-thermodynamic valve devices provided herein, the heat exchange unit contains particles, filings, turnings, shavings, threads, pellets or beads of a thermally conductive metal and includes one or more heating channels that traverse a portion of the length or the full length of the heat exchange unit. The heating channels can be configured to contain a fluid or to contain one or more heating units. The cryo-thermodynamic valve devices also can include other devices that can monitor the conditions in the heat exchange unit and/or the conduit, such as thermal monitoring devices, flow monitoring devices and pressure monitoring devices. The cryo-thermodynamic valve devices also can include a computer. The computer can be used to automate the cryo-thermodynamic valve device, such as being in communication with devices that are monitoring the conditions in the heat exchange unit and/or the conduit, such as thermal monitoring devices, flow monitoring devices and pressure monitoring devices, or in communication with addressable valves that can be manipulated by the computer.

Also provided are thermal transfer devices for modulating thermal energy of a thermally conducting conduit containing a fluid, which include a thermal transfer surface and particles of a thermally conductive material, where when the thermal transfer device is attached to the conduit, the thermal transfer surface and the particles within the thermal transfer device are in thermal communication with the conduit. The device can include a Peltier device, a magnetic refrigerator, a fluid-containing heat exchange unit or combinations thereof.

In some embodiments, the device comprises a heat exchange unit through which a fluid refrigerant, such as a cryogen, flows, where the fluid refrigerant flows across the surface of the particles of thermally conductive material and the thermal transfer surface of the heat exchange unit. The thermal transfer surface or the particles or both can comprise a thermally conductive material selected from among copper, brass, beryllium, cadmium, cobalt, chrome nickel steel, gold, silver, iridium, iron, lead, magnesium, molybdenum, nickel, platinum, tin, zinc, carbon steel, stainless steel, aluminum and any combination or alloy thereof. The devices also can include a cryogen injection device for injecting a cryogen through an injector into the fluid in the conduit, and/or an auxiliary injection device for injecting a surfactant or bridging fluid or a combination thereof through an injector into the fluid in the conduit.

The device can include a first wall having an outer surface in thermal contact with the conduit and an inner surface; a second wall having an outer surface oriented toward the environment and an inner surface; and a space between the inner surface of the first wall and the inner surface of the second wall, where the space has a width that is between about 0.05 inches and about 500 inches; or the space has a width that is between about 10% and about 500% of the inner diameter of the heat exchange unit. The heat exchange unit also can include one or more heating channels that traverse a portion of the length or the full length of the heat exchange unit, and the heating channels can be configured to contain a fluid or to comprise one or more heating units. When present, the heating unit can be any heating unit known in the art, such as a Curie temperature heater, a temperature limited heater, a conductor-in-conduit heat source, a heater strip, a resistive heating strip, a Positive Thermal Coefficient ceramic heater, a thick film ceramic heater, a resistance wire or a resistance ribbon heating device.

Also provided are cryo-thermodynamic valve devices that include a heat exchange device as described above and a cryogen injector device positioned upstream of the heat exchange device, and optionally an auxiliary injector device positioned upstream of the cryogen injector device. Also provided are systems that include a thermal transfer device described above thermally coupled to the conduit, where the thermal transfer device receives cooled liquid refrigerant and generates heated liquid refrigerant by transfer of heat from the conduit and fluid therein to the liquid refrigerant. The system also can include a liquid refrigerant supply module; a liquid refrigerant pathway for delivery of the liquid refrigerant from the liquid refrigerant supply module to the heat exchange unit; a venting pathway for delivery of the liquid refrigerant from the heat exchange unit to an output vent; and a forced circulation means disposed between the heat exchange unit and the liquid refrigerant supply module forcing transportation of cooled liquid refrigerant from the liquid refrigerant supply module to the heat transfer units and of heated liquid coolant from the heat exchange units to the venting pathway; where the circulation means produces a pressure and a flow rate; and the pressure and flow rate of the liquid refrigerant can be modulated to provide unidirectional flow through the heat exchange unit.

Also provided are cryo-thermodynamic valve systems for forming a plug in a thermally conducting conduit containing a fluid, the system including a thermal transfer device as described above in thermal communication with the conduit; a cryogen injection device for injecting cryogen through an injector into the fluid in the conduit; a cryogen supply module; and a control system to adjust the flow of a cryogen from the supply module to the thermal transfer device or the flow of cryogen through the injector or both. The system also can include one or more components selected from among: one or more flow-control metering valves to control or modulate the flow of cryogen through the heat exchange unit or the flow of cryogen to the cryogen injector unit or both; one or more thermal monitoring devices; an auxiliary injector that injects into the fluid in the conduit a composition comprising a bridging fluid or surface active agent or a combination thereof; an exhaust circuit including a vent tube adapted to vent the cryogen from the system after it has absorbed thermal energy from the conduit; or a recirculating circuit that directs the cryogen from the system after it has absorbed thermal energy from the conduit to a refrigeration system that removes the absorbed thermal energy from the cryogen and recirculates the cryogen back to the cryogen supply module; and a computer module with a computer processor in communication with components of the system.

In some embodiments of the devices and systems provided herein, the thermal transfer device includes a thermal transfer surface and contains particles of a thermally conducting material, and when the thermal transfer device is attached to a conduit, the thermal transfer surface is in thermal communication with the conduit and at least a portion of the particles are in thermal communication with the thermal transfer surface. The particles within the device also are in thermal communication with each other and can serve as a heat sink.

Also provided are methods for temporarily preventing the flow of a fluid in a pipeline, comprising attaching a thermal transfer device as described above to the pipeline so that it is in thermal contact with at least one portion of the pipeline; installing a cryogen injector module that when activated injects cryogen into the fluid in the pipeline; and activating the thermal exchange device and cryogen injector, where the thermal transfer device and injection of cryogen remove sufficient thermal energy to cause the fluid in the pipeline to form a plug that prevents fluid from flowing through the pipeline.

Also provided are methods for temporarily preventing flow of a fluid in a production tubing, the method including the steps of attaching a thermal transfer device of claim 10 to a portion of the production tubing so that it is in thermal contact with at least one portion of the production tubing; and installing a cryogen injector module to a portion of the production tubing so that when activated the injector module injects cryogen into the oil in the production tubing, where the injection of cryogen into the fluid reduces the temperature of the fluid before it comes into contact with the area of the production tubing to which the thermal transfer device is attached, and the thermal transfer device extracts sufficient thermal energy from the fluid that it freezes and forms a plug of frozen fluid that reversibly attaches to the side walls of the production tubing.

Also provided are methods for producing a controlled rate of freezing of a fluid that is contained in a thermally conducting metal conduit, comprising the steps of:

(a) installing a cryogen injector unit that when activated injects cryogen into the fluid;

(b) installing a thermal exchange unit described above in thermal contact with a conduit containing a fluid therein at a point downstream from the cryogen injector unit; (c) activating the cryogen injector unit to inject cryogen into the fluid; (d) activating the thermal exchange unit to absorb thermal energy from the conduit and the fluid therein and transferred to the thermal exchange unit; and (e) dissipating the heat absorbed by the thermal exchange unit.

Also provided are methods for producing a reversible plug in a fluid contained in a thermally conducting metal conduit, the methods including the steps of (a) installing one or more injector unit(s) that when activated inject(s) a material into the fluid within the conduit, where i) the injector unit comprises a cryogen injector that when activated injects cryogen; and ii) the injector unit comprises an auxiliary injector that injects a composition comprising a bridging fluid or surface active agent or a combination thereof; (b) installing a thermal exchange unit of claim 10 in thermal contact with a conduit containing a fluid therein at a point downstream from the cryogen injector unit; (c) activating the thermal exchange unit to absorb thermal energy from the conduit and the fluid therein by the cryogen to form a spent cryogen thereby withdrawing thermal energy from the conduit and the fluid therein, wherein the thermal energy is transferred from the fluid to the thermal exchange unit; and (d) activating the one or more injector units to inject cryogen and bridging fluid or surface active agent or a combination thereof into the fluid to form a plug therein.

Other objects, features and advantages of the systems and methods described herein will become apparent to those skilled in the art from the following detailed description. It is to be understood, however, that the detailed description, while indicating certain embodiments of the devices, systems and methods described herein, are given by way of illustration and not limitation. Many changes and modifications within the scope of the present invention may be made without departing from the spirit thereof.

BRIEF DESCRIPTION OF THE FIGURES

FIG. 4B shows the heat exchange unit containing thermally conducting beads.

FIG. 5B shows the heat exchange unit containing thermally conducting beads.

OUTLINE

Figure 1:
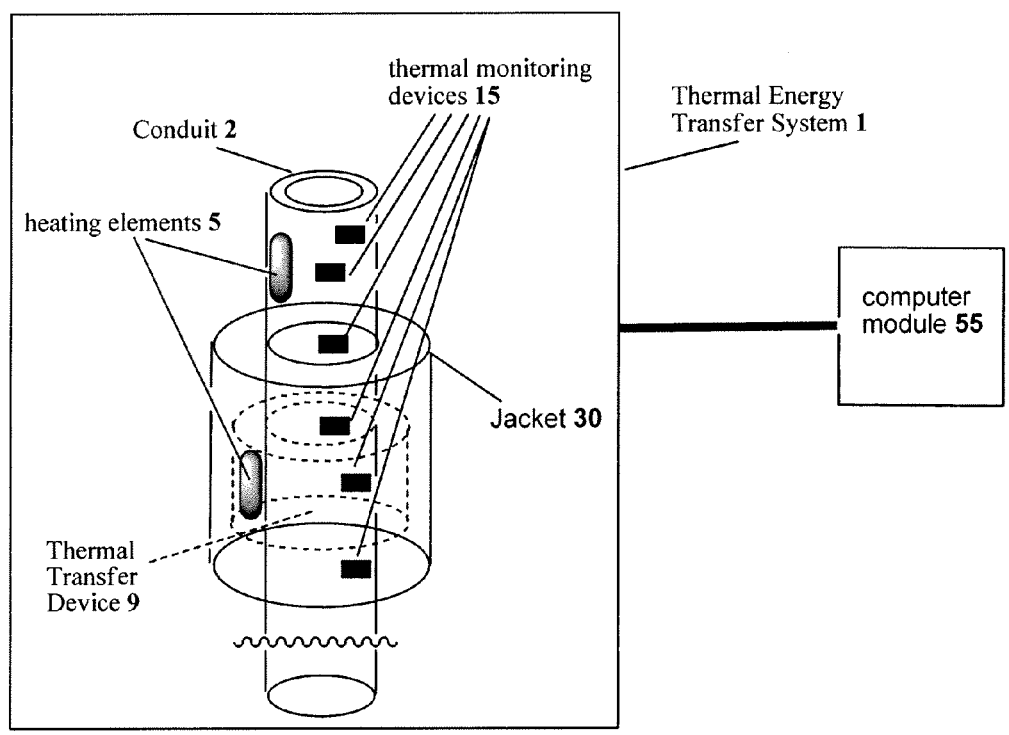
FIG. 1 is a schematic illustration of an embodiment of a thermal energy transfer system.

A. Definitions
B. Thermal Energy Transfer System (Chilling system
  1. Thermal Transfer Device
    a. Liquid-containing heat exchange unit
    b Thermoelectric module or Peltier device
    c. Magnetic thermal transfer device
  2. Thermal Isolation Means
  3. Computer module
  4. Cryogen Injector Module
C. Prophylactic Cryo-Thermodynamic Valve System
D. Methods
E. Examples

A. DEFINITIONS

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the interne. Reference thereto evidences the availability and public dissemination of such information.

As used herein, the term "particle" refers to a small mass that can be composed of any material, such as copper, iron, gold, alumina, glass, silica, latex, plastic, agarose, polyacrylamide, methacrylate or any polymeric material, and be of any size and shape. Typically the particles have at least one dimension in the 5-10 mm range or smaller, such as less than 50 µm or less than 10 µm. Such particles, referred to collectively as "beads" herein, are often, but not necessarily, spherical. Reference to "bead," however, does not constrain the geometry of the particle, which can be any shape, including random shapes, needles, fibers, and elongated spheroids. "Beads" also encompass microspheres, such as spheres that are less than 5 µm in diameter.

As used here, the singular forms "a," and "the" include plural referents unless the context clearly dictates otherwise.

As used herein, ranges and amounts can be expressed as "about" a particular value or range. About also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "substantially pure" refers to a compound of at least about 95%, by dry weight, active compound, or at least 95% pure.

As used herein, "thermal conductivity," $\lambda_1$, is defined as the quantity of heat that will traverse a medium of unit thickness and cross-sectional area per unit time, under the influence of an applied temperature gradient. Values of $\lambda_1$ are usually in the range of $250\text{-}400\times10^{-6}$ cal/cm s K, but some liquids with a high degree of association, such as may occur with hydrogen bonding, have higher conductivities. Devices for measuring thermal conductivity are well known in the art (e.g., see U.S. Pat. No. 4,283,935). Thermal conductivity is the quantity of heat transmitted, due to unit temperature gradient, in unit time under steady conditions in a direction normal to a surface of unit area.

As used herein, "conductive heat flow" refers to the transfer of thermal energy from a first object at one temperature to a second object at a temperature lower than the temperature of the first object. Conduction will take place if there is a temperature gradient in a solid (or stationary fluid) medium. Energy is transferred from more energetic to less energetic molecules when neighboring molecules collide. Conductive heat flow occurs in the direction of the decreasing temperature since higher temperatures are associated with higher molecular energy.

As used herein, a "conduit" is a channel, tube, duct or pipe for conveying fluids.

As used herein, "fluid: refers to gases, liquids, supercritical fluids and materials that flow, optionally containing dissolved species, solvated species and/or particulate matter. Fluids also refer to multiple fluids of different types present together. In this context, fluid refers to any form of liquid or pumpable material such as petroleum, drill fluid, cement, concrete or resin coated sand.

As used herein, the term "thermal energy" refers to power that produces heat.

As used herein, the term "mechanical properties" refers to mechanical qualities or traits belonging to a specific material, such as a metal or alloy thereof.

As used herein, the term "Peltier device" refers to a known, self contained semiconductor device with the capability to absorb or radiate heat from opposed thermally conductive parts, depending on the direction of electric current passing through the device. The heat conducting parts are generally constructed of metal, due to the excellent thermal conductivity of metals, but other materials may be substituted. A Peltier device can be operated to, upon the passage of an electrical current across the semiconductor junction in one direction, absorb heat from the first heat conducting part and liberate heat by the second heat conducting part.

As used herein, the term "unidirectional flow" refers to flow proceeding along one direction.

As used herein, "laminar flow" refers to uniform laminar flow in which the velocity profile of the flow through a tube is symmetric about the tube axis. Laminar flow is characterized by movement of a fluid in layers. In particular, laminar flow is distinguished from turbulent flow in that in laminar flow there is no macroscopic mixing of adjacent fluid layers.

As used herein, "turbulent flow" refers to fluid flow in which the velocity profile of the flow through a tube is asymmetric about the tube axis and can include local velocities and pressures that fluctuate randomly and erratically such that the velocity at any fixed point in the fluid varies irregularly.

As used herein, the term "thermal monitoring unit" refers to a temperature sensor. The temperature sensor can include an electrical component that has some measurable, repeatable property that can be used to determine the temperature of a material. The temperature sensor can be a thermocouple, a diode, or a resistance device such as a thermistor or RTD.

As used herein, "thermal communication" refers to heat transfer between bodies that are in contact or that are integrally connected by a medium that transmits thermal energy. Such communication generally involves radiation, conduction, convection or a combination thereof. Thermal communication may involve fluid communication (e.g., convection or conduction) or may not involve fluid communication (e.g., radiation).

As used herein, the term "thermal contact" refers to an arrangement that provides good thermal communication from one surface to another and does not necessarily denote the absence of an intermediate layer between the two surfaces. The terms "thermal contact" includes any coupling between one component and another component that enables relatively efficient transfer of heat between the components. The components can be directly thermally contacted with each other, or they may be indirectly contacted (such as through a thermally conductive layer, block or conduit).

As used herein, the term "thermal transfer" refers to conveying thermal energy by one object to another.

As used herein, a "thermal transfer device" is a device that conveys thermal energy to an object with which it is in thermal communication.

As used herein, "fluid communication" refers to communication that involves the transfer of a fluid. In some embodiments, fluid communication may involve thermal communication (e.g., the transfer of a fluid from one point to another, where both points are not at the same temperature) or may not involve thermal communication (e.g., the transfer of a fluid from one point to another, where both points are at the same temperature).

As used herein, the term "cooling rate" refers to how fast thermal energy is removed from an object. A value for cooling rate can be obtained by dividing the difference between the temperature at which cooling is started and the final cooling temperature by the time for reaching the final cooling temperature from the start of cooling. Generally, cooling rate refers to the decrease in temperature of an object over time. The cooling rate can be adjusted by control of the rate at which thermal energy is removed from the object. The details of heat exchange are well known to those in the art.

As used herein, the term "cryogen" refers to any substance having a temperature of or below 0° C. Exemplary cryogens include liquid nitrogen, liquid nitrous oxide, liquid methane, liquid natural gas, or liquid or solid carbon dioxide, chlorodifluoro-methane, or Freon (a trademark of DuPont), or any number of other refrigerants or fluids with a high thermal energy transfer capacity and low boiling point, as are commonly known to those skilled in the art. Cryogens can readily induce a temperature differential when applied to an object.

As used herein, the term "cryogen liquid" refers to a cryogenic fluid in liquid phase. In some instances, cryogenic liquids are liquefied gases that have a normal boiling point below −238° F. (−150° C.). For example, liquid argon has a boiling point of −302.6° F. (−185.9° C.) and liquid nitrogen has a boiling point of −321° F. (−196° C.).

As used herein, the term "cryogenic" refers to cooling media that are used at a temperature of 0° C. or below.

As used herein, the term "thermally conductive" refers to the property of a material to transfer or pass thermal energy or heat to another material or through itself. Thus, a thermally conductive material readily transfers thermal energy, either by conduction, convection or radiation, to another material or through itself. In some instances, thermally conductive materials have a thermal conductivity of at least 1 Watt/m° C. and often greater.

As used herein, the term "thermally non-conductive" refers to the inability of a material to transfer or pass thermal energy or heat to another material or through itself. Thus, a thermally non-conductive material does not readily transfer thermal energy to another material or through itself. A thermally non-conductive material is a thermally insulating material. In some instances, thermally non-conductive materials have a thermal conductivity less than 1 Watt/m° C.

As used herein, the term "ceramic" includes all art-recognized ceramic materials, composites of the same, and composites of ceramics and metals and/or metal alloys.

As used herein, the term "magnetic refrigerator" refers to a device that uses a cooling technology based on the magnetocaloric effect.

As used herein, the term "magnetocaloric effect" refers to a phenomenon that the temperature of a ferromagnetic material is increased when a strong magnetic field is applied to the ferromagnetic material on the outside, while the temperature of the ferromagnetic material is decreased when the magnetic field is eliminated. This magnetocaloric effect results from an entropy conservation law.

As used herein, the term "aperture" refers to an opening, e.g., a hole, gap, or slit.

As used herein, the term "nozzle" refers to a constriction of a fluid line at or near the exit or termination point from which that fluid is ejected into open space, which generally is at a lower pressure than the pressure in the supply line.

As used herein, the term "refrigeration" refers to the removal of heat from an object or fluid (gas or liquid) at temperatures below room temperature.

As used herein, the term "ultra-low temperature" refers to the temperature range between −50° C. and −150° C.

As used herein, the term "refrigerant" refers to any heat transfer medium, particularly a fluid medium, that is suitable for cooling applications. A refrigerant can be a cryogenic fluid in liquid phase, such as liquid argon or liquid nitrogen.

As used herein, the term "spent refrigerant" refers to refrigerant that has absorbed thermal energy.

As used herein, the term "crude oil" refers to oil recovered from below the earth's surface and that remains untreated or unrefined. Crude oil generally contains a mixture mainly of pentanes and heavier hydrocarbons that may be contaminated with sulphur compounds, is recovered or recoverable at a well from an underground reservoir, and generally is liquid at the conditions under which its volume is measured or estimated. Crude oil is referred to as "heavy" if its density is 900 kg/m$^3$ or greater, and is referred to as "light" or "conventional" if it has a density of less than 900 kg/m$^3$.

As used herein, the term "skim oil" refers to produced oil recovered from water before the water is disposed. Skim oil includes oil carried over with produced water and accumulates in water storage tanks, where it is recovered by skimming it off of the water, optionally is treated, and then sold.

As used herein, the term "bridging fluid" refers to a fluid material, such as a liquid, that can be converted into a solid upon contact with a cryogen or when exposed to cryogenic temperatures, such as a temperature below its freezing point. Exemplary bridging fluids include water, water vapor, methanol, ethanol, isopropanol or mixtures thereof.

As used herein, the term "surface active agent" refers to a chemical, particularly an organic chemical, that when added to a liquid changes the properties of that liquid at a surface. The liquid can be any fluid.

As used herein, the term "surfactant" refers to surface active molecules that absorb at the air/water, oil/water and/or oil/water interfaces, substantially reducing their surface energy. The term "detergent" is often used interchangeably with the term "surfactant." Surfactants generally are classified depending on the charge of the surface active moiety, and can be categorized as cationic, anionic, nonionic and amphoteric surfactants.

Surfactants can be amphiphilic in that they have both hydrophilic (water loving, lipophobic, oleophobic) and hydrophobic (water hating, lipophilic, oleophilic) moieties. The hydrophobic portion of the molecule is non-polar, and can contain aliphatic or aromatic hydrocarbon residues or combinations thereof. The hydrophilic part of a surfactant can include polar groups that can interact strongly with water, hydroxyl, carboxyl and ionic groups. Because of their dual nature, surface active agents are able to form unique surfactant structures (e.g., micelles, mixed micelles, and vesicles) in solution that tends to minimize or eliminate contact between their hydrophobic moieties and the aqueous environment. In some instances, a surface active agent can provide essentially a hydrophobic core to which greases, oils, hydrocarbons can dissolve or solubilize.

The orientation, conformation and density of surface active agent adsorption, e.g., to a hydrocarbon, is dependent on the nature of the surfactant (e.g., anionic, cationic, non-ionic, zwitterionic), the specific surface chemistry, charge and the hydrophobicity/hydrophilicity (contact angle) of the surface adsorbent. Charged surfactant (anionic, cationic) monomers tend to adsorb onto oppositely charged hydrophilic surface sites from aqueous solution due to an electrostatic attraction between the charged head groups and the surface sites.

As used herein, the term "silicone emulsifier" or "silicone surfactant" refers to a surface active agent that includes at least one Si atom. The term "silicone emulsifier" includes organosiloxane polymers containing a polymeric backbone that includes repeating siloxy units that can have cyclic, linear or branched repeating units, e.g., dialkylsiloxy units, such as dimethylsiloxy units. A hydrophilic portion of an organosiloxane generally can be achieved by substitution onto the polymeric backbone of a radical that confers hydrophilic properties to a portion of the molecule. The hydrophilic radical can be substituted on a terminus of the polymeric organosiloxane, or on any one or more repeating units of the polymer. In general, the repeating dialkylsiloxy, such as dimethylsiloxy, units of modified polydimethylsiloxanes are lipophilic in nature due to the methyl groups, and confer lipophilicity to the molecule. In addition, longer chain alkyl radicals, hydroxy-polypropyleneoxy radicals, or other types of lipophilic radicals can be substituted onto the siloxy backbone to confer further lipophilicity and organocompatibility. If the lipophilic portion of the molecule is due in whole or part to a specific radical, this lipophilic radical can be substituted on a terminus of the polymer, or on any one or more repeating units of the polymer.

As used herein, the term "upstream" refers to a position of an object relative to fluid flow that is in the direction toward a reference point. For example, an object that is positioned in the flow circuit upstream of a heat exchange unit is on the side of the heat exchange unit that fluid enters into the heat exchange unit.

As used herein, the term "downstream" refers to a position of an object relative to fluid flow that is in the direction away from a reference point. For example, an object that is positioned in the flow circuit downstream of a heat exchange unit is on the side of the heat exchange unit that fluid exits the heat exchange unit.

B. THERMAL ENERGY TRANSFER SYSTEM (CHILLING SYSTEM)

The presently disclosed methods and systems provide the ability to rapidly remove thermal energy and thereby cool and/or freeze a thermally conductive metal conduit and the fluid it contains using a thermal transfer device, such as a liquid refrigerant-containing heat exchange unit, a thermoelectric module, a Peltier device or a magnetic thermal transfer device to provide a rapid cooling of the conduit over a wide range of cooling rates and also hold the temperature of the conduit at any prescribed temperature where specified. An exemplary embodiment of the thermal energy transfer system 1 (chilling system) is shown in FIG. 1. The chilling system includes a thermal transfer device 9 in thermal communication with conduit 2 and the thermal transfer device 9 and conduit 2 are thermally isolated from the external environment by a thermally insulating device, jacket 30. The system includes one or more heating elements 5 disposed on the conduit 2 and one or more thermal monitoring devices 15 on or within the thermal transfer device 9 and on the conduit 2. The thermal energy transfer system 1 is in communication with a computer module 55. The conduit can be in any orientation with respect to the ground. For example, the conduit can be perpendicular to the ground, e.g., the general orientation of a producing oil well. The conduit also can be parallel to the ground, e.g., the general orientation of an over-ground transfer pipeline. The conduit also can be oriented at any angle with respect to a surface, with a flat ground considered to be horizontal at zero degrees of incline. For example, the conduit can be oriented between 1° and 89° from horizontal, such as 10°, 15°, 20°, 25°, 30°, 35°. 40°, 45°, 50°, 55°, 60°, 65°, 70°, 75°, 80° or 85° from horizontal.

Provided herein is a chiller or freezing system for extracting thermal energy from a conduit in order to freeze at least a portion of the fluid contents therein, where the system includes a heat exchange unit in intimate thermal contact with a conduit, a liquid refrigerant source, an intake circuit coupled to the liquid refrigerant source and adapted for providing a uniform flow of liquid refrigerant to the heat exchange unit, an exhaust circuit for removing the liquid refrigerant from the heat exchange unit, and optionally a control system. The exhaust circuit of the freezing or chilling system is adapted to vent the liquid refrigerant at some distance away from the conduit, and the control system is adapted to adjust the flow rates of the cryogen source in the intake circuit and any cryogen gas in the exhaust circuit to adjust the temperature of the cold cryogen (liquid or gas) delivered to the cooling chamber in response to a desired cooling rate of the heat exchange unit and measured temperatures within the cooling chamber. In this manner, a uniform, unidirectional, and laminar flow of temperature adjusted cryogenic fluid (cold liquid or gas) is delivered to the heat exchange unit to uniformly extract thermal energy from the conduit and/or its contents.

In one configuration, the system for controlled removal of thermal energy from a thermal conducting metal conduit provided herein includes a thermal transfer device adapted to fit to the surface of a conduit with sufficient thermal intimacy that thermal energy can by transferred between the conduit and the heat exchange unit, and a means for thermally isolating the application zone of thermal transfer device and the conduit from the environment. The system includes thermal monitoring devices that can be attached to one or more points of the conduit to monitor a thermal gradient and can be included at the interface between the thermal transfer device and the conduit to monitor the temperature at the interface. The system can include a computer that controls or is in communication with the thermal transfer device and the thermal monitoring devices. The chilling system is designed for controlled temperature exchange between a conduit and a thermal transfer device such that the thermal gradient and/or rate of thermal exchange is controlled in order to minimize or eliminate thermal stress on the conduit. Thermal stress is a product of the total thermal contraction resulting from temperature changes and the modulus of elasticity of the material from which the conduit is fabricated. Since the temperature gradient caused by the sub-zero temperatures of the liquid refrigerant increases with increasing thickness of the conduit, thicker conduits exhibit a greater susceptibility to thermal stress failures than do conduits constructed of thin but strong material. As described below, the chilling system can include, and in exemplary embodiments does include, other components.

1. Thermal Transfer Device

In some embodiments of the device and systems provided herein, a thermal transfer device includes a heat exchange unit that is adapted to fit to the surface of a conduit with sufficient thermal intimacy that thermal energy can by transferred between the conduit and the heat exchange unit. In some embodiments, the thermal transfer device includes a thermally conducting refrigerant and a refrigerant supply module where the refrigerant supply unit and the heat exchange unit are in fluid communication. In some embodiments, the thermal transfer device is electric. In some embodiments, the thermal transfer device is magnetic.

a. Liquid-Containing Heat Exchange Unit

Figure 2:
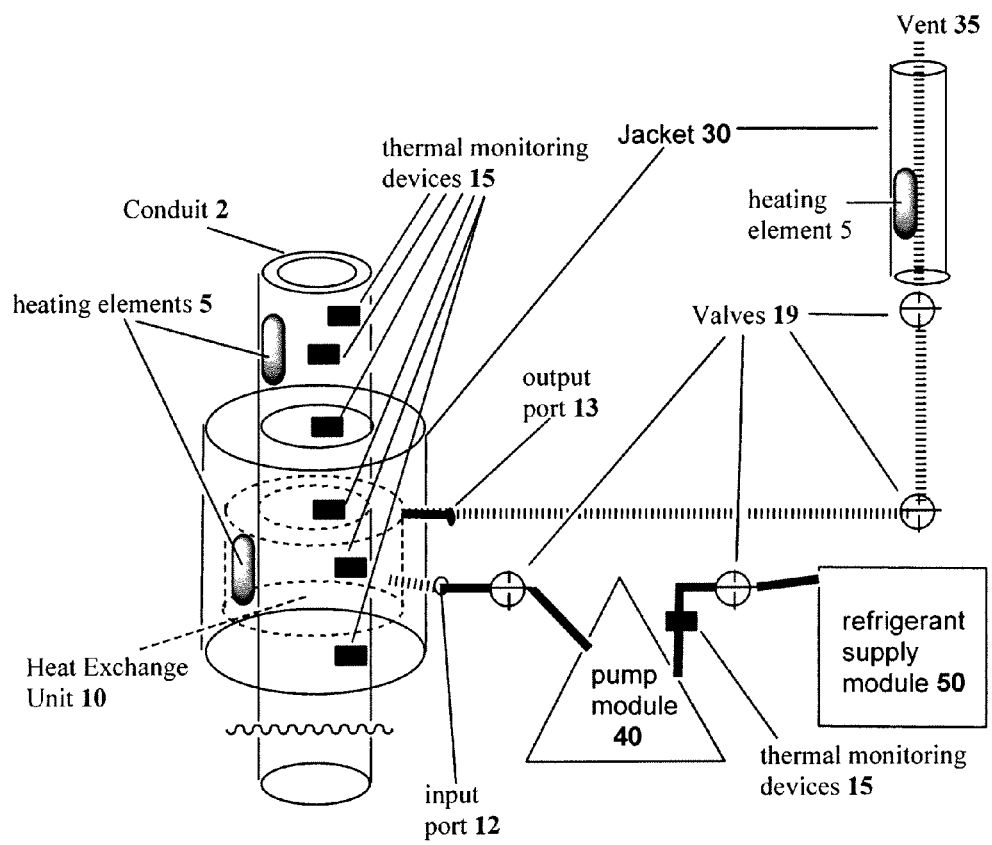
FIG. 2 is a schematic illustration of an embodiment of a thermal energy transfer system that includes a liquid-containing heat exchange unit.
Figure 3:
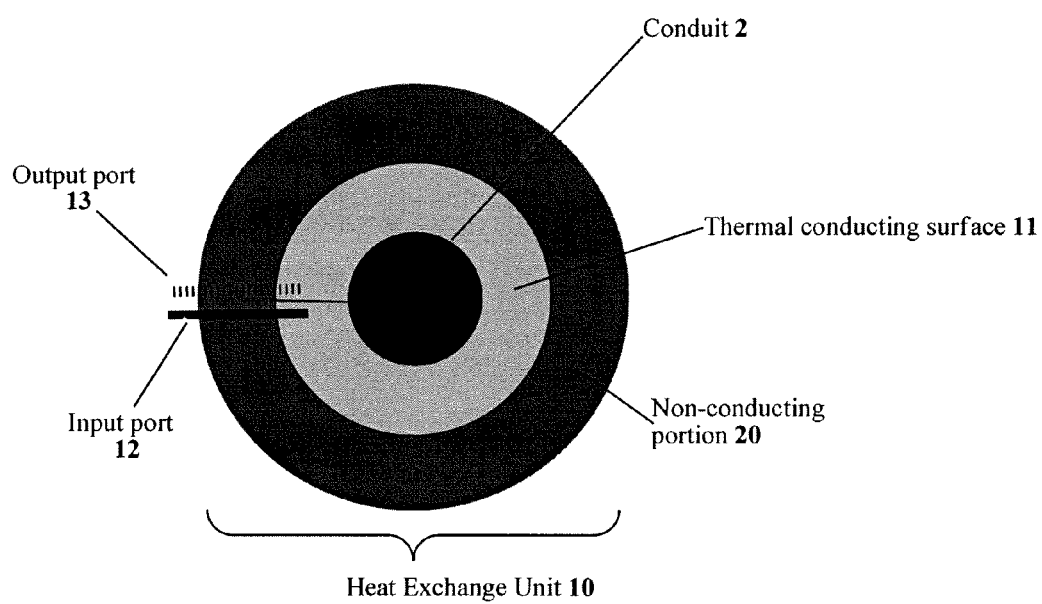
FIG. 3 is a top view of a heat exchange unit of FIG. 2.
Figure 4A:
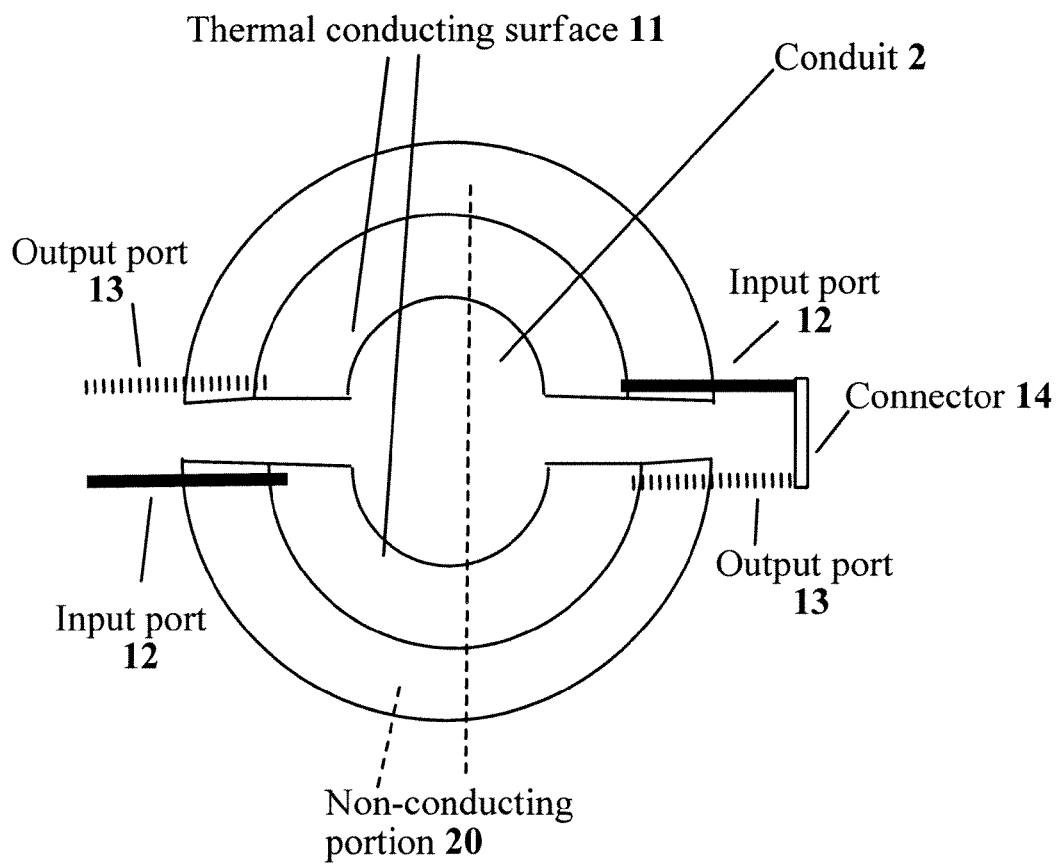
FIGS. 4A and 4B show a detailed top view of a cut-away portion of the heat exchange unit of FIG. 2 depicting the interconnection of two segments of a heat exchange unit using a connector.
Figure 4B:
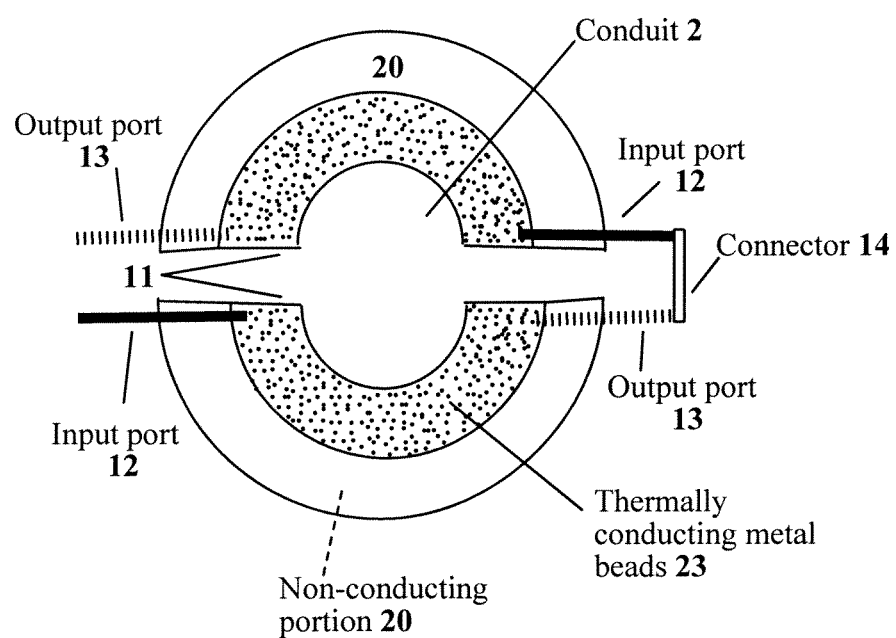

In some embodiments, the anti-thermal chilling system includes a refrigerant liquid in an open-loop system, while in other embodiments it includes a refrigerant liquid in a closed-loop system. An exemplary chilling system that includes a liquid-containing heat exchange unit is shown in FIG. 2. The systems and devices described herein include one or more heat exchange modules each having a thermal non-conducting surface and a thermal conducting portion, where the thermal conducting surface(s) are adapted to be in intimate thermal communication with the conduit. A top view of an exemplary heat exchange unit 10 is shown in FIG. 3. The devices also include a refrigerant liquid. In some embodiments, the refrigerant liquid is a slurry including a solvent and liquified gas or a solid gas, such as dry ice (solid $CO_2$). In some embodiments, the refrigerant liquid includes a liquified gas, such as nitrogen, helium, argon, neon, xenon, carbon dioxide or combinations thereof. In some embodiments, the device also includes a compressor and/or evaporator. In some embodiments, the device includes one or more pumps for circulating and/or transporting the refrigerant liquid. The devices include tubing for fluid connection of the heat exchange module with a refrigerant supply module and/or compressor and/or pumps to allow for flow of the refrigerant liquid, and can include one or more flow-control metering valves that control the flow of refrigerant liquid. In some embodiments, a computer with a computer processor controls operation of the one or more flow-control metering valves and/or pumps of the system.

In some embodiments, the thermal transfer device includes a heat exchange unit. Heat exchange units are well known in the art (e.g., see U.S. Pat. Nos. 7,441,412; 7,407,600; 7,378,065; 7,272,951; 7,263,852; 7,069,981; 7,0287,68; 7,013,668; 6,185,953; 5,787,722 and 5,582,239). In some embodiments, the thermal transfer device includes a heat exchange unit containing a thermally conducting refrigerant and a refrigerant supply module where the refrigerant supply unit and the heat exchange unit are in fluid communication.

i. Pumps

The thermal transfer device can include a pump module for moving the refrigerant from the refrigerant supply unit to the heat exchange unit. In some embodiments the thermal transfer device is configured to include a pump between the refrigerant supply module and the intake port of the heat exchange unit. The thermal transfer device also can be configured to include a pump module between the output port of the heat exchange unit and the exit or vent tube of the system. The system also can be configured to include a pump module that pressurizes the refrigerant in the refrigerant supply module and thereby pump the refrigerant through the system. The system also can be configured to include a combination of pump modules, such as between the heat exchange unit and the refrigerant supply unit and between the heat exchange unit and the discharge tube.

ii. Heat Exchange Units

The devices and systems that include a liquid refrigerant can include a heat exchange unit 10. The heat exchange unit 10 can include a thermal conducting surface 11 that is in intimate thermal contact with the outer surface of the conduit, and a thermal non-conducting portion 20 that covers all exposed surfaces of the thermal conducting surface 11 that are not in thermal contact with the conduit. The non-conducting portion 20 can be constructed from or contain a thermal insulating material that thermally insulates the conducting portion 11 from the environment. FIGS. 4A, 4B, 5A and 5B show an exploded top view of exemplary heat exchange units 10.

The heat exchange unit can be a single continuous apparatus that encircles or envelops the conduit (such as shown in FIG. 3) or can comprise 2, 3, 4 or more interconnecting segments, such as arcs, that when assembled and interconnected, substantially or completely encircle or envelop the outer diameter of the conduit (such as shown in FIGS. 4A, 4B, 5A and 5B). When the conduit is a pipe with a circular shape, the heat exchange unit can be a single complete circular apparatus, two interconnection semi-circular segments or include several arc segments that when connected or interconnected encircle the pipe.

An example of a heat exchange unit is shown in FIG. 3. As shown in the figure, the heat exchange unit 10 includes a thermal conductor surface 11 that is attached to or in thermal communication with a conduit 2 so that its surface 11 is in thermal communication with the conduit (able to exchange thermal energy with the conduit). The unit includes an input port 12 for accepting liquid refrigerant into the heat exchange unit and an output port 13 for discharging liquid refrigerant from the heat exchange unit. The thermal conductor surface 11 can be made of any thermally conducting material known to those skilled in the art. Examples of such materials include copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. In some embodiments, the thermally conductive material can be formed of a single metallic conductor or multiple metallic conductors. In some embodiments, the solid thermal conductors can include substantially pure copper, copper alloys, substantially pure aluminum, aluminum alloys, substantially pure silver, silver alloys, substantially pure gold, and gold alloys and mixtures thereof.

Figure 6:
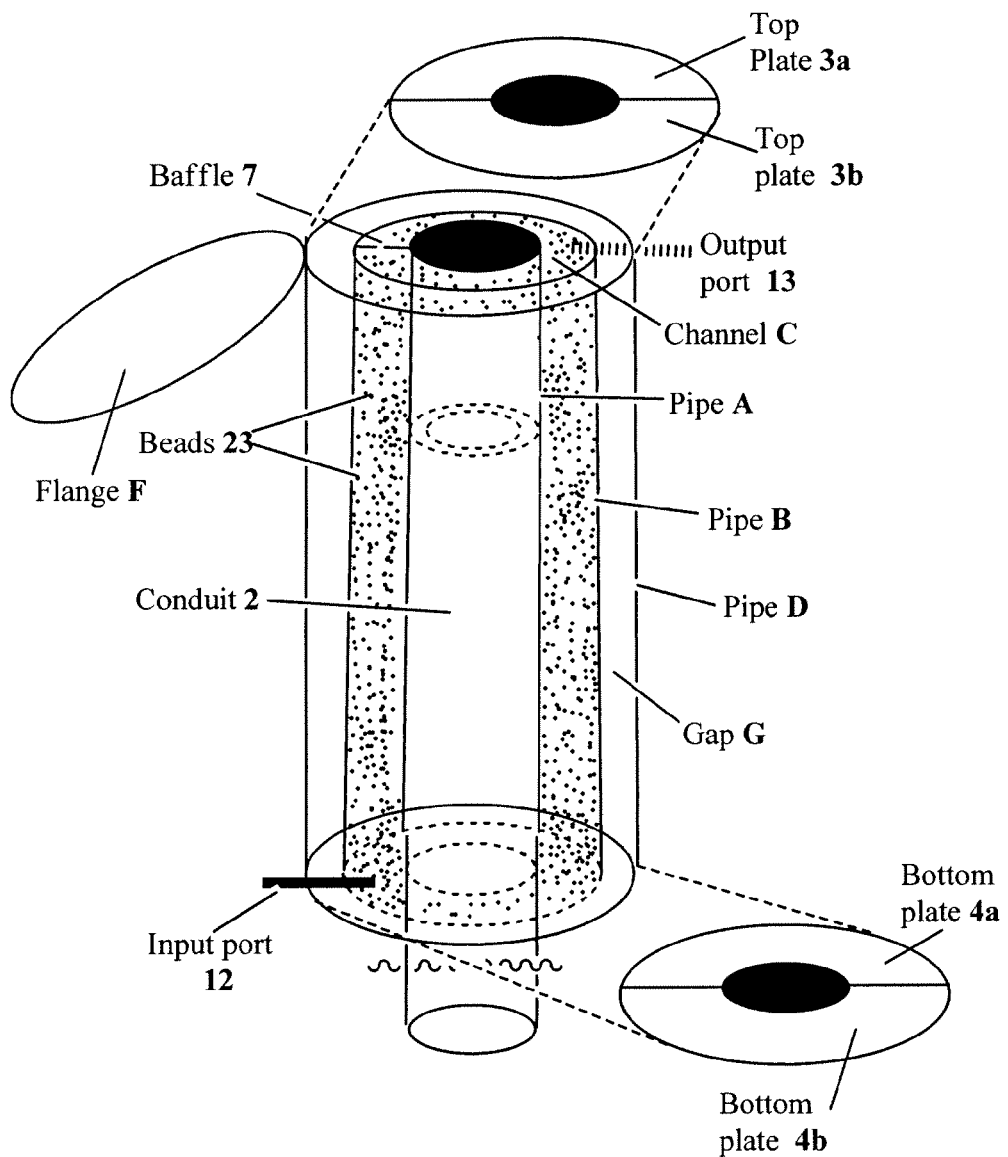
FIG. 6 is a schematic illustration of an embodiment of a liquid-containing heat exchange unit that is fabricated from concentric pipes.

The thermal conductor surface 11 can include a channel C through which the refrigerant fluid flows. An exemplary embodiment is shown in FIG. 6. Channel C connects an input port 12 to an output port 13. Intake port 12 accepts refrigerant liquid from the refrigerant supply module or from the output port 13 or another segment of the heat exchange unit. Output port 13 discharges refrigerant liquid from the heat exchange unit or segment thereof that has traveled through the exchange unit in channel C. Two or more input ports 12 and two or more output ports 13 can be included.

Figure 5A:
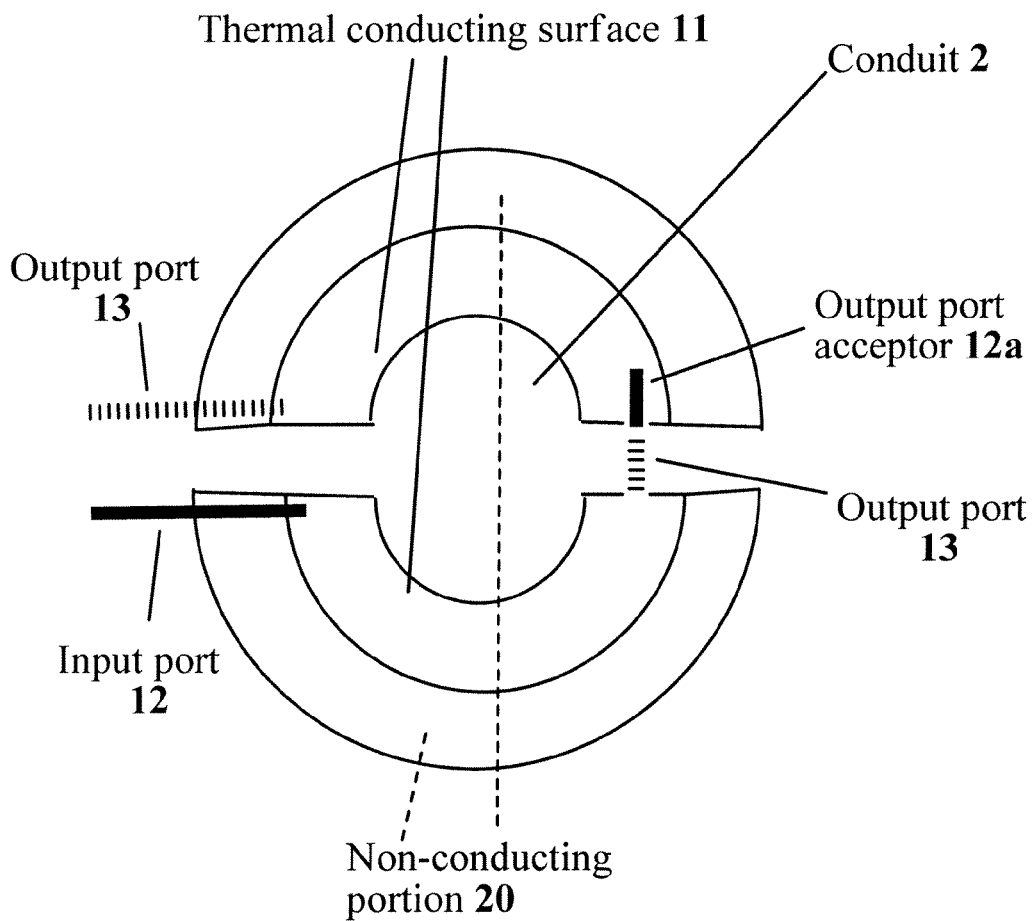
FIGS. 5A and 5B show a detailed top view of a cut-away portion of the heat exchange unit of FIG. 2 depicting the direct interconnection of two segments of a heat exchange unit.
Figure 5B:
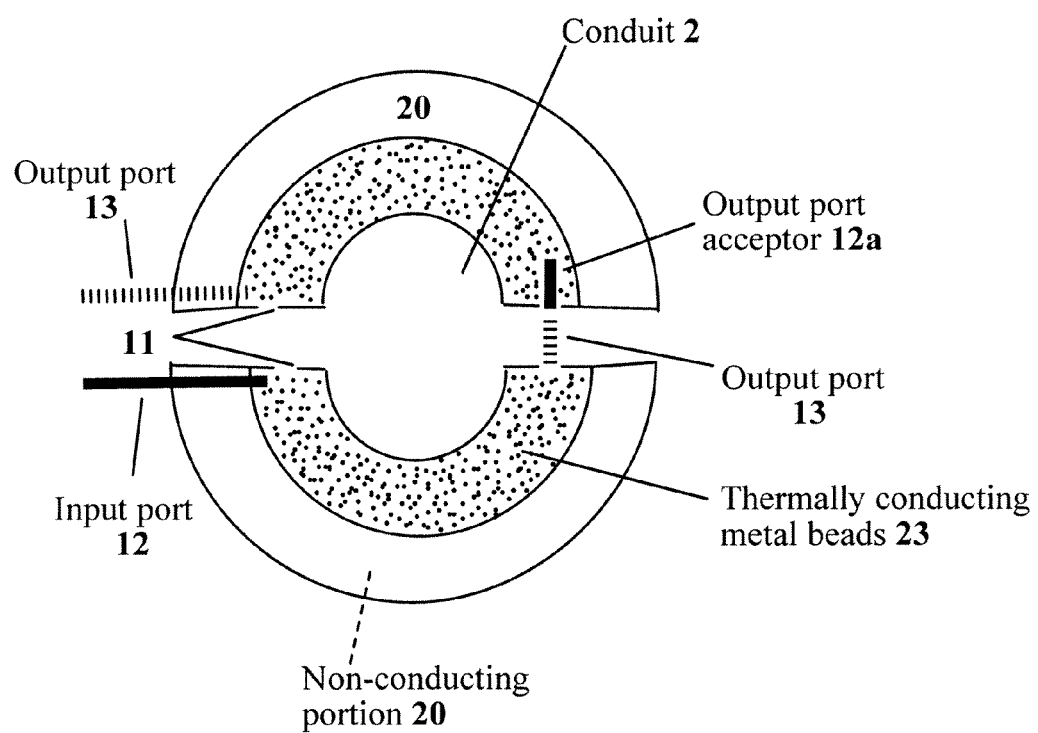
Figure 7:
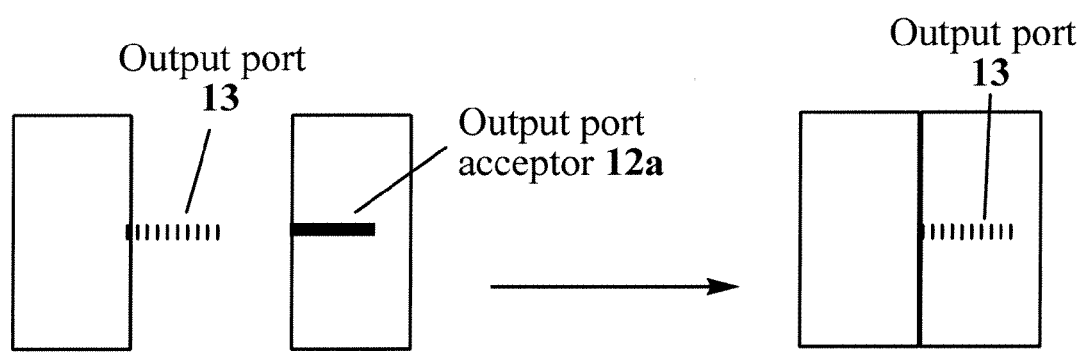
FIG. 7 is a detailed side view of a cut-away portion of the heat exchange unit of FIG. 2 depicting the direct interconnection of two segments of a heat exchange unit.
Figure 8:
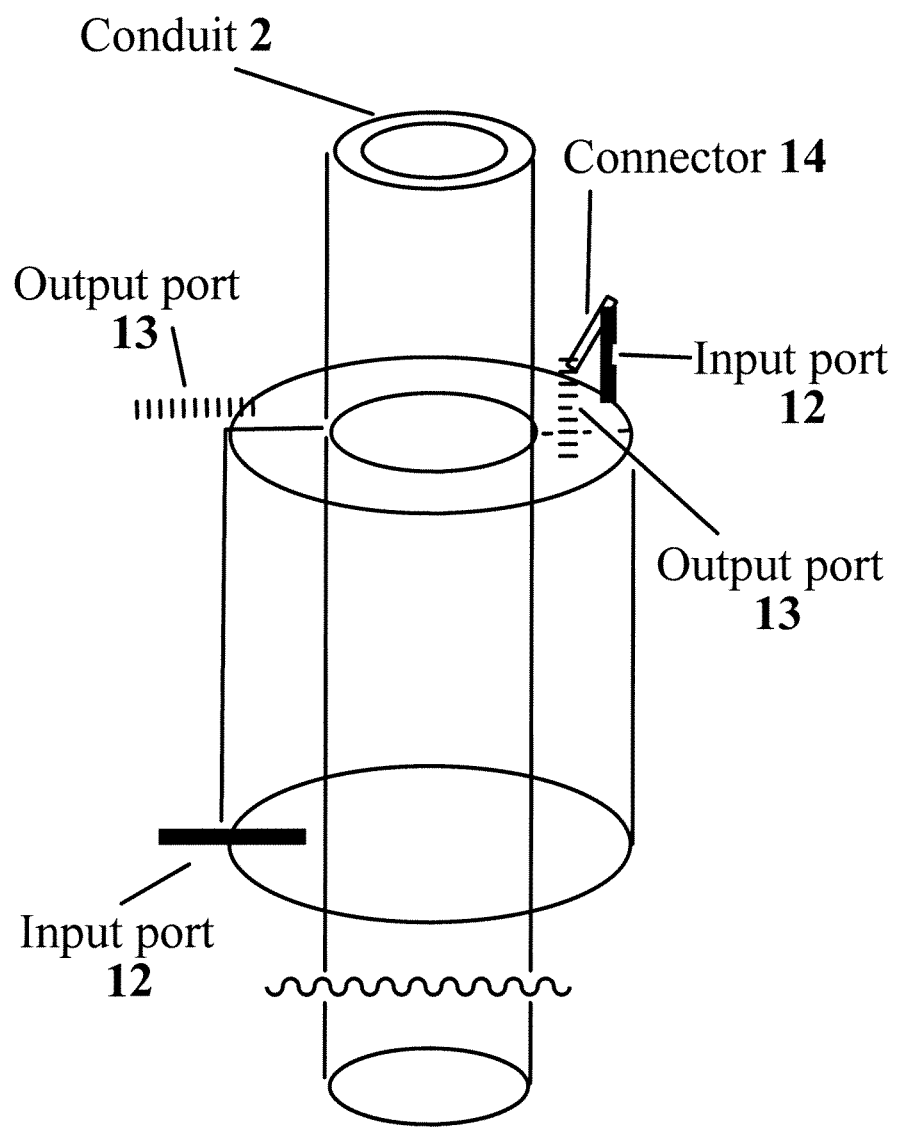
FIG. 8 is a schematic illustration of a heat exchange unit of FIG. 2 depicting the interconnection of two segments of a heat exchange unit using a connector.

In some embodiments, the output port 13 of one unit of the heat exchange unit can be configured to be directly connected to the input port 12 of another segment of the heat exchange unit, for example as shown in FIGS. 5A, 5B and 7. In some embodiments, output port 13 of one segment of the heat exchange unit can be configured to be connected to the input port 12 of another segment of the heat exchange unit via tubing or piping, as shown in FIG. 8 via connector 14, which can include tubing or piping. In some embodiments, a quick-connect connection can be included on each of input port 12 and output port 13 to allow for quick set up or replacement of segments of the heat exchange unit or one or more heat exchange units. Quick connect mechanisms are well known in the art (e.g., see U.S. Pat. No. 4,597,699). In some embodiments, the input port 12 and output port 13 can include valves that prevent elements of the environment from entering the segments of the heat exchange units. For example, the valves of the input port 12 and output port 13 can be designed to prevent air or water from entering the segments of the heat exchange units while the units are being installed around the conduit.

Figure 13:
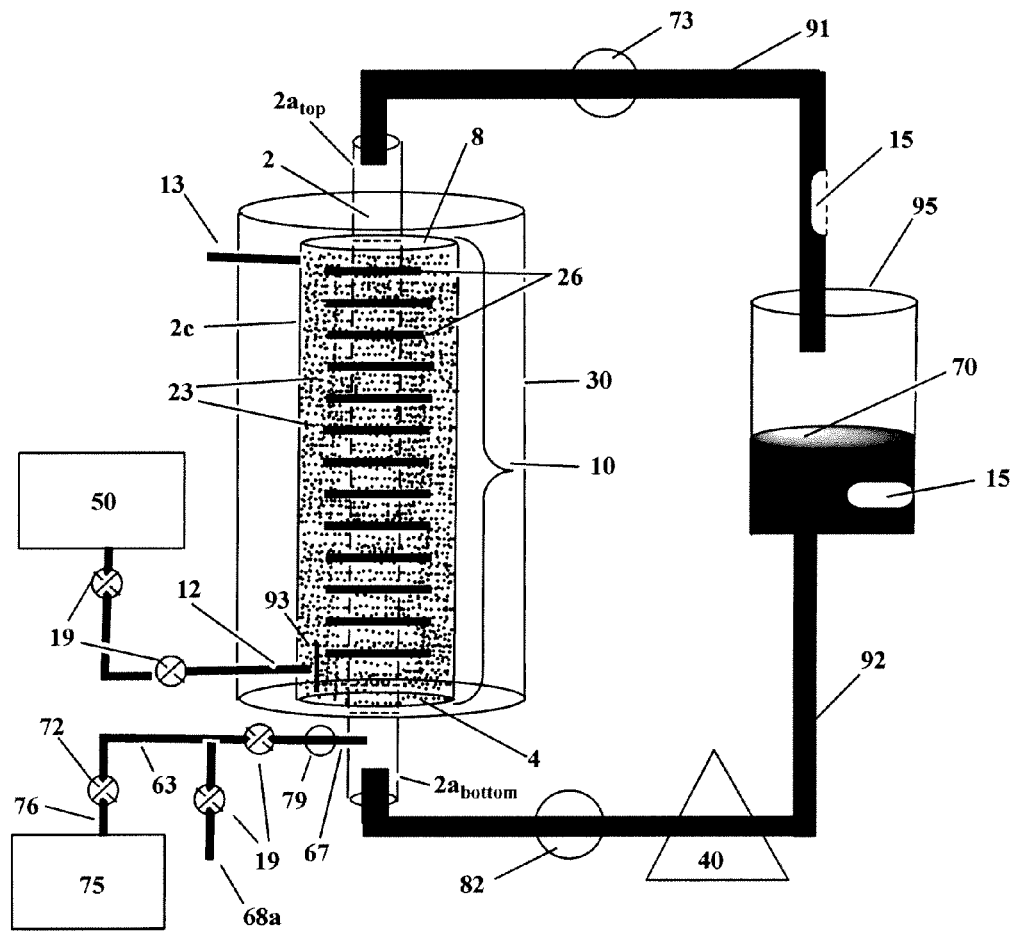
FIG. 13 is a side view of an example of a vertical embodiment of a cryo-thermodynamic valve system.

In some embodiments, the conduit within the heat exchange unit 10 can be fitted with one or more thermally conducting fins (26 in FIG. 13). The thermal conducting fins 26 can be positioned at any location near to or in thermal contact with the conduit 2 to increase the heat conducting area of the thermal exchange unit, thereby allowing the thermal energy of the conduit and its contents to more rapidly transfer to the refrigerant. The thermal conducting fins 26 can be positioned axially or longitudinally. In some embodiments, the thermal conducting fins 26 are in thermal communication with the conduit 2 and facilitate energy transfer from conduit 2 to the refrigerant within the heat exchange unit 10. In some embodiments, the thermal conducts fins 26 are notched or perforated or both to prevent trapped bubbles or formation of a dead space.

In some embodiments, the thermal conducting fins 26 can be configured longitudinally about the conduit 2. The length of the thermal conducting fins 26 can be varied, and can include fins that extend the length of the space within the heat exchange unit 10, thereby creating one or more channels. One or more of the so formed channels can serve as a separate circuit for the refrigerant or cryogen to pass through the heat exchange unit 10. In some embodiments, multiple such channels are so formed, and the channels can be adjacent or staggered around the radius of the inner tubular or conduit. The multiple channels formed by the thermal conducting fins 26 so configured can be used as separate circuits for the refrigerant or cryogen to pass through the heat exchange unit 10 and thus allow greater control of the freezing and/or warming and/or refreezing process within the heat exchange unit 10.

In some embodiments, the thermal conducting fins 26 can be configured radially about the conduit 2. The length of the thermal conducting fins 26 can be varied, and can include fins that extend the length of the space within the heat exchange unit 10, thereby creating one or more channels. One or more of the so formed channels can serve as a separate circuit for the refrigerant or cryogen to pass through the heat exchange unit 10. In some embodiments, multiple such channels are so formed, and the channels can be adjacent or staggered along the length of the inner tubular or conduit. The multiple channels formed by the thermal conducting fins 26 so configured can be used as separate circuits for the refrigerant or cryogen to pass through the heat exchange unit 10 and thus allow greater control of the freezing and/or warming and/or refreezing process within the heat exchange unit 10.

In some embodiments, the heat exchange unit includes filings, turnings, shavings, pellets or beads of a thermally conductive metal. For example, the space between the interior wall of the heat exchange unit and the conduit can include or be filled with filings, turnings, shavings, pellets or beads of a thermally conductive metal. The thermally conductive filings, turnings, shavings, pellets or beads can reduce the Leidenfrost effect, particularly in a cryogenic liquid, such as liquid argon, nitrogen, helium, oxygen or compressed gas. The Leidenfrost effect is a phenomenon observed in liquids in contact or in very close contact with a mass significantly hotter than the liquid's boiling point. When the liquid is in close proximity to a mass significantly hotter than the liquid's boiling point, the liquid boils and produces an insulating vapor layer that keeps that liquid from boiling rapidly. Including the filings, turnings, shavings, pellets or beads of a thermally conductive metal reduces or eliminates the Leidenfrost effect.

In embodiments of the heat exchange unit that include filings, turnings, shavings, pellets or beads of a thermally conductive metal, the filings, turnings, shavings, pellets or beads of a thermally conductive metal can be retained within the heat exchange unit using retention devices known in the art. For example, the filings, turnings, shavings, pellets or beads of a thermally conductive metal can be retained in the unit by including a screen having a mesh size smaller than the filings, turnings, shavings, pellets or beads so that the filings, turnings, shavings, pellets or beads are prevented from passing across the screen. The screen can be made of any material having the structural integrity strong enough to withstand deformation at the operating temperatures and pressures of the heat exchange unit. For example, one or more layers of stainless steel screen mesh can be used to retain the filings, turnings, shavings, pellets or beads within the heat exchange unit and prevent them from being carried out of the unit by the cryogen or refrigerant.

The heat exchange unit can be of any diameter or length. The selection of the diameter and length of the heat exchange unit can be predicated on the dimensions of the conduit to which the unit is to be attached and from which the heat exchange unit is to extract thermal energy or the rate of flow of fluid flowing through the conduit or combinations thereof. For example, the outer diameter of tubing and piping encountered in many well applications can vary from 1 inch to 500 inches or more. The length of a single riser or flow tubular in some applications can vary from about 5 feet to about 100 feet or more, and many risers or flow tubulars can be interconnected, resulting in a pipeline that can span many thousands of feet or miles. A typical heat exchange unit can be of a length that is any portion of a riser or flow tubular, including 10%, 15%, 20%, 25%, 30%, 35%, 40%, 45%, 50%, 55%, 60%, 65%, 70%, 75%, 80%, 85%, 90%, 95% or 99%. In some embodiments, the heat exchange unit has a length of 2 feet, 3 feet, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, 21 feet, 22 feet, 23 feet, 24 feet, 25 feet, 26 feet, 27 feet, 28 feet, 29 feet, 30 feet, 31 feet, 32 feet, 33 feet, 34 feet, 35 feet, 36 feet, 37 feet, 38 feet, 39 feet, 40 feet, 41 feet, 42 feet, 43 feet, 44 feet, 45 feet, 46 feet, 47 feet, 48 feet, 49 feet, 50 feet, 55 feet, 60 feet, 65 feet, 70 feet, 75 feet, 80 feet, 85 feet, 90 feet, 95 feet, 100 feet, 200 feet, 300 feet, 400 feet, 500 feet, 600 feet, 700 feet, 800 feet, 900 feet, 1000 feet, 2000 feet, 3000 feet, 4000 feet, 5000 feet or a length between 2 feet and 5000 feet.

The inner dimension of the heat exchange unit generally is about the same dimension of the conduit to which it is attached and in thermal communication. In some embodiments, the inner dimension of the heat exchange unit is the same as the conduit because the conduit forms the inner dimension of the heat exchange unit. In some embodiments, the heat exchange unit includes an inner conduit, which is the conduit that carries, transports or conveys a fluid when connected to other conduits or tubulars; and an outer conduit of a larger diameter or dimension than the inner conduit so that a gap or channel between the inner conduit and the outer conduit is formed The dimension of the outer conduit of the heat exchange unit is selected to provide a channel that can be filled with thermally conductive materials provided as fibers, threads, filings, turnings, spurs, shavings, pellets, shot, microbeads, beads or fragments through which the refrigerant or cryogen passes when it circulates through the heat exchange unit.

The particle size and distribution of fibers, threads, filings, turnings, spurs, shavings, pellets, shot, microbeads, beads or fragments of thermally conductive materials can be selected to modulate the filled volume or the number, size and distribution of void areas in the channel through which refrigerant or cryogen can pass. Particle packing is a characteristic trait of materials based on the size, shape and particle size distributions. A uniform particle size distribution can result in a uniform or mostly uniform distribution of void areas while maintaining the intimate contact between the particles. Materials having a distribution of particle sizes can be selected that contain a number of particles sized to fill some of the those voids created by the largest particle size component of the blend to reduce the number, size or distribution of voids formed by the particles in the heat exchange device, thereby allowing selection of different flow characteristics through the device. Mathematical models for making blends of materials using a multimodal mix of materials are available. The particles can be packed into the heat exchange unit using any method know in the art, including, e.g., pouring the particles into the unit or uniformly distributing the particles, such as by use of a particle loader, as described in U.S. Pat. No. 5,324,159.

The inner dimension of the heat exchange unit can be between 1 inch to 500 inches or more. In some embodiments, the heat exchange unit includes a thermal conducting surface 11 which is in thermal contact with the conduit to which the heat exchange unit is attached. The inner dimension of the thermal conducting surface 11 is such that it is in thermal communication with the conduit from which thermal energy is to be extracted. Hence, the skilled artisan can select the appropriate inner dimension of the thermal conducting surface 11 based on the outer dimension of the conduit to which the heat exchange unit is to be connected. As an example, in an embodiment where the conduit is a pipe having an outer diameter of about 3 inches, a diameter of a thermal conducting surface is selected so that it fits snuggly to the outer surface of the conduit and is in thermal communication with the conduit, such as having an inner diameter of about 3 inches.

The outer diameter of the heat exchange unit can be of any dimension that results in a channel between the inner surface and the outer surface of the heat exchange unit. For example, the outer diameter of the heat exchange unit can be selected so that the resulting channel formed between the inner surface and the outer surface of the heat exchange unit was a width that is between about 0.05 inch to about 500 inches. In some embodiments, the channel formed between the inner surface and the outer surface of the heat exchange unit has a width that is between about 0.1 inches to about 100 inches. In some embodiments, the channel formed between the inner surface and the outer surface of the heat exchange unit has a width that is between about 0.2 inches to about 50 inches. In some embodiments, the channel formed between the inner surface and the outer surface of the heat exchange unit has a width that is between about 0.4 inches to about 40 inches. In some embodiments, the channel formed between the inner surface and the outer surface of the heat exchange unit has a width that is between about 0.5 inches to about 30 inches. In some embodiments, the channel formed between the inner surface and the outer surface of the heat exchange unit has a width that is between about 0.6 inches to about 25 inches. In some embodiments, the channel formed between the inner surface and the outer surface of the heat exchange unit has a width that is between about 0.1 inches to about 10 inches. In some embodiments, the channel formed between the inner surface and the outer surface of the heat exchange unit was a width that is between about 0.8 inches to about 8 inches. In some embodiments, the channel formed between the inner surface and the outer surface of the heat exchange unit has a width that is between about 0.5 inches to about 5 inches. In some embodiments, the channel formed between the inner surface and the outer surface of the heat exchange unit has a width that is between about 1 inch to about 4 inches. In some embodiments, the width of the channel within the heat exchange unit is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.5, 11, 11.5, 12, 12.5, 13, 13.5, 14, 14.5, 15, 15.5, 16, 16.6, 17, 17.5, 18, 18.5, 19, 19.5, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490 or 500 inches.

In some embodiments, the outer dimension of the heat exchange unit is selected so that the width of the channel formed between the inner surface and the outer surface of the heat exchange unit is between about 10% to about 500% of the inner diameter of the heat exchange unit. For example, in embodiments where the conduit is a pipe and the inner diameter of the heat exchange unit attached to the pipe is 5 inches, the outer dimension of the heat exchange unit can be between about 5.5 inches and about 25 inches, producing a channel having a width of between about 0.5 and 20 inches.

In some embodiments, the outer dimension of the heat exchange unit is selected so that the width of the channel formed between the inner surface and the outer surface of the heat exchange unit is between about 10% to about 300% of the inner diameter of the heat exchange unit. For example, in embodiments where the conduit is a pipe and the inner diameter of the heat exchange unit attached to the pipe is 5 inches, the outer dimension of the heat exchange unit can be between about 5.5 inches and about 15 inches, producing a channel having a width of between about 0.5 and 10 inches.

In some embodiments, the outer dimension of the heat exchange unit is selected so that the width of the channel formed between the inner surface and the outer surface of the heat exchange unit is between about 10% to about 150% of the inner diameter of the heat exchange unit. For example, in embodiments where the conduit is a pipe and the inner diameter of the heat exchange unit attached to the pipe is 5 inches, the outer dimension of the heat exchange unit can be between about 5.5 inches and about 12.5 inches, producing a channel having a width of between about 0.5 and 7.5 inches. As a further example, in embodiments where the conduit is a pipe and the inner diameter of the heat exchange unit attached to the pipe is 10 inches, the outer dimension of the heat exchange unit can be between about 11 inches and about 25 inches, producing a channel having a width of between about 1 and 15 inches. In some embodiment, the outer dimension of the heat exchange unit is selected so that the width of the channel formed between the inner surface and the outer surface of the heat exchange unit is between about 25% to about 100% of the inner diameter of the heat exchange unit.

The heat exchange unit can include one or more thermal monitoring devices 15 that can be attached to points along the conduit (see FIG. 2) in order to monitor thermal gradients induced in the conduit. The heat exchange unit also can include thermal monitoring devices 15 at the intake and output ports or throughout the path of refrigerant flow through the heat exchange device in channel 14 for determination of the temperature of the refrigerant fluid as it flows through the heat exchange unit. In addition to cooling the conduit in order to form a thermal plug, such as a solid mass of ice or oil, the heat exchange unit can be used to controllably warm the conduit to ambient temperatures after repair of the conduit in order to melt the plug and restore flow while minimizing thermal stress to the conduit. Warming can be achieved by flowing a thermal conducting liquid of a higher temperature than the refrigerant through the heat exchange unit. In some embodiments, the heat exchange unit can include heating elements 16 that when engaged and activated can increase the temperature of the conduit at the site of the plug, thereby melting the plug or releasing thermal plug from adhesion to the conduit, thereby restoring flow through the conduit.

In some embodiments, the heat exchange unit includes one or more heating channels that traverses a portion of the length or the full length of the heat exchange unit. The heating channel can be used to introduce a fluid, such as a liquid gas, to provide thermal energy to the conduit in the vicinity of the heating channel to provide heat unilaterally or directionally to the plug of frozen fluid formed within the conduit. This directed application of thermal energy to the conduit in proximity to the frozen plug therein allows for directed melting of the plug, such as to form a channel through the plug through which liquid fluid can flow. The fluid that can be introduced through the heating channel can be a liquid or gas. The flow of fluid through the heating channel is modulated so that thermal energy can be transferred from the fluid in the heating channel to the conduit and/or the plug of frozen fluid without the fluid becoming frozen. In some embodiments, the fluid that is introduced through the heating channel is heated.

In some embodiments, the heating channel(s) can include a means of heating the channel to provide heat unilaterally or directionally to the plug of frozen fluid formed within the conduit. This directed application of thermal energy to the conduit in proximity to the frozen plug therein allows for directed melting of the plug, such as to form a channel through the plug through which liquid fluid can flow. This prevents launching the frozen plug through the conduit, and permits ae controlled restoration of flow through the conduit. The means of heating the heating channel can include any heating unit known in the art. For example, one or more discrete, spaced-apart heating units, such as described in U.S. Pat. No. 4,849,611 can be positioned throughout the channel, thereby allowing directed thermal energy to be applied to the conduit adjacent to the frozen plug within. Other heating devices also can be positioned within the channel, such as Curie temperature heaters, described in U.S. Pat. No. 7,461, 691, or temperature limited heaters, as described in U.S. Pat. Pub. No. 2005-0092483, or conductor-in-conduit heat sources as described in U.S. Pat. Pub. No. 2004-0020642, or heater strips, as described in U.S. Pat. No. 3,793,716, or resistive heating strips, as described in U.S. Pat. No. 4,238, 640. Other heating elements that can be used to heat the heating channel include those described in U.S. Pat. Nos. 7,066,730; 4,238,640; 3,971,416; and 3,814,574. Other exemplary heating devices that can be included within the heating channel include Positive Thermal Coefficient ceramic heaters, thick film ceramic heaters, resistance wire or resistance ribbon heating devices, such as those containing nickel alloys, such as Nichrome 80/20 or Cupronickel (CuNi) or FeCrAl alloys, such as Kanthal. The resistance wire or resistance ribbon heating devices can be enclosed in a ceramic insulating binder (such as $TiO_2$, MgO, diatomaceous earth or alumina powder or combinations thereof). Commercial embodiments of such heating devices are available (Calrod™ heaters), which could be configured to conform to the size and shape of the heating channel.

The heating channel can be configured so that it is in thermal communication with the conduit but thermally isolated from the heat exchange unit. For example, the portion of the heating channel directed toward the heat exchange unit can be separated therefrom by using a thermally non-conducting material. Any thermally non-conducting material known to those of skill in the art can be used. Example of materials that are non-thermally conducting include acrylic glass, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester and combinations thereof and solid thermal insulators, such as silicon nitride ($Si_3N_4$), calcium silicate, low-density, high-purity silica ceramic, porous alumina, borosilicate glass, silica aerogel (foamed glass), ceramic/glass composites, fibrous refractory composite insulation, polyurea based aerogel, graphite, mullite, glass-filled silicone polymers or combinations thereof.

The heat exchange unit can include a thermally non-conducting portion 20, as shown in FIG. 3. The thermally non-conducting portion 20 can be fabricated from or include a thermally non-conducting material. In some embodiments, the thermally non-conducting portion 20 includes a casing that contains a thermally non-conducting material. Any thermally non-conducting material known to those of skill in the art can be used. Example of materials that are non-thermally conducting include gases that have a lower thermal conductivity than air, such as butane, krypton, trichloromethane, xenon, 1,1,2-trichloro-trifluoroethane, 1,2-dichlorotetrafluoroethane, tetrafluoroethane, argon, carbon dioxide, diethyl ether, isobutane, pentane, perfluoro-cyclobutane, propane and tetrafluoromethane, or a liquid with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol. Other thermally non-conducting materials include acrylic glass, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester and combinations thereof.

For some applications, such as underwater applications, including deep sea drilling applications, the thermal non-conductor would be made of a solid material or a material resistant to deformation and/or structural failure under pressure. In some embodiments, the thermally non-conducting portion 20 includes or is a solid thermal insulator. Examples of solid thermal insulators (thermal non-conductors) include, e.g., silicon nitride ($Si_3N_4$), calcium silicate, low-density, high-purity silica ceramic, porous alumina, borosilicate glass, silica aerogel (foamed glass), ceramic/glass composites, fibrous refractory composite insulation, polyurea based aerogel, graphite, mullite, glass-filled silicone polymers or combinations thereof. Any known solid thermal insulator can be used as or in the thermally non-conducting portion 20.

In some embodiments, the heat exchange unit can include a series of coaxial or concentric pipes, as shown in FIG. 6. The inner-most pipe A is in thermal communication with the conduit. In some embodiments, the pipe A is provided in two or more segments that are connected together on site to encircle the conduit. Any method known in the art for joining two conduits or pipes can be used to join the segments of the pipe to form a continuous conduit. For example, the segments can be joined via welding, bolts, screws, seals, epoxy or any combination thereof. Pipe A can be made of a material that is thermally conductive. In some embodiments, Pipe A is constructed of a thermally conductive metal. Any thermally conductive metal known in the art can be used. Examples of thermally conductive metals include copper, brass, cadmium, chrome nickel steel, gold, silver, iridium, iron, lead, magnesium, molybdenum, nickel, platinum, tin, zinc, carbon steel, stainless steel and any combination or alloy thereof. In some embodiments, pipe A can be attached directly to and against the conduit so that pipe A is in intimate thermal contact with the conduit. In some embodiments, pipe A is of a larger diameter than the conduit, resulting in a cavity between the conduit and pipe A when pipe A is put in place or when segments of pipe A are connected together to encircle the conduit. The segments of pipe A can be connected by any method known in the art. For example, the segments of pipe A can be connected via screws, bolts, epoxy or welding or other connection means. In embodiments where pipe A surrounds the conduit and a space is formed between the conduit and pipe A, the space between the conduit and pipe A can be filled with a thermally conductive material. Any thermally conductive material that can conduct thermal energy from one surface to another can be used. The thermally conductive material can be a solid or liquid. For example, in some embodiments the thermally conductive material is a solid. Examples of metals that are solid thermal conductors include copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. In some embodiments, the thermally conductive material can be formed of single metallic conductor or multiple metallic conductors. In some embodiments, the solid thermal conductors can include substantially pure copper, copper alloys, substantially pure aluminum, aluminum alloys, substantially pure silver, silver alloys, substantially pure gold, and gold alloys and mixtures thereof. A thermally conductive liquid can be made by dispersing a solid thermally conductive material in a liquid. Any of the thermally conductive materials described above can be provided as fibers, threads, filings, turnings, spurs, shavings, pellets, shot, microbeads, beads or fragments dispersed in a liquid at a density sufficient to provide a liquid that is thermally conductive. Thermally conductive liquids are known in the art. Examples of thermally conductive liquids include, e.g., silicone oils, polysiloxanes, fluorocarbons, silicate gels, polyphenyl ether, perfluoro alkyl polyether and combinations thereof. In some embodiments, the thermally conductive liquid includes a silicone oil or polysiloxane that contains filings, turnings, shavings, pellets or beads of a thermally conductive metal. In some embodiments, the then sally conductive liquid can include a silicone oil or polysiloxane that contains filings, turnings, shavings, pellets or beads of copper. Including the filings, turnings, shavings, pellets or beads of a thermally conductive metal can reduce the Leidenfrost effect, particularly in a cryogenic liquid, such as liquid argon, nitrogen, helium, oxygen or compressed gas. The Leidenfrost effect is a phenomenon observed in liquids in contact or in very close contact with a mass significantly hotter than the liquid's boiling point. When the liquid is in close proximity to a mass significantly hotter than the liquid's boiling point, the liquid boils and produces an insulating vapor layer that keeps that liquid from boiling rapidly. Including the filings, turnings, shavings, pellets or beads of a thermally conductive metal reduces or eliminates the Leidenfrost effect.

In some embodiments, the heat exchange unit can contain or be filled with filings, turnings, shavings, pellets or beads of a thermally conductive metal, and the refrigerant or cryogen flows through the heat exchange unit by percolating through the filings, turnings, shavings, pellets or beads of a thermally conductive metal. Heat can be removed from the filings, turnings, shavings, pellets or beads and transferred to the cryogen or refrigerant, and the absorbed heat can be transferred out of the heat exchange unit.

In some embodiments, the heat exchange unit includes thermally conducting fins attached to the conduit or fluid tubular. In some embodiments, the thermally conducting fins can be notched or perforated or both to minimize or prevent entrapment of bubbles or accumulation of gas/bubbles and formation of a dead space where liquid is not in fluid communication with the fins. The thermally conducting fins can be positioned at any location near to or in thermal contact with the conduit to increase the heat conducting area of the thermal exchange unit, thereby allowing the thermal energy of the conduit and its contents to more rapidly transfer to the heat exchange unit, including the cryogen or refrigerant and/or the cooled filings, turnings, shavings, pellets or beads of a thermally conductive metal within the heat exchange unit. In some embodiments, the thermal conducting fins are in thermal communication with the conduit and facilitate energy transfer from conduit to the cryogen or refrigerant and the cooled filings, turnings, shavings, pellets or beads of a thermally conductive metal within the heat exchange unit. The filings, turnings, shavings, pellets or beads of a thermally conductive metal within the heat exchange unit increase surface area and can channel fluid flow or induce turbulence, which can increase the efficiency of thermal transfer.

The thermal conducting fins can be configured longitudinally or axially or both about the conduit or flow tubular within the heat exchange unit. The length of the thermal conducting fins can be of any length, and can be uniform or varied, and can include fins that extend the length of the space within the heat exchange unit, thereby creating one or more channels. One or more of the so formed channels can serve as a separate circuit for the refrigerant or cryogen to pass through the heat exchange unit. In some embodiments, multiple such channels are so formed, and the channels can be adjacent or staggered around the radius of the inner tubular or conduit. The multiple channels formed by the thermal conducting fins so configured can be used as separate circuits for the refrigerant or cryogen to pass through the heat exchange unit and thus allow greater control of the freezing and/or warming and/or refreezing process within the heat exchange unit.

The filings, turnings, shavings, pellets or beads of a thermally conductive metal within the heat exchange unit, alone or in combination with thermally conducting fins positioned at any location near to or in thermal contact with the conduit, with the cryogen or refrigerant that passes through or is regenerated and recirculated through the heat exchange unit, create a heat sink within the heat exchange unit. Because of the heat capacity of the cooled filings, turnings, shavings, pellets or beads of a thermally conductive metal within the heat exchange unit, and the large surface area of contact that allows for fast exchange of thermal energy (heat transfer) within the heat sink from the conduit and fluid therein, thermal energy rapidly is absorbed and removed from the flow tubular (conduit) and the liquid contained therein at a rate sufficient to freeze flowing fluid within the flow tubular or conduit. Thus, zero flow of fluid is not required to form a reversible frozen plug of fluid in the tubular. The heat exchange unit is efficient and effective and can rapidly remove thermal energy from a flowing fluid within a conduit such that a plug is formed, stopping the flow of the fluid.

In some embodiments, the heat exchange unit can be fabricated in situ. For example, for conduit that is a pipe, two pipes of larger diameter than the conduit can be selected to form a heat exchange unit. Again referencing FIG. 6, around pipe A is fitted pipe B. The pipe B can be a solid pipe that is placed over pipe A or can come in segments that are joined and connected, such as by bolts, screws, welding or other connecting means. Pipe B is of a larger diameter than pipe A and thus forms a channel C between pipe A and pipe B. It is through channel C that refrigerant liquid or cryogen flows. As refrigerant liquid flows through channel C, it exchanges thermal energy with pipe A, which is in thermal contact with the conduit, directly or via a thermal conductor as described above. In some embodiments, a baffle 7 is attached between pipe A and pipe B and is continuous from one end of pipe A to the other. In embodiments containing a baffle 7, refrigerant liquid from input port 12 is forced to flow completely around the pipe in channel C before exiting the channel C through output port 13. Multiple baffles 7 can be included in the heat exchange unit. The baffles can be configured axially or radially or longitudinally in the heat exchange unit to modulate and/or direct the flow of refrigerant or cryogen through the heat exchange unit.

Around pipe B is fitted pipe D. The pipe B can be a solid pipe that is placed over pipe A or can come in segments that are connected, such as by bolts, screws, welding or other connecting means. Pipe D is of a larger diameter than pipe B and thus forms a gap G between pipe B and pipe D. Top plates 3*a* and 3*b* and bottom plates 4*a* and 4*b* are attached to each of pipes A, B and D to seal the spaces between the pipes. Gap G is filled with a thermally non-conducting material. Any material that does not conduct thermal energy or that is a poor conductor of thermal energy can be used to fill gap G. The thermally non-conductive material in gap G can minimize or prevent thermal transfer between pipe B and pipe D. Optionally, the exterior of pipe D, which interfaces with the environment, such as with ambient air or water, also can be coated with a thermally non-conducting material. Thermally non-conducting materials are known in the art. Examples of thermally non-conducting materials include gases that have a lower thermal conductivity than air, such as butane, krypton, trichloromethane, xenon, 1,1,2-trichloro-trifluoroethane, 1,2-dichlorotetrafluoroethane, tetrafluoroethane, argon, carbon dioxide, diethyl ether, isobutane, pentane, perfluoro-cyclobutane, propane and tetrafluoromethane, or a liquid with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol. Other thermally non-conducting materials include acrylic glass, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester and combinations thereof.

Inserted through pipes D and B and between pipe B and pipe D are two pipes, each of which traverses the gap G and go through pipe B so that the end of each pipe is at either end of gap C. One of the pipes serves as the input port 11 for delivery of refrigerant liquid to the thermal transfer device and the other pipe serves as the output port 12 for venting of the refrigerant liquid or cryogen that has traversed the thermal transfer device. Flow meters can be included in the input and/or output port pipes, and/or can be included in gap G to measure the flow of refrigerant through the gap G and thus through the heat transfer device. One or more thermal monitoring devices 15 can be included along the conduit, pipe A and/or pipe B for detecting and measuring thermal gradients.

In some embodiments, pipe D can include a movable flange F at a distal end. In some embodiments, the flange F can be adapted to fit securely to pipe D when engaged with pipe D. In some embodiments, the flange F is fabricated to be secured to pipe D to seal pipe D. In some embodiments, the flange is on a hinge connected to the distal end of pipe D. After the heat exchange unit has been fitted around the conduit, and has been activated and creates a plug within the conduit, the flange at the distal end of pipe D can be positioned to close off the pipe D and thereby seal the conduit. The heat exchange unit as described in FIG. 6 or variants thereof can be used to plug a broken conduit to allow for repairs of the conduit, and be left in place after the repairs to the conduit have been made. The heat exchange unit can be left to serve as a reinforcement of the broken conduit.

In some embodiments, the heat exchange unit can include a first conduit or flow tubular as the inner wall of the heat exchange unit. A second larger conduit, i.e., a conduit having a dimension larger than the conduit such that a space is formed between the conduit forming the inner wall of the heat exchange unit and the second larger conduit, envelops the conduit. The distal ends of the second larger second conduit are sealed to the first conduit or flow tubular to form a sealed enclosure. For example, discs of an appropriate material, such as the same material used to fabricate the first and second conduits, can be fabricated, where the discs include a circular opening of a size sufficient to accommodate the first conduit or flow tubular. A first disc is threaded over the first conduit and the circular opening of the interior of the disc is attached to the first conduit or flow tubular, such as by welding or any appropriate attaching method. The outer edge of the first disk then is attached to the second tubular, such as by welding or by any appropriate method. The process is repeated at the other distal end of the second conduit to produce a sealed cavity that is bounded on one end by the first disc and on the other end by the second disc, and a cavity is formed between the first conduit or flow tubular and the second conduit.

In some embodiments, the heat exchange unit contains or is filled with filings, turnings, shavings, pellets or beads of a thermally conductive metal, and the refrigerant or cryogen flows through the heat exchange unit by percolating through the filings, turnings, shavings, pellets or beads of a thermally conductive metal. Heat is removed from the filings, turnings, shavings, pellets or beads and transferred to the cryogen or refrigerant, and the absorbed heat can be transferred out of the heat exchange unit.

In some embodiments, the heat exchange unit includes thermally conducting fins attached to the conduit or fluid tubular. The thermally conducting fins can be positioned at any location near to or in thermal contact with the conduit to increase the heat conducting area of the thermal exchange unit, thereby allowing the thermal energy of the conduit and its contents to more rapidly transfer to the heat exchange unit, including the cryogen or refrigerant and/or the cooled filings, turnings, shavings, pellets or beads of a thermally conductive metal within the heat exchange unit. In some embodiments, the thermal conducting fins are in thermal communication with the conduit and facilitate energy transfer from conduit to the cryogen or refrigerant and the cooled filings, turnings, shavings, pellets or beads of a thermally conductive metal within the heat exchange unit. The filings, turnings, shavings, pellets or beads of a thermally conductive metal within the heat exchange unit increase surface area and can channel fluid flow or induce turbulence, which can increase the efficiency of thermal transfer.

The filings, turnings, shavings, pellets or beads of a thermally conductive metal within the heat exchange unit, alone or in combination with thermally conducting fins positioned at any location near to or in thermal contact with the conduit, with the cryogen or refrigerant that passes through or is regenerated and recirculated through the heat exchange unit, create a heat sink within the heat exchange unit. Because of the heat capacity of the cooled filings, turnings, shavings, pellets or beads of a thermally conductive metal within the heat exchange unit, and the large surface area of contact that allows for fast exchange of thermal energy (heat transfer) within the heat sink from the conduit and fluid therein, thermal energy rapidly is absorbed and removed from the flow tubular (conduit) and the liquid contained therein at a rate sufficient to freeze flowing fluid within the flow tubular or conduit.

iii. Refrigerant Supply Module

In embodiments that include a liquid-containing heat exchange unit, as shown in FIG. 2, the system can include a refrigerant supply module 50 to provide refrigerant to the heat exchange unit 10. The refrigerant supply module 50 can include a non-thermally conducting surface in contact with the environment to thermally isolate the refrigerant supply module 50 from the environment. This thermal isolation means prevents absorption of thermal energy by the refrigerant from the environment. In applications in which the refrigerant supply module 50 is deployed under water, the thermal isolation means prevents ice crystal formation on the refrigerant supply module 50. The refrigerant supply module 50 can be constructed of a material appropriate for the environment in which it is to be deployed. For example, in embodiments where the system is to be used underwater, particularly in deep sea drilling applications, the refrigerant supply module 50 can be constructed of material sufficient to withstand the pressures at depth, including the pressures exerted by water at depths of up to 7,000 feet under water. Those skilled in the art of undersea construction are familiar with the required mechanics necessary for the construction of a module capable of containing a refrigerant and withstanding the ambient water pressures at depth. For example, the module 50 can be constructed of reinforced steel or composite materials and reinforced to withstand the ambient water pressures.

The refrigerant supply module 50 provides liquid refrigerant or cryogen to the heat exchange unit 10 either directly through pipes or tubing or the module 50 can be connected to a pump 40 that is connected to the heat exchange unit 10. The refrigerant supply module 50 can include thermal monitoring devices 15 for monitoring the temperature of the refrigerant liquid or cryogen. The refrigerant supply module 50 also can include flow rate meters for determining flow of refrigerant from the module. The refrigerant also can include refrigerant level meters for monitoring the amount of refrigerant or cryogen in the module.

In some embodiments, the refrigerant supply module 50 contains a number of individual separated compartments containing different cryogens and solvents, and includes a mixing device, such as an in-line mixer, adapted to mix one or more cryogens with one or more solvents to produce a temperature modulated liquid refrigerant having a desired temperature. For example, in some embodiments, the refrigerant supply module 50 includes a containment vessel for liquid nitrogen, a containment vessel for liquid or solid carbon dioxide; and one or more containment vessels for one or more solvents, such as methanol, ethanol, or acetone or any of the solvents described herein. The vessels can be attached by tubing to provide a pathway for fluid communication between and amongst the vessels, terminating in a vessel or reservoir for containment of the liquid refrigerant prepared by mixing the selected cryogen(s) and solvent components. In some embodiments, the refrigerant supply module 50 also can contain one or more reservoirs for containing different prepared liquid refrigerants having different desired temperatures, and a line providing fluid communication between the reservoirs and a mixing device, such as an in-line mixer, adapted to mix the two or more liquid refrigerants to produce a temperature modulated liquid refrigerant. Mixing devices, including in-line mixers, are well known in the art (e.g., U.S. Pat. Nos. 5,738,772; 5,076,930; 4,729,664 and 4,533,123).

iv. Refrigerant

The refrigerant supply module 50 contains refrigerant and delivers the refrigerant to the heat exchange unit 10 of the system 1. Refrigerants for use in heat exchange units are known in the art. The refrigerant can include any liquid that can transfer thermal energy under the conditions of use. Exemplary liquid refrigerant liquids can contain liquid or solid carbon dioxide, liquid ammonia, liquified chlorofluorohydrocarbons; liquified gases such as liquid nitrogen, liquid oxygen, liquid neon, liquid argon, liquid nitrous oxide, hydrofluoro-ethane, pentafluoro-propane, trichloromonofluoromethane, dichlorodifluoromethane, or a mixture thereof. In high pressure applications, such as at depth in deep sea drilling applications, the refrigerant can be at a temperature sufficient for thermal transfer in the heat exchange unit. In some embodiments, the temperature of the refrigerant liquid is less than $-20°$ C. In some embodiments, the temperature of the liquid refrigerant is less than $-40°$ C. In some embodiments, the temperature of the liquid refrigerant is less than $-80°$ C. In some embodiments, the temperature of the liquid refrigerant is less than $-100°$ C. Generally cryogenic fluids or cryogens of a temperature less than $-150°$ C. are not used alone as a liquid refrigerant because of the thermal stress that the rapid cooling of the conduit by the cryogenic fluid or cryogen at a temperature less than $-150°$ C. can cause. In the heat exchangers provided herein, the heat exchange unit can be constructed of a material resistant to any thermal stress that the rapid cooling of the conduit by the cryogenic fluid or cryogen at a temperature less than $-150°$ C. can cause. In some embodiments, the cryogenic fluid is liquid argon or liquid nitrogen or blends thereof. Blends of solvents with cryogens, such as liquid nitrogen or liquid helium or liquid argon or liquid neon, or with other liquified or solidified gases, such as carbon dioxide, can provide liquid refrigerants that have a temperature between $-20°$ C. and $-160°$ C. Examples of these liquid refrigerants include blends of liquid nitrogen with a solvent, such as carbon tetrachloride (about $-20°$ C.), m-dichlorobenzene (about $-25°$ C.), nitromethane (about $-30°$ C.), bromobenzene (about $-30°$ C.), acetonitrile (about $-40°$ C.), chlorobenzene (about $-45°$ C.), m-xylene (about $-50°$ C.), n-butyl amine (about $-50°$ C.), n-octane (about $-55°$ C.), chloroform (about $-63°$ C.), t-butyl amine (about $-70°$ C.), trichloro-ethylene (about $-75°$ C.), butyl acetate (about $-77°$ C.), ethyl acetate (about $-84°$ C.), heptane (about $-90°$ C.), cyclopentane ($-93°$ C.), hexane (about $-95°$ C.), methanol (about $-100°$ C.), cyclohexane (about $-105°$ C.), isooctane (about $-105°$ C.), acetaldehyde (about $-125°$ C.), methyl cyclohexane (about $-125°$ C.), m-pentane (about $-130°$ C.), 1,5-hexadiene (about $-140°$ C.), and isopentane (about $-160°$ C.).

Other examples of liquid refrigerants include blends of dry ice with a solvent, such as blends of dry ice with carbon tetrachloride (about $-25°$ C.), 3-heptanone (about $-40°$ C.), acetone nitrile (about $-40°$ C.), cyclohexanone (about $-45°$ C.), diethyl carbitol (about $-50°$ C.), chloroform (about $-60°$ C.), carbitol acetate (about $-65°$ C.), ethanol (about $-70°$ C.), acetone ($-78°$ C.), isopropanol ($-78°$ C.), ethyl methyl ketone (about $-85°$ C.), and diethyl ether (about $-100°$ C.). In some embodiments, the refrigerant is a blend of a solvent with liquid nitrogen or with dry ice. In particular, blends of dry ice with solvents, such as methanol, ethanol, propanol, acetone or blends thereof are contemplated. In some embodiments, liquified gas, such as liquid nitrogen, liquid helium, liquid argon or blends thereof can be used.

v. Tubing or Piping

The refrigerant supply module 50 and heat exchange unit 10 and discharge vent 35, and pumps 40 and valves 19 when present, are in fluid communication and can be connected via tubing or piping. The tubing or piping can be constructed of a material and construction applicable for the environment in which the system is to be deployed. For example, for deep sea drilling applications, the tubing or piping can be engineered to resist the high water pressures that exist at depths of deep sea drilling, including depths of about 7,000 feet under water. Those skilled in the art can select the proper material and thickness or design of the piping or tubing for such applications, The piping or tubing can include radial or lateral reinforcements to withstand collapse under the pressure of the water pressures that exist at deep sea drilling depths. The piping or tubing can be manufactured to be of a thickness such that the piping or tubing is resistant to reformation or crushing by the water pressure at sea depths of deep sea drilling. The tubing can be constructed for ambient pressures and is insulated to minimize thermal contamination from the surrounding environment. The tubing can be thermally insulated from the environment using any technique known to those of skill in the art. In some embodiments, the tubing or piping can be encircled or enveloped in a non-thermally conductive material. In some embodiments, the tubing or piping is enclosed in a thermal isolation means. The thermal isolation means can include a jacket fabricated of or containing a thermally non-conducting material. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2-trichloro-trifluoro-ethane, 1,2-dichloro-tetrafluoroethane, tetrafluoroethane, argon, carbon dioxide, diethyl ether, isobutane, pentane, perfluoro-cyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

In some embodiments, the piping or tubing can be coaxial tubing in which the inner pipe or tube is within an outer pipe or tube, and the space between the inner pipe or tube and the outer pipe or tube includes a thermally non-conductive material. Any thermally non-conductive material known in the art can be used. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2-trichloro-trifluoro-ethane, 1,2-dichloro-tetrafluoroethane, tetrafluoroethane, argon, carbon dioxide, diethyl ether, isobutane, pentane, perfluoro-cyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

vi. Flow Rate Monitors

In some embodiments, flow rate monitors can be included in the heat exchange unit 10, or in the pipes or tubing that deliver refrigerant to the heat exchange unit 10 or in the vent 35 or any combination thereof. The flow rate monitors can be in communication with a computer module 55. Data from the flow rate monitors can be used to determine the flow of refrigerant or cryogen through the system, particularly through the heat exchange unit 10, and can be used to modulate the rate of flow of refrigerant or cryogen through the system, either manually or automatically such as by computer control. Flow rate monitors can be included throughout the path of fluid communication from the refrigerant supply module 50 to the exit point of the discharge tube vent 35 for determination of rate of flow of refrigerant through the system.

vii. Valves

The thermal transfer device also can include valves 19 that can be used to modulate the flow of refrigerant from the refrigerant supply module 50 to the heat exchange unit 10 in thermal contact with the conduit 2. In some embodiments, one or more valves 19 can be positioned between the refrigerant supply module 50 and a pump module 40. In some embodiments, one or more valves 19 can be positioned between a pump module 40 and the heat exchange unit 10. In some embodiments, one or more valves 19 can be positioned between the heat exchange unit 10 and the discharge vent tube 36. The valves can be controlled manually. In some embodiments, the valves can be electrical solenoid valves. In some embodiments, the valves 19 can be in communication with and/or controlled by a computer module 55. In embodiments in which the valves 19 are in communication with a computer module 55, the computer module 55 can modulate the flow through the system by opening or closing the valves 19 or adjusting the degree to which one or more of the valves 19 are open and allowing refrigerant flow through the system. In some embodiments, the computer module 55 automatically can adjust the flow through the system by adjusting flow through the valves 19. In some embodiments, the computer module 55 can be in communication with flow meters of the system.

viii. Discharge Tube or Vent

In embodiments where the thermal transfer device includes a liquid-containing heat exchange unit, the thermally conducting refrigerant can flow through the heat exchange unit 10 from the input port 12 through the unit 10 and exit the unit 10 through the output port 13 of the unit 10. In some embodiments, such as when the unit 10 includes interconnected heat exchange units, the flow of refrigerant that exits the first heat exchange unit 10 can enter the input port 12 of the next interconnected heat exchange unit 10. Once the refrigerant has flowed through all of the interconnected heat exchange units 10, the refrigerant exits the terminal or last heat exchange unit 10 through the output port 13 into a discharge tube or vent pipe 35. The terminal discharge tube or vent pipe 35 can be thermally isolated from the environment. The thermal isolation means can include a layer or coating of a thermally insulating material along the length of the discharge tube. The thermal isolation means can include a jacket 30. The jacket 30 can be fabricated from a thermally non-conductive material or a material having low thermal conductivity, or the jacket 30 can include a casing that contains a thermally non-conductive material or a material having low thermal conductivity. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2-trichloro-trifluoro-ethane, 1,2-dichloro-tetrafluoroethane, tetrafluoroethane, argon, carbon dioxide, diethyl ether, isobutane, pentane, perfluoro-cyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

The discharge vent tube 35 can include one or more heating elements 5. When activated, the heating elements 5 can be used to increase the temperature of the refrigerant to at least the temperature of the ambient environment. For example, the activated heating elements 5 can elevate the temperature of the exiting refrigerant to a temperature at least equal to the water or air into which the refrigerant/cryogen is to be discharged. For example, when the device is used in underwater drilling applications, including deep sea drilling applications, the heating elements 5 heat the refrigerant to be discharged to the temperature of the water into which it is to be discharged. By heating the refrigerant to be discharged to at least ambient water temperature, ice crystal formation can be avoided.

The discharge vent tube 35 can be located at any distance from the conduit 2. In some embodiments, the discharge vent tube 35 can be located at a distance removed from the conduit 2. For example, in some embodiments, the discharge vent tube 35 can be positioned, 1-100 feet or more from the conduit 2. In some embodiments, the discharge vent tube 35 can be positioned at least 10 feet from the conduit 2. In some embodiments, the discharge vent tube 35 can be positioned at least 20 feet from the conduit 2. In some embodiments, the discharge vent tube 35 can be positioned at least 50 feet from the conduit 2. In some embodiments, the discharge vent tube 35 can be positioned at least 100 feet from the conduit 2. In some embodiments, the discharge vent tube 35 can be positioned at least 200 feet from the conduit 2. In some embodiments, the discharge vent tube 35 can be positioned at least 500 feet from the conduit 2.

In some embodiments, the discharge vent tube 35 can be attached to a heat exchange module to remove the heat absorbed from the conduit and the regenerated cooled refrigerant can be returned to the refrigerant supply module. In some embodiments, the discharge vent tube 35 can be attached to an evaporator and/or compressor before or after passing through a second heat exchange unit to regenerate the chilled refrigerant liquid before being returned to the refrigerant supply module.

ix. Heating Elements

Any heating unit known in the art can be used as a heating element 5 to heat the conduit or vent tube or any tubing or piping therebetween. For example, U.S. Pat. No. 4,849,611 describes a plurality of discrete, spaced-apart heating units. U.S. Pat. No. 7,461,691 describes Curie temperature heaters. U.S. Pat. Pub. No. 2005-0092483 describes temperature limited heaters. U.S. Pat. Pub. No. 2004-0020642 describes conductor-in-conduit heat sources. Heater strips for heating pipes are well known. For example, U.S. Pat. No. 3,793,716 describes a heater strip that includes two conductive wires embedded in a positive temperature coefficient polymeric material. U.S. Pat. No. 4,238,640 describes a pipe line heating apparatus comprising three flat resistive elements or conductors that run in spaced apart parallel relation along the surface to be heated. This heater can be strapped to a pipeline in substantial conformity with the shape of the circumference and length of the pipeline. The flat aluminum strips serve to conduct and diffuse the heat generated by the three flat conductors over the surface of the pipeline. Other heating elements that can be used to heat the conduit or vent tube or tubing or piping include those described in U.S. Pat. Nos. 7,066,730; 4,238,640; 3,971,416; and 3,814,574.

The heating elements 5 can be fixed to the conduit 2 or pipes of the system permanently or removably. The heating elements 5 can be insulated after the heating elements 5 have been affixed to the conduit 2 or pipes of the system. In some embodiments, the conduit 2 or pipes of the system with a fluid flow passage therethrough has a heater housing mounted on the conduit 2 or pipe exterior. The heater housing forms a cavity along the pipe exterior for receiving a heating element 5 to heat fluids in the pipe flow passage. A preformed insulation layer can be included to extend around the pipe and heater housing unit to insulate them. A jacket 30 also can be provided at the exterior of the insulation layer to protect the insulation layer.

x. Flow Meters

One or more flow meters, such as a paddle wheel flow meter, can be located in channel C to measure the total fluid flow through channel C. The flow meter can include a turbine flow meter, a magnetic flow meter, optical sensors, electromagnetic velocity sensors, coriolis force flow meters, thermal flow meters, ultrasonic flow meters or any other type of flow meter known in the art. Examples of flow meters known in the art include U.S. Pat. Nos. 7,730,777; 7,707,898; 4,934,196; 4,422,338 and RE 31,450, and U.S. Pat. Appl. Pubs. 2009-0281671, 2005-0288873 and 2004-0244498.

It is to be appreciated that the rate of flow of refrigerant liquid through the heat exchange unit 10 can be manually or computer controlled, such as by adjusting one or more valves 19. For example, the computer module 55 can be programmed with one of a variety of programs for controlling the valve 19 and/or pump module 40. For example, the controller may be programmed to utilize proportional integral (PI) control, proportional integral differential (PID) control, etc., such as, for example, described in detail in connection with a thermal mass flow meter/controller in U.S. Pat. No. 6,962,164, which is herein incorporated by reference in its entirety. In another example, the computer can be adapted to use a "model-free" adaptive control algorithm to drive one or more valves 19. This method includes a feedback "neuron-based" control algorithm that is independent of the particular liquid flowing in the system and does not require a priori knowledge of the dynamics of the system. At least one embodiment of this method is described in detail in U.S. Pat. No. 6,684,112, which is herein incorporated by reference in its entirety. Methods for determining flow rate by detecting bubbles in the flowing liquid are described, e.g., in U.S. Pat. App. Pub. 2009-0281671 and 2007-0191990.

b. Thermoelectric Module or Peltier Device

In some embodiments, the thermal transfer device 9 includes a Peltier device. A Peltier device is a heat sink that carries an electrical charge causing it to act as an electric thermal transfer device (due to the Peltier Effect) and such devices are known in the art (e.g., see U.S. Pat. No. 7,218,523). The typical device is a sandwich formed by two ceramic plates with an array of small bismuth telluride ($Bi_2Te_3$) cubes in between. When a DC current is applied, heat is moved from one side of the device to the other, where it is removed with a heat sink. The cold side of the device can be applied to the conduit. If the current is reversed, the device can be used as a heater by moving heat in the opposite direction. In embodiments that use a Peltier device as the thermal transfer device, one or more than one Peltier device is thermally coupled to the exposed surface of the conduit. In some embodiments, the thermoelectric module can be thermally coupled to the conduit while not being physically constrained by the conduit. In such embodiments, the thermoelectric module can be thermally coupled to the conduit via a thermally conductive medium. In some embodiments, the thermally conductive medium includes a thermal heat sink grease. In another embodiment, the thermally conductive medium includes a metallic foil. In another embodiment, the thermally conductive medium includes a thermally conductive pad. In any of these embodiments, the thermally conductive medium is resilient such that the thermoelectric module is thermally coupled to the conduit while not being physically constrained by the conduit. By providing a thermally conductive medium between the thermoelectric module(s) and the conduit, the thermoelectric module(s) are not subject to mechanical stresses due to thermal expansion and contraction effects. As a result, damage and/or failure of the devices can be reduced.

c. Magnetic Thermal Transfer Device

In some embodiments, the thermal transfer device 9 includes a magnetic refrigeration device. Magnetic refrigeration is a cooling technology based on the magnetocaloric effect. Devices that use magnetic refrigeration are well known in the art (e.g., see U.S. Pat. Nos. 7,603,865; 7,596,955; 7,481,064 and 7,114,340, and U.S. Pat. Pub. Nos. US20100071383, US20090217675, US20090158749, US20090019860 and US20070144181).

Magnetic refrigeration is an alternative technique to gas compressor technology for cooling and heating based on engineering and economic considerations that indicate that magnetic regenerator refrigerators, in principle, are more efficient than gas cycle refrigerators and thus can yield savings in the cost of operation and conservation of energy. Magnetic refrigeration utilizes the ability of a magnetic field to affect the magnetic part of a solid material's entropy to reduce it and, therefore, increase the lattice (vibrational) part of the entropy in an isothermal process or the temperature of the solid material in an adiabatic process. When the magnetic field is removed, the change or return of the magnetic entropy of the magnetic solid material reduces the temperature of the material. Thus, magnetic refrigeration is effected by cyclic heat dissipation and heat absorption in the course of adiabatic magnetization and adiabatic demagnetization of the magnetic solid material via application/discontinuance of an external magnetic field. A refrigeration apparatus that exhausts or vents the released heat on one side of the apparatus when the magnetic solid material is magnetized and cools a useful load on another side when the magnetic solid material is demagnetized is known in the magnetic refrigeration art as an active magnetic regenerator magnetic refrigerator. U.S. Pat. Nos. 7,114,340; 7,076,959; 7,069,729; 7,063,754; 6,826,915; 6,739,137; 6,676,772; 6,589,366; 6,467,274; 6,446,441; 5,743,095; 5,357,756; 4,956,976; 4,829,770 and 4,642,994 describe active magnetic refrigerant materials and magnetic refrigeration systems. See also, "Recent Developments in Magnetic Refrigeration" by K. A. Gschneidner Jr. et al. in Materials Science Forum Vols. 315-317 (1999), pp. 69-76; and Gedik et al., 5th International Advanced Technologies Symposium (IATS'09), May 13-15, 2009, Karabuk, Turkey. In some embodiments, a gadolinium compound and a Nd—Fe—B magnet configuration can be used.

In some embodiments, a magnetic refrigeration apparatus includes first and second steady state magnets, each having a field of substantially equal strength and opposite polarity, first and second bodies made of magnetocaloric material disposed respectively in the influence of the fields of the first and second steady state magnets, and a pulsed magnet, concentric with the first and second steady state magnets, and having a field which cycles between the fields of the first and second steady state magnets, thereby cyclically magnetizing and demagnetizing and thus heating and cooling the first and second bodies. A heat exchange unit of suitable design can be used to expose a working fluid to the first and second bodies of magnetocaloric material. A controller can be provided to synchronize the flow of working fluid with the changing states of magnetization of the first and second bodies.

2. Thermal Isolation Means

In some embodiments, the chiller system or cryo-thermodynamic valve system can include a means for thermally isolating the conduit and/or the heat exchange unit from the environment. For example, the thermal isolation means can be a jacket 30 of thermal insulation that is in contact with the conduit 2 on one or both sides of the heat exchange unit 10 and envelops the heat exchange unit 10 while enveloping at least a portion of the conduit 2. In some embodiments, the thermal isolation means can be attached to the conduit 2 to form an airtight seal. In some embodiments in which the thermal isolation means is connected to the conduit 2 with an airtight seal, the air can be replaced with a gas with lower thermal conductivity than air. Generally, dense gases, such as xenon and dichlorodifluoromethane, have low thermal conductivity. Gases that have a lower thermal conductivity than air include butane, krypton, trichloromethane, xenon, 1,1,2-trichloro-trifluoroethane, 1,2-dichloro-tetrafluoroethane, tetrafluoroethane, argon, carbon dioxide, diethyl ether, isobutane, pentane, perfluoro-cyclobutane, propane and tetrafluoromethane. In some embodiments, the air can be replaced with a liquid with low thermal conductivity. Examples of liquids having low thermal conductivity are CFC-11, HCFC-141b, methanol, ethanol, glycerol, ether, acetone, ethylene glycol, thermally non-conducting silicone fluid containing glass, such as glass fibers or glass beads, and propylene glycol.

In some embodiments, particularly in underwater applications, including deep sea drilling, the thermal isolation means can be attached to the conduit 2 to form an airtight seal and the water surrounding the conduit between the conduit and the thermal isolation means is removed. In some embodiments, the water can be displaced with air. In some embodiments, the water can be displaced with a gas with lower thermal conductivity than air. In some embodiments, the water can be replaced with a liquid having a lower thermal conductivity than liquid water. In such embodiments, the thermal isolation means can be configured to allow removal of any water in contact with the pipe prior to activation of the system in order to reduce the thermal effects of the water as a heat sink. The jacket can include thermal monitoring devices for monitoring the thermal gradient along the pipe. The jacket also can include heating elements for controlling the thermal gradient induced by the chilling system. In some embodiments, the jacket can include distal heating elements that can be used to modulate the thermal gradient and/or minimize ice formation at the distal ends of the pipe. The heating elements can be controlled to minimize or eliminate thermally induced stress fractures in the conduit so that the conduit does not fail, such as due to the formation of cracks or breaches in the conduit.

The thermal isolation means can include a layer or coating of a thermally insulating material. The thermal isolation means can include a jacket 30. The jacket 30 can be fabricated from a thermally non-conductive material or a material having low thermal conductivity, or the jacket 30 can include a casing that contains a thermally non-conductive material or a material having low thermal conductivity. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2-trichloro-trifluoroethane, 1,2-dichloro-tetrafluoroethane, tetrafluoroethane, argon, carbon dioxide, diethyl ether, isobutane, pentane, perfluoro-cyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

3. Computer Module

In some embodiments, the system includes a computer module 55 for automation of the system. The computer module 55 can be in communication with and/or in control of the thermal transfer device. In some embodiments, the computer module 55 can be used to modulate a thermoelectric module or Peltier device. In some embodiments, the computer module 55 can be used to modulate a magnetic refrigeration device. In some embodiments, the computer module 55 can be used to modulate a liquid-containing thermal transfer device containing a heat exchange unit. In embodiments of the system including a liquid-containing heat exchange unit 10, the computer module 55 can be in communication with and/or in control of heating elements 5, valves 19, thermal monitors and pump modules 40 of the system. In some embodiments, a computer processor of the computer module 55 can control the pump module(s) 40 and flow-control metering valve(s) 19 to provide a flow of the refrigerant liquid under existing ambient physical conditions.

In some embodiments, a communications medium can be located within the conduit, for example, within an inner annulus of the conduit or in a gun-drilled channel in the conduit or a channel formed during fabrication of the conduit. The communications medium can permit communications between the computer module 55, which can be located at a site remote from the refrigeration system, and one or more components of the refrigeration system of the CryoPlug cryo-thermodynamic valve system. Communications between refrigeration systems and the computer module can be performed using any suitable technique, including electromagnetic (EM) signaling, mud-pulse telemetry, switched packet networking, or connection-based electronic signaling. The communications medium can be a wire, a cable, a waveguide, a fiber, a fluid such as mud, or any other medium. The communications medium can include one or more communications paths. For example, one communications path can couple the computer module to a heat exchange unit while another communications path can couple the computer module to a cryogen injection module.

The communication medium can be used to control one or more elements of the refrigeration system, such as control valves. For example, the computer module can direct the activities of the refrigeration system, for example, by executing a pre-programmed function to modulate the flow of refrigerant or cryogen in the system. The communications medium also can be used to convey data, such as temperature or pressure sensor measurements. For example, measurements from temperature sensors attached to the conduit can be sent to the computer module for further processing or analysis or storage.

The computer module 55 can be coupled to a terminal, which can have capabilities ranging from those of a dumb terminal to those of a server-class computer. The terminal can allow a user to interact with the computer module 55. The terminal can be local to the computer module 55 or it can be remotely located and in communication with the computer module 55 via telephone, a cellular network, a satellite, the Internet, another network, or any combination of these. The communications medium can permit communications at a speed sufficient to allow the computer module 55 to perform real-time collection and analysis of data from sensors located downhole or elsewhere associated with the refrigeration system.

The methods of the present invention may be embodied in a computer-readable storage medium having a computer-readable program embodied therein for directing operation of the described system such as described above. The computer-readable program includes instructions for operating the heat exchange system in accordance with the embodiments described above.

For example, the computer processor of the computer module 55 can control and/or modulate the flow of the refrigerant through the system by manipulating one or more valves in the fluid flow of the refrigerant through the system. In embodiments where the valves 19 are valves that are remotely activatable or controllable, such as electrical solenoid valves, the computer can deactivate the electrical solenoid valve closest to the refrigerant supply module 50 to shut off all refrigerant flow through the heat exchange unit 10. This electrical solenoid valve can be configured such that cutting electrical power immediately stops the flow of refrigerant through the heat exchange unit and the system. The flow control valves 19 throughout the system can receive signals from the computer module 55 to control the amount and flow of liquid refrigerant flowing through the system in response to measured temperatures within thermal energy transfer system 1 as well as, optionally, certain user defined parameters including a desired cooling profile.

The temperature inside the heat exchange unit 10 and the temperature along the conduit 2 can be monitored with thermal monitoring devices 15 or other temperature sensors such as thermocouples. The thermal monitoring devices 15 can be coupled to and provide inputs to the computer module 55.

In some embodiments, the device can be used in deep sea drilling operations that experience extremes in pressure and reduced temperatures. For such applications, the device can be configured to withstand the extreme pressures exerted by the water on the device. For example, for such applications, the heat exchange modules could be engineered to withstand the pressure exerted by the water at depths of from about 1,000 feet to about 10,000 feet below sea level. It is known in the art that normal pressure increases approximately 0.465 psi per foot of depth under water (10.5 kpa per meter of depth). Thus, normal pressure at 10,000 feet under water is about 4,650 psi. Water pressure at 5,000 feet is a little over a ton per square inch (about 2,438 psi).

For some embodiments, including embodiments for use in deep sea drilling applications, the thermal conductor can be made of a thermally conducting metal of a thickness or cross-section or configuration sufficient to resist collapse, deformation and/or structural failure under pressure. Any metal exhibiting thermal conducting properties can be used. Exemplary metals for use as a thermal conductor include, e.g., copper, silicon, diamond deposited by vapor phase process (CVD), silver, gold, grapheme, aluminum and aluminum alloys, nickel, titanium, titanium alloys, tungsten, gold, silver and alloys thereof.

4. Cryogen Injector Module

In some embodiments, the chiller or freezing system for extracting thermal energy from a conduit, which can be used, e.g., to freeze at least a portion of the fluid contents therein, can include a cryogen injector module. The conduit can be in any orientation with respect to the ground. For example, the conduit can be perpendicular to the ground, e.g., the general orientation of a producing oil well. The conduit also can be parallel to the ground, e.g., the general orientation of an over-ground transfer pipeline. The cryogen injector module can contain one or a plurality of injectors or injector devices in fluid communication with a source of a cryogen. In some embodiments, the cryogen can be a liquid cryogen. In some embodiments, the cryogen can be selected from among liquid nitrogen, liquid helium, liquid argon, liquid neon, liquid xenon, liquid carbon dioxide and combinations thereof. The injectors or injector devices can be configured to inject the cryogen directly into the fluid in a conduit, thereby reducing the temperature of the fluid. The injectors or injector devices can be configured so that an injector is not in contact with the fluid in the conduit. For example, in some embodiments the injector can be an opening in the side of the conduit, such as an opening in the side of a flow tubular. In some embodiments, the injector comprises a port through which cryogen or refrigerant is introduced into the conduit so that the cryogen or refrigerant comes into contact with the fluid within the conduit. The injector or injector unit can include an isolation mechanism for controlling the introduction of the cryogen or refrigerant into the fluid in the conduit. Any isolation mechanism known in the art can be used. In some embodiments, a check valve can be included in the injector port. The check valve can be used as an isolation mechanism and/or can be used to prevent the back flow of fluid in the conduit, such as oil in the flow tubular, into the cryogen or refrigerant supply module, such as a module that provides a cryogen, such as liquid argon or liquid nitrogen to the injector.

Any cryogenic check valve can be used. Any valve that is operative at cryogenic temperatures can be used. Not all embodiments require a check valve on the cryogen injector. For example, in embodiments where the refrigerant or cryogen supply module delivers the refrigerant or cryogen at a greater pressure than the expected internal pressure of the conduit or tubular, once the flow of refrigerant or cryogen from the supply module to the injector is stopped, a check valve would not be required. In some embodiments, a check valve can be included as part of the apparatus used to activate the valve. In some embodiments, the injection port can be sealed from the conduit or tubular by a manually or remotely operated valve suitable to contain the type and pressure of fluid in the conduit or flow tubular.

The fluid within the conduit can include any fluid transported through conduits or pipes. The fluid can be a liquid, a gas or combinations thereof. An exemplary liquid fluid is produced oil from an oil well. Produced oil typically can contain some amount of water. Thus, the fluid can include crude oil, alone or in combination with water. In some instances, in an underground oil reservoir, the ambient conditions, including the temperature and pressure of the reservoir, may result in $C_1$ to $C_8$ alkanes, including methane, ethane, propane and butane, to be dissolved in the crude oil, the proportion of which is in the form of a gas or liquid dictated by the subsurface conditions. Thus, in some instances, the liquid fluid can include dissolved gases, and can include gases that escape from the liquid as the temperature and/or pressure changes in the conduit. An exemplary fluid that is a gas is a natural gas, which can include any combination of lightweight hydrocarbons, including alkanes, alkenes and alkynes, alone or in any combination. A natural gas predominately contains methane, but also can include ethane, a propane, a butane, a pentane, higher molecular weight hydrocarbons and water vapor.

In some embodiments, the cryo-thermodynamic valve device includes one or more cryogen injectors and one or more auxiliary injectors or injection ports. When present, the auxiliary injectors or injection ports can be used for introducing a second material other than a refrigerant or cryogen into the fluid stream.

For example, in some embodiments, one or more auxiliary injectors can be used to inject a surface active agent into the fluid within the conduit. The auxiliary injectors can be located upstream or downstream of the cryogen injector. In some embodiments, the auxiliary injectors are located upstream of the cryogen injector. The auxiliary injectors can be activated without activation of the cryogen injector(s). The auxiliary injectors can be activated in combination with the cryogen injector, injecting a surface active agent into the fluid simultaneously with a cryogen, before injection of the cryogen into the fluid or after injection of the cryogen into the fluid. In some embodiments, the auxiliary injector(s) is/are located upstream of the cryogen injector and the surface active agent is injected into the stream prior to or contemporaneously with the introduction of cryogen via the cryogen injector into the fluid within the conduit or flow tubular.

In some embodiments, one or more auxiliary injectors can be used to inject a bridging fluid into the fluid within the conduit. In particular embodiments, such as in which the fluid within the conduit is a gas, the thermodynamic valve device can include one or more auxiliary injectors for introduction of a bridging fluid into the gas. In such embodiments, the auxiliary injectors can be located upstream or downstream of the cryogen injector. In such embodiments, the auxiliary injectors are located upstream of the cryogen injector. The auxiliary injectors can be activated without activation of the cryogen injector(s). The auxiliary injectors can be activated in combination with the cryogen injector, injecting a bridging fluid into the fluid within the conduit or flow tubular simultaneously with a cryogen, before injection of cryogen or after injection of the cryogen into the fluid in the conduit. In some embodiments, the auxiliary injector(s) is/are located upstream of the cryogen injector and the bridging fluid can be injected into the stream prior to or contemporaneously with the introduction of cryogen via the cryogen injector into the fluid within the conduit or flow tubular.

The introduction of a second material, such as a surface active agent or a bridging fluid or a combination thereof can be controlled by a mechanical valve that can be opened and closed. The valve can be controlled manually or remotely, such as by including a computer operated or electrically activatable valve. When activated, the valve opens to introduce the second material, such as a surface active agent or bridging fluid, into the fluid within the conduit or flow tubular.

When the second material to be introduced into the fluid of the conduit via the auxiliary injectors is a surface active agent, any suitable surface active agent can be used. For example, any anionic, cationic, zwitterionic, non-ionic surfactant can be introduced into the fluid within the conduit or flow tubular using one or more auxiliary injectors. Exemplary non-ionic surfactants include Tergitol NP-9® (Dow Chemical Co., Midland, Mich.), a nonionic, nonylphenol ethoxylate surfactant, Tergitol NP-33 [9016-45-9] Synonyms: alpha(nonylphenyl)-omega-hydroxypoly(oxy-1,2-ethanediyl); antarox; Nonylphenoxypoly(ethyleneoxy)ethanol; nonylphenyl polyethyleneglycol ether, nonionic; nonylphenyl polyethylene glycol ether; PEG-9 nonyl phenyl ether; POE (10) nonylphenol; POE (14) nonylphenol; POE (15) nonyl phenol; POE (15) Nonyl Phenyl Ether; POE (18) Nonyl Phenyl Ether; POE (20) nonylphenol; POE (20) Nonyl Phenyl Ether; POE (30) nonylphenol; POE (4) nonylphenol; POE (5) nonylphenol; POE (6) nonylphenol; POE (8) nonylphenol; polyethylene glycol 450 nonyl phenyl ether; polyethylene glycol 450 nonyl phenyl ether, nonionic surfactant; polyethylene glycols mono(nonylphenyl)ether; polyethylene mono (nonylphenyl)ether glycols; polyoxyethylene (10) nonylphenol; polyoxyethylene (14) nonylphenol; polyoxyethylene (1.5) nonyl phenol; polyoxyethylene (20) nonylphenol; polyoxyethylene (30) nonylphenol; polyoxyethylene (4) nonylphenol; polyoxyethylene (5) nonylphenol; polyoxyethylene (6) nonylphenol; polyoxyethylene (8) nonylphenol; Polyoxyethylene (9) Nonylphenyl Ether; polyoxyethylene (n)-nonylphenyl ether; Polyoxyethylene nonylphenol; POE nonylphenol; Protachem 630; Sterox; Surfionic N; T-DET-N; Tergitol NP; Tergitol NP-14; Tergitol NP-27; Tergitol NP-33; Tergitol NP-35; Tergitol NP-40; Tergitol NPX; Tergitol TP-9; Tergitol TP-9 (non-ionic); Triton N; Triton X; Dowfax 9N; ethoxylated nonylphenol; glycols, polyethylene, mono(nonyl-phenyl)ether; Igepal CO; Igepal CO-630; macrogol nonylphenyl ether; Makon; Neutronyx 600; Nonipol NO; nonoxinol; nonoxynol; Nonoxynol-15; Nonoxynol-18; Nonoxynol-20; nonyl phenol ethoxylate; nonylphenol polyethylene glycol ether; nonylphenol, polyoxyethylene ether; nonylphenoxypolyethoxyethanol; nonionic surfactants having a polyalkylene oxide polymer as a portion of the surfactant molecule, such as chlorine-, benzyl-, methyl-, ethyl-, propyl-, butyl- and other similar alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ethers; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers including an ethylene oxide/propylene oxide block copolymer such as those commercially available under the trademark PLURONIC® (BASF-Wyandotte).

Silicone surfactants also can be used. For example, in some embodiments, the silicone surfactant includes a surface active polydiorganosiloxane, such as described in U.S. Pat. No. 4,421,656. In some embodiments, the silicone surfactant can be selected from among dimethicone copolyols and alkyl dimethicone copolyols and blends thereof. Examples of such silicone surfactants include the blends of dimethicone copolyol and cyclomethicone, such as sold by Dow Corning (Midland, Mich.) under the name DC3225C or DC2-5225C, a polyalkyl polyether polysiloxane copolymer having an alkyl radical containing from 5 to 22 carbon atoms, such as cetyl dimethicone copolyol, such as that sold under the name Abil® EM-90 by EVONIK Goldschmidt GmbH (Essen, Germany), the mixture of dimethicone copolyol and cyclopentasiloxane (85/15), such as that sold under the name Abil® EM-97 by Goldschmidt, linear-type polyether-modified silicone emulsifiers, including methyl ether dimethicones, such as PEG-3 methyl ether dimethicones, PEG-9 methyl ether dimethicones, PEG-10 methyl ether dimethicones, PEG-11 methyl ether dimethicones, and butyl ether dimethicones (available from Shin-Etsu (Akron, Ohio); branched-type polyether-modified silicone emulsifiers, such as PEG-9 polydimethylsiloxyetheyl dimethicone (Shin-Etsu), alkyl co-modified branched-type polyether silicones, such as lauryl PEG-9 polydimethylsiloxyethyl dimethicone (Shin-Etsu), silicones containing polyalkylene oxide groups, such as the commercially available emulsifier Silwet® 7001, manufactured by Momentive Performance Materials (Albany, N.Y.), Dow Corning FG-10, Silwet® L-77 (polyalkylene oxide modified heptamethyl trisiloxane containing a methyl end group and 1 pendant group and having an average molecular weight of 645) and Silwet® L-7608 (polyalkylene oxide modified heptamethyl trisiloxane containing a hydrogen end group and one pendant group and having an average molecular weight of 630) available from Momentive Performance Materials; Lambent™ MFF-199-SW (containing a hydrogen end group and one pendant polyethylene oxide group and having an average molecular weight between 600 to 1000) available from Lambent Technologies Inc. (Gurnee, Ill.); silicone copolyol based carboxylate esters, such as SW—CP—K (containing a phthalate end group and one polyethylene oxide pendant group and having an average molecular weight between 800 and 1100) and Lube CPI (containing a phthalic acid end group and 3 to 5 pendant groups and having an average molecular weight between 2900 and 5300) available from Lambent Technologies Inc.; alkyldimethicone copolyol type surfactants, such as described in U.S. Pat. No. 7,083,800, including such silicone emulsifiers commercially sold under the names "Abil® WE 09", "Abil® WS 08" and "Abil® EM 90" (EVONIK Goldschmidt GmbH, Essen, Germany) and cationic silicone emulsifiers, such as described in U.S. Pat. No. 5,124,466.

Exemplary cationic surface active agents include but are not limited to homopolymers and copolymers derived from free radically polymerizable acrylic or methacrylic ester or amide monomers. The copolymers can contain one or more units derived from acrylamides, methacrylamides, diacetone acrylamides, acrylic or methacrylic acids or their esters, vinyl lactams such as vinyl pyrrolidone or vinyl caprolactam, and vinyl esters. Exemplary polymers include copolymers of acrylamide and dimethyl amino ethyl methacrylate quaternized with dimethyl sulfate or with an alkyl halide; copolymers of acrylamide and methacryloyl oxyethyl trimethyl ammonium chloride; the copolymer of acrylamide and methacryloyl oxyethyl trimethyl ammonium methosulfate; copolymers of vinyl pyrrolidone/dialkylaminoalkyl acrylate or methacrylate, optionally quaternized, such as the products sold under the name GAFQUAT™ by International Specialty Products; the dimethyl amino ethyl methacrylate/vinyl caprolactam/vinyl pyrrolidone terpolymers, such as the product sold under the name GAFFIX™ VC 713 by International Specialty Products; the vinyl pyrrolidone/methacrylamidopropyl dimethylamine copolymer, marketed under the name STYLEZE™ CC 10 by International Specialty Products; and the vinyl pyrrolidone and quaternized dimethyl amino propyl methacrylamide copolymers such as the product sold under the name GAFQUAT™ HS100 by International Specialty Products; quaternary polymers of vinyl pyrrolidone and vinyl imidazole such as the products sold under the trade name Luviquat® (product designation FC 905, FC 550, and FC 370) by BASF; acetamidopropyl trimonium chloride, behenamidopropyl dimethylamine, behenamidopropyl ethyldimonium ethosulfate, behentrimonium chloride, cetethyl morpholinium ethosulfate, cetrimonium chloride, cocoamidopropyl ethyl-dimonium ethosulfate, dicetyldimonium chloride, dimethicone hydroxypropyl trimonium chloride, hydroxyethyl behenamidopropyl diammonium chloride, quaternium-26, quaternium-27, quaternium-53, quaternium-63, quaternium-70, quaternium-72, quaternium-76 hydrolyzed collagen, PPG-9 diethylammonium chloride, PPG-25 diethylammonium chloride, PPG-40 diethylmonium chloride, stearalkonium chloride, stearamidopropyl ethyl dimonium ethosulfate, steardimonium hydroxypropyl hydrolyzed wheat protein, steardimonium hydroxypropyl hydrolyzed collagen, wheat germamido-propalkonium chloride, wheat germamidopropyl ethyldimonium ethosulfate, polymers and copolymers of dimethyl diallyl ammonium chloride, such as Polyquarternium-4, Polyquaternium-6, Polyquaternium-7, Polyquaternium-10, Polyquarternium-11, Polyquarternium-16, Polyquaternium- 22, Polyquaternium-24, Polyquarternium-28, Polyquaternium-29, Polyquarternium-32, Polyquarternium-33, Polyquarternium-35, Polyquarternium-37, Polyquarternium-39, Polyquarternium-44, Polyquarternium-46, Polyquarternium-47, Polyquarternium-52, Polyquarternium-53, Polyquarternium-55, Polyquarternium-59, Polyquarternium-61, Polyquarternium-64, Polyquarternium-65, Polyquaternium-67, Polyquarternium-69, Polyquarternium-70, Polyquarternium-71, Polyquarternium-72, Polyquarternium-73, Polyquaternium-74, Polyquaternium-76, Polyquaternium-77, Polyquarternium-78, Polyquaternium-79, Polyquarternium-80, Polyquarternium-81, Polyquarternium-82, Polyquaternium-84, Polyquaternium-85, Polyquaternium-87, PEG-2-cocomonium chloride, and mixtures thereof; polyalkyleneimines such as polyethyleneimines, polymers containing vinyl pyridine or vinyl pyridinium units, condensates of polyamines and epichlorhydrins; quaternary polyurethanes; salts of a primary, secondary, or tertiary fatty amine, optionally polyoxyalkylenated; a quaternary ammonium salt derivative of imidazoline, or an amine oxide; mono-, di-, or tri-alkyl quaternary ammonium compounds with a counterion such as a chloride, methosulfate, tosylate, including, but not limited to, cetrimonium chloride, dicetyidimonium chloride and behentrimonium methosulfate.

Anionic surfactants include, but are not limited to, one or more of a carboxylate such as, without limitation, alkylcarboxylates (e.g., carboxylic acid and/or its salts), polyalkoxycarboxylates (e.g., polycarboxylic acid and/or its salts), alcohol ethoxylate carboxylates, nonylphenol ethoxylate carboxylates, or combinations thereof; sulfonates such as, without limitation, alkylsulfonates, alkylbenzenesulfonates (e.g., dodecyl benzene sulfonic acid and/or its salts), alkylarylsulfonates, sulfonated fatty acid esters, or combinations thereof; sulfates such as, without limitation, sulfated alcohols, sulfated alcohol ethoxylates, sulfated alkylphenols, alkylsulfates, sulfosuccinates, alkylether sulfates, or combinations thereof; phosphate esters such as, without limitation, alkyl-phosphate esters; or combinations thereof. Exemplary anionic surfactants include sodium alkylarylsulfonate, alpha-olefinsulfonate, fatty alcohol sulfates and combinations thereof.

Exemplary amphoteric surfactants (or zwitterionic surfactants) include, but are not limited to, imidazoline derivatives, betaines, imidazolines, sultaines, propionates, amine oxides or combinations thereof, including imidazolinium betaine, dimethylalkyl lauryl betaine, alkylglycine, and alkyldi(aminoethyl)glycine.

The amount of surfactant provided in the composition injected into the fluid within the conduit can be between about 1 wt. % and about 95 wt. %. In some embodiments, the amount of surfactant in the composition can be between 2 wt. % and 80 wt. %. In some embodiments, the amount of surfactant in the composition can be between 5 wt. % and 50 wt. %. In some embodiments, the amount of surfactant in the composition can be between 50 wt. % and 100 wt. %. The amount of surfactant injected into the fluid within the conduit can vary, depending on the size of the conduit and the rate of flow of fluid through the conduit and thus the exact amount of surfactant depends somewhat on the circumstances. In some embodiments, the amount of surfactant can be in the range of 0.1 to 100 pounds/bbl (bbl=42 US gallons or about 159 L). In some embodiments, the amount of surfactant can be in the range of 1 to 75 pounds/bbl. In some embodiments, the amount of surfactant can be in the range of 5 to 70 pounds/bbl. In some embodiments, the amount of surfactant can be in the range of 10 to 60 pounds/bbl. In some embodiments, the amount of surfactant can be in the range of 25 to 50 pounds/bbl.

When the second material to be introduced into the fluid of the conduit via the auxiliary injector(s) is a bridging fluid, any suitable bridging fluid that is converted from a liquid state to a solid state at cryogenic temperatures can be used. Exemplary bridging fluids include water, methanol, ethanol, isopropanol or combinations thereof. When the bridging fluid is introduced into a gas in the conduit and enters the thermodynamic valve, the lower temperature of the conduit in the thermodynamic valve causes the conversion of the liquid bridging fluid into a solid state. As the bridging fluid becomes solid, it accumulates to form a plug within the thermodynamic valve device, thereby forming a plug and preventing the flow of the gas through the thermodynamic valve device.

In embodiments of the thermodynamic valve devices described herein that include a auxiliary injector for introducing a bridging fluid, the injector can be positioned upstream or downstream of the cryogen injector. In some embodiments, the bridging fluid auxiliary injector can be positioned upstream of the cryogen injector. In some embodiments, the bridging fluid auxiliary injector can include a heating device. The heating device can be configured to be activatable upon activation of a valve that controls the bridging fluid auxiliary injector. In some embodiments, when the bridging fluid auxiliary injector is activated, a heating device can be activated to maintain the site of injection of the bridging fluid into the fluid in the conduit above the freezing temperature of the bridging fluid so that the bridging fluid injector does not become blocked with bridging fluid as the bridging fluid is delivered into the fluid in the conduit.

Any heating device can be used. For example, U.S. Pat. No. 4,849,611 describes a plurality of discrete, spaced-apart heating devices that can be configured about the bridging fluid port. Curie temperature heaters, temperature limited heaters, conductor-in-conduit heat sources and heater strips can be used as a heating device (see, e.g., U.S. Pat. Nos. 3,793,716; 3,814,574; 3,971,416; 4,238,640; 7,461,691; and 7,066,730; and U.S. Pat. Pub. No. 2005-0092483). Other exemplary heating devices include Positive Thermal Coefficient ceramic heaters, thick film ceramic heaters, resistance wire or resistance ribbon heating devices, such as those containing nickel alloys, such as Nichrome 80/20 or Cupronickel (CuNi) or FeCrAl alloys, such as Kanthal. The resistance wire or resistance ribbon heating devices can be enclosed in a ceramic insulating binder (such as $TiO_2$, MgO, diatomaceous earth or alumina powder or combinations thereof). Commercial embodiments of such heating devices are available (Calrod™ heaters), which could be configured to heat the bridging fluid port.

In some embodiments, the injector(s) or injector devices inject the cryogen across a well casing, delivering the cryogen into the fluid, reducing the temperature of the fluid. In some embodiments, passages in the well casing are provided for the injection devices to be positioned to direct the ejection of cryogen directly into the fluid in the producing tubular when the injector system is activated. For example, the last piece of casing of the first string (or two or more of the strings, which have larger diameter bores) of the well casing can include tubing for injection of cryogen into the fluid. In some embodiments, tubes or conduits that can be used to deliver cryogen to the cryogen injector module can be fabricated into each layer of casing and the casings then can be aligned to produce the passageways to deliver cryogen to the cryogen injector module before placing into the well hole. In some embodiments, the tubing to convey the cryogen can be incorporated into an annular space formed between two concentric pipes. In some embodiments, the pipes of the casing can be fabricated to include one or more channels in the walls of the pipe to serve as channels for delivery of cryogen. Such channels in the walls of the pipe can be fabricated by any method known to those skilled in the art. For example, the pipes can be made via injection molding to include the desired channels for delivery of cryogen to the injectors. A channel for delivery of cryogen can be within an inner annulus of the well casing or in a gun-drilled channel in the well casing.

In some embodiments, the last or several of the last strings of casing can include material that exhibits high tensile strength under cryogenic conditions. For example, in some embodiments, the casings can include channels or conduits that include a cladding of high tensile strength material that is compatible with cryogenic fluids. For example, the channels in the casings can include a cladding of an alloy having a ductile fracture mode higher than steel and a brittle fracture mode lower than steel. In some embodiments, the casings can be made of a material that exhibits high tensile strength under cryogenic conditions. For example, steel alloys, particularly steel containing Cr, Ni or Si, can exhibit a high ductile fracture mode and a low brittle fracture mode. Alloys having a ductile fracture mode higher than steel and a brittle fracture mode lower than steel are known in the art. Examples of such alloys include those described in U.S. Pat. Nos. 5,352,304; 6,183,573; 6,212,891; 7,235,212; 7,648,597 and 7,727,463.

In embodiments in which channels in the casings are used to deliver cryogen to the injectors, the channels can include a thermal isolation means to isolate the channels from the ambient environment outside of the channel. The thermal isolation means can include a layer or coating of a thermally insulating material. The thermal isolation means can be fabricated from a thermally non-conductive material or a material having low thermal conductivity, or can include a casing that contains a thermally non-conductive material or a material having low thermal conductivity. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2-trichloro-trifluoroethane, 1,2-dichloro-tetrafluoroethane, tetrafluoroethane, argon, carbon dioxide, diethyl ether, isobutane, pentane, perfluoro-cyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof. The channels also can include temperature and/or pressure sensors.

In some embodiments, tubing can connect a cryogen supply module to one or more injectors, directly or via a distribution hub connecting the cryogen supply module to the injectors. Any method known in the art for controlling the flow rate of a cryogenic liquid through tubing to the injector(s) or injector device(s) can be used. For example, in some embodiments, the injector devices can include a valve that can regulate the flow of the cryogenic liquid to achieve the desired flow rate and discharge of cryogenic liquid through the nozzle of the injector device. In some embodiments, the rate of flow of cryogenic liquid is modulated by using a "throttling" gas having a pressure greater than or equal to the pressure of the cryogenic liquid, a temperature greater than the temperature of the cryogenic liquid; and a boiling point less than or equal to the temperature of the cryogenic liquid, such as described in U.S. Pat. Appl. Publ. No. 2008-0048047.

The cryogen injector module can include one-way valves to prevent fluid from the conduit from entering the injector modules when the unit is in stand-by and not operating. When operating, the one-way valves can open and release cryogen directly into the fluid in the conduit, such as oil in a production tubular in an oil well casing. Because the pressure of the cryogen exiting the injectors is sufficiently high, no fluid from the conduit can enter into the injectors.

In some embodiments, the injector devices can include nozzles that are high pressure flow nozzles. In some embodiments, the injector devices can produce a stream of cryogenic liquid as a coherent jet. Any flow nozzle or injector device known in the art compatible with cryogens can be used. Examples of flow nozzles and injector devices are described in, e.g., U.S. Pat. Nos. 4,095,747; 4,350,027; 4,789,104; 5,385,025; 5,527,330; 5,944,686; 6,070,416; 6,164,078; 6,363,729 and 7,740,287 and U.S. Pat. Appl. Pub. Nos. 2002-0139125 and 2008-0048047.

In some embodiments, the injector of the injector device can be a hollow drill bit. When the device is to be activated, the hollow drill bit can be used to drill through the casing and into the conduit containing the fluid, e.g., crude oil. The hollow drill bit can be attached to the cryogen injector module and the hollow drill bit can serve as an injector to inject cryogen into the fluid, e.g., crude oil. In such embodiments, the cryogen injector unit can include a drill to power the hollow drill bit through the side of the casing. In some embodiments, the rate of flow of cryogen through the injectors of the injector device can be modulated by adjusting the rate of flow of cryogen into the channels built into the risers or casing. In embodiments where a hollow drill bit serves as an injector, the cryogen injector module can include a drill for placement of the hollow drill bit through the casing and into fluid contact with the fluid in the conduit. The drill can be an integral part of the cryogen injector module or can be located at a remote location but still in communication with the cryogen injector module. For example, the drill can be part of the cryogen injector module and mounted on the outermost layer of casing. In some embodiments, the drill can be attached to the casing at all times and can automatically begin to drill the bit through the casing and into fluid communication with the fluid within the conduit without repositioning the drill. In some embodiments, the drill bit is placed perpendicular to the surface of the casing in which the injector is to be placed. The perpendicular placement can minimize the amount of casing through which the drill bit must pass. In some embodiments, because of the protrusion produced from the combination of drill bit and drill, the drill can be in a stand-by position and not positioned to drive the bit through the casing without placement. In some embodiments, because of the protrusion produced from the combination of drill bit and drill, the drill bit can be positioned at an oblique angle, which can reduce the amount of protrusion of the drill bit and drill from the outermost layer of casing.

In other embodiments, particularly where the injector can be attached to piping that serves as a cryogen liquid supply line to deliver cryogen to the injectors from a cryogen supply module, the cryogen liquid supply line can include one or more activatable valves that can modulate the flow of cryogen fluid from a cryogenic liquid supply to the injector device(s).

Figure 9:
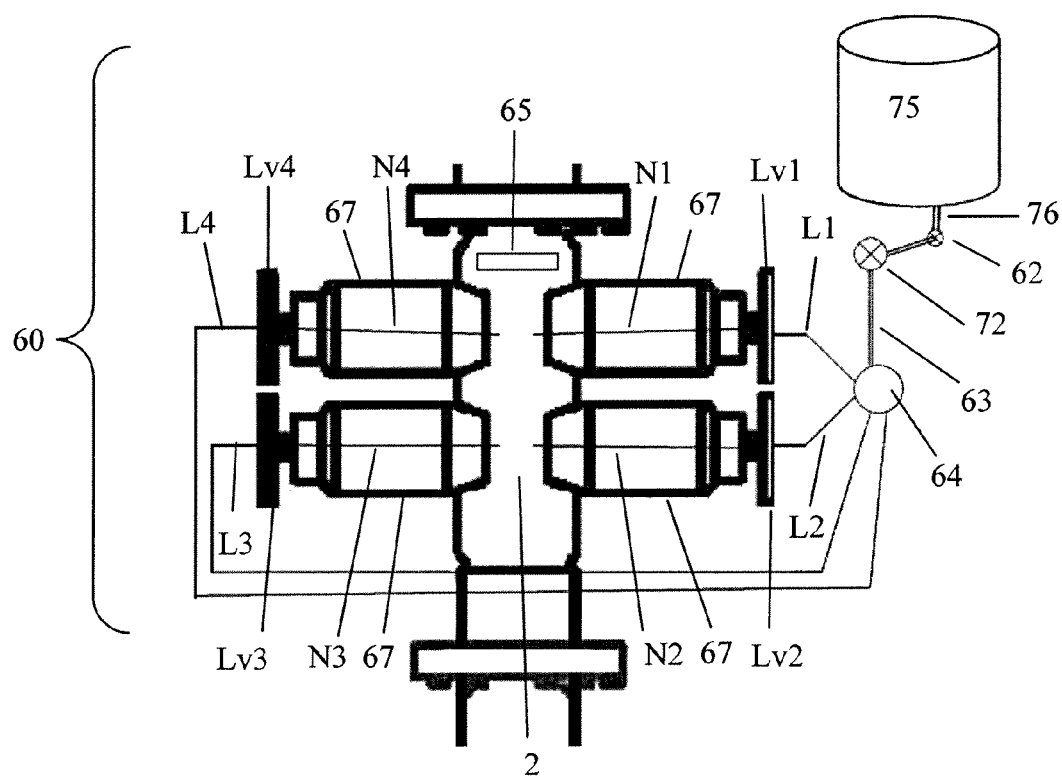
FIG. 9 is a side view of an example of a vertical embodiment of a cryogen injector module.

With reference to FIG. 9, which illustrates an example of an embodiment of a cryogen injector module 60, the outlet 76 of the cryogen liquid supply module 75 can be connected to a modulating valve 72 that regulates the flow of cryogen liquid from the supply module. The modulating valve 72 can be connected to an inlet port 63, which can be connected directly or via a distribution hub 64, to supply lines L1 through L4 and respective solenoid valves Lv1 through Lv4 to provide cryogen nozzles N1 through N4 of the injector devices 67. The nozzles N1 through N4 of the injector devices 67 inject cryogen into the fluid 70 within the conduit. Since the tubing of the supply lines L1 through L4 can shrink upon cooling due to contact with the cryogen liquid from the cryogen liquid supply module 75, any method known in the art to prevent excessive tensile stresses on the tubing can be used, such as a spring-loaded, contracting, bellows-type, stainless steel hose. In some embodiments, the cryogen liquid supply module 75 can be connected to the cryogen injector module 60 via insulated pipes, such as by use of jacketed high density polyethylene, polyurethane and/or fiberglass reinforced polyester resin insulated pipe, vacuum jacketed pipe or dual concentric prestressed pipe (e.g., see U.S. Pat. Nos. 3,530,680; 3,693, 665; 3,865,145 and 4,219,224).

Carbon steel generally will turn brittle and lose its structural strength at cryogenic temperatures. Accordingly, carbon steel is not the material of choice for the tubing within the cryogen injector module. The tubing can be made of stainless steel, aluminum, copper, or cryogenically compatible polymers, such as fiber-reinforced epoxy composites and ultra-high molecular weight polyethylene. The tubing or pipes also can be of an alloy having a ductile fracture mode higher than steel and a brittle fracture mode lower than steel. Exemplary alloys include those described in U.S. Pat. Nos. 5,352,304; 6,183,573; 6,212,891; 7,235,212; 7,648,597 and 7,727,463.

The cryogenic liquid from the cryogen liquid supply module 75 generally is maintained at or close to its boiling point at low temperature and any contact with other materials at a higher temperature will result in transfer of heat from that material to the liquid resulting in boil-off of liquid and reduction of the temperature of the material. The liquid is therefore normally stored in and transferred through well insulated tanks and pipes. In some embodiments, the cryogen injector module 60 can include one or more thermal monitoring devices 65.

The modulating valve 72 and/or solenoid valves Lv1 through Lv4 can be used to regulate the flow of cryogen liquid from the cryogen liquid supply module 75 to and through the nozzles N1 through N4 of the injector devices 67. If it is determined that, e.g., all four nozzles N1 through N4 are not needed in a given freezing and plugging operation, any one or more of the valves Lv1 through Lv4 can be modulated to restrict or stop the flow of cryogen liquid through the nozzles of the injector devices. An electric, programmable controller, e.g., a computer module 55 (not shown in FIG. 9) with appropriate hardware and software, can be used to control the valve opening and closing and their sequence. The computer module 55 can be connected to the valves, a control panel and, optionally, to remote temperature and/or pressure sensors. The shape and rate of flow of liquid cryogen from the nozzles of the injector devices into the fluid to be frozen within the conduit to be plugged can be modulated by different combinations of nozzle aperture size, liquid flow rate and liquid pressure. For example, stainless steel nozzles or injectors with larger aperture diameters allow more material to flow through the nozzle at a given rate than nozzles with smaller aperture diameters.

The nozzles N1 through N4 of the injector devices 67 can be placed at longitudinally and/or radially spaced locations along the conduit 2 to inject cryogen at different locations into the fluid 70 in the conduit 2. The rate of flow of cryogen can be regulated, e.g., by using modulating valve 72 and/or valves Lv1 through Lv4 to modulate flow of cryogen through the supply lines L1 through L4 and nozzles N1 through N4 and into the fluid. In some embodiments, the nozzles N1 through N4 can have changeable orifice areas. In some embodiments, each of the injection devices 67 includes a nozzle N, which can be spring-loaded to be in the closed position and can include a movable plug that produces a changing orifice area either relative to the fluid pressure or relative to a fluid counter-pressure. For example, injector devices similar to the devices described in U.S. Pat. No. 3,815,377 can be used. In some embodiments, the nozzle N can be a tube or pipe that delivers cryogen to the fluid. In some embodiments, the tube can include a nozzle at one end to deliver the cryogen into the fluid in the conduit. In some embodiments, the injector or injection devices 67 are not in fluid contact with the fluid 70 but inject cryogen into the fluid 70. For example, the injector or injection devices 67 can be in a tube or pipe or conduit attached to the conduit 2 and separate therefrom by a valve 19 that prevents flow of fluid 70 from conduit 2 into the injector. When the injector is activated, the valve 19 can be opened, manually or remotely, such as electrically or via computer control, so that cryogen from the injector can be introduced into the stream of flowing fluid 70 without the injector protruding into the flowing fluid.

In some embodiments, each injector device 67 has a nozzle N with an orifice that is biased to a normally closed position, and the spring pressure can be set so as to close the orifice at a predetermined pressure. For example, when liquid nitrogen is used as the cryogen, the spring pressure can be set so as to close the orifice at about 30 psia. Accordingly, when the modulating valve 72 opens to admit liquid cryogen from the supply module 75 into supply lines L1 through L4, and the pressure exceeds this pressure set point, the individual nozzles will open and begin ejection of liquid cryogen into the fluid within the conduit. In some embodiments, the injection devices 67 can be constructed so as to gradually enlarge the orifice area as the pressure that is supplied to the devices increases, such as by the opening or closing modulating valve 72 or any of valves Lv1 through Lv4. The injection devices 67, modulating valve 72 and valves Lv1 through Lv4 can be regulated by computer module 55.

In some embodiments, all of the cryogen injection devices 67 are designed to operate simultaneously at all times. In some embodiments, each nozzle N of each injector device 67 individually can be modulated, such as by being regulated by computer module 55 or manually through valves. The combination of the modulating valve 72 and the computer module 55 provides an extremely efficient way of maintaining the temperature of the conduit within the module within a relatively precise range.

In operation, a cryogenic liquid can be delivered to at least one injector device that is in fluid communication with a fluid within a conduit. The cryogen liquid, on contact with the fluid, e.g., crude oil or natural gas, absorbs thermal energy from the fluid and can be transformed into gas, which is carried away from the site of application with the flow of fluid. The amount of liquid cryogen delivered to the injector device(s) and thus the fluid within the conduit can be modulated, such as by computer module 55, in order to achieve a desired cooling rate of the fluid.

In some embodiments, flow rate meters can be included in the injector device(s), or in the pipes or tubing that deliver cryogen to the injector device(s) or any combination thereof. The flow rate meters can be in communication with a computer module. Data from the flow rate meters can be used to determine the flow of cryogen through the system, particularly though the injector devices, and can be used to modulate the rate of flow of cryogen through the system, either manually or automatically by computer control. Flow rate meters can be included throughout the path of fluid communication from the cryogen supply module to the exit point of the cryogen from the injectors into the fluid for determination of rate of flow of cryogen through the system. Any flow meter known in the art can be used in the system. The flow meter can include a paddle wheel flow meter, a turbine flow meter, a magnetic flow meter, optical sensors, electromagnetic velocity sensors, coriolis force flow meters, thermal flow meters, ultrasonic flow meters or any other type of flow meter known in the art. Examples of flow meters known in the art include U.S. Pat. Nos. 7,730,777; 7,707,898; 4,934,196; 4,422,338 and RE 31,450, and U.S. Pat. Appl. Pubs. 2009-0281671, 2005-0288873 and 2004-0244498.

In some embodiments, heating units can be included in thermal communication with the injectors to modulate the temperature of the injector during operation.

C. PROPHYLACTIC CRYO-THERMODYNAMIC VALVE SYSTEM

Also provided herein is an integrated prophylactic CryoPlug cryo-thermodynamic valve system for installation in a well line, such as an oil well or gas line, for reversible plugging of the line. In some embodiments, the cryo-thermodynamic valve system is attached directly or indirectly to the casing or well head of the well. In normal fluid recovery processes from a well, the system is not active and is not cooling the conduit nor is it injecting cryogen into a fluid within the conduit (it can be considered to be in stand-by mode) and the cryo-thermodynamic valve system serves as a conduit for the fluid within the production tubular to flow. When it is desirable to stop the flow of the material through the conduit, the cryo-thermodynamic valve system can be activated to freeze at least a portion of the material flowing inside the conduit, forming a reversible frozen plug of material that can stop the flow of material through the conduit. In some embodiments, the cryo-thermodynamic valve system includes a thermal transfer device as described above. In some embodiments, the cryo-thermodynamic valve system includes a cryogen injector module as described above. In some embodiments, the cryo-thermodynamic valve system includes a thermal transfer device and a cryogen injector module, as described above.

The integrated prophylactic cryo-thermodynamic valve system is a system that can include a cryogenic thermodynamic valve that addresses limitations of cryogenic freeze pressure isolation technologies known in the are in many important ways, including having improved economics (dramatically lower cost than conventional valves), demonstrating very low maintenance requirements, being prophylactic, being installed in line with a well casing or other conduit, having no effect on flow until activated, rapidly controlling flow once fully activated, being able to variably control flow, being capable of being installed above or below-ground or sea applications including deep water applications and capable of undergoing multiple freeze-thaw cycles and thus avoiding the need to be replaced after activation.

U.S. Pat. No. 3,631,870 teaches that the problem of liquid flow stoppage in a pipeline is solved if the pipeline contains an installed means such as a valve for terminating the liquid flow. The patent teaches that a plug could be formed in the pipeline by introduction of a gelling agent. U.S. Pat. No. 4,370,862 teaches forming a plug of ice in a pipeline by freezing water in the pipeline that is maintained in a static condition. U.S. Pat. No. 5,125,427 teaches that forming a plug in a pipeline by freezing, such as by injecting water into the pipeline and then freezing the water in place is subject to certain problems, including the need for an excessive amount of cooling to form the plug, stating that many hours or even days are required to form a plug of water in large diameter lines. These prior art techniques lacked an effective heat sink for efficient heat transfer from the flowing fluid to the heat sink. The devices, systems and methods described herein include an efficient heat sink for effective heat transfer from a flowing fluid in a conduit, resulting in rapid formation of a frozen plug of fluid.

The thermodynamic valves provided herein do not require precision machining or other high cost manufacturing techniques. In large scale production, the installed cost of this device would be slightly greater than the surrounding sections of tubular, but insignificant relative to the cost of additional large diameter ball valves or blow-out preventers. The devices and systems provided herein can include features that allow remote activation in under-water, below ground, or sealed-in concrete applications. The devices and systems can be incorporated into well casing and cemented in place at relatively low incremental cost.

The devices, systems and methods provided herein generally are designed so as to not include any items that protrude into the flow channel and thus installation of the heat exchange unit and/or the cryo-thermodynamic valve device would not interfere with the various pigs that transit the pipelines and conduits internally to separate product and perform monitoring and maintenance of the interior surface of the pipeline. Because anything protruding into the casing or flow tubular would generally be unacceptable, the heat exchange units and/or the cryo-thermodynamic valve devices provided herein avoid the disadvantages observed in prior art devices.

The devices, systems and methods described herein for providing a prophylactic cryo-thermodynamic valve system are operative to form a plug anywhere within a conduit. For example, an injector can be positioned so that upon activation, cryogen is injected to form a frozen plug within a production tubing string. In some embodiments, an injector can be positioned so that upon activation, cryogen is injected to form a frozen plug in the annulus between the production casing string and the production tubing string above the oil producing zone, such as in the event of a packer blow-out. A packer blow-out can occur upon failure of the packer installed in a producing well to seal the annulus between the production casing string and the production tubing string above the oil producing zone. When a packer blow-out occurs, effluent flows uncontrollably out of the well through the production casing string external from the production tubing string. By forming a frozen plug in the annulus, effluent flow can be prevented from exiting the well through the production casing string. In some embodiments, injectors can be positioned to inject cryogen into a production tubing string and into the annulus between the production casing string and the production tubing string.

The devices, systems and methods described herein overcome many disadvantages known in the art related to technology for controlling a blown-out well or pipeline. In the devices, systems and methods provided herein, there is no need to isolate, divert or stop the flow of fluid within the conduit or flow tubular. The devices, systems and methods provided herein can produce a plug in fluid flowing through the conduit or flow tubular. Thus, no extra mechanisms are required to divert or arrest the flow of fluid in the conduit prior to use of the devices, systems and methods provided herein. As discussed in more detail in the Examples, field demonstrations with a 1" vertically oriented cryo-thermodynamic valve apparatus froze crude oil flowing at 10 feet per second and field demonstrations with 3.25" horizontal apparatus froze crude oil flowing at 2.5 ft/sec.

The devices, systems and methods provided herein also overcome other disadvantages known in the art. For example, U.S. Pat. No. 3,738,424 describes a method of controlling a blown-out oil. U.S. Pat. No. 3,738,424 is particularly directed to controlling blow-outs in off-shore, producing oil wells. Following installation of the intermediate casing within the well, valves are welded to the external surface of the outermost casing by divers who perform the welding operations under water. Each valve receives a drill bit for drilling a hole through the various layers of casing in the event of a blow-out after production operations have commenced. After a hole has been drilled through the layers of casing proximate to each valve, the drill bits are removed from the valves, and tubes for circulating liquid nitrogen are connected to the valves. The liquid nitrogen is circulated adjacent to the production tubing string in order to freeze a solid plug therein. In the devices, systems and methods provided herein, the cryo-thermodynamic valve devices can include valves operated remotely or manually that introduces the refrigerant or cryogen into the heat exchange unit or an injector assembly or both. The cryo-thermodynamic valve as described herein can be used to regulate the flow of liquid or gas fluids in a conduit by solidifying at least a portion of the fluid in the conduit or by making the fluid highly viscous. The cryo-thermodynamic valve as described herein can be a permanent attachment on a conduit in a system or an attachable device as described herein.

U.S. Pat. No. 3,857,255 describes a device for surrounding a pipe with a cryogen. The patent does not describe a very efficient thermal transfer device. Merely spraying a cryogen on a warm pipe will not produce an efficient extraction of thermal energy from the pipe. The devices and systems designed herein address this lack of an efficient heat exchange mechanism. In the devices, systems and methods provided herein, the cryo-thermodynamic valve devices can include filings, turnings, shavings, pellets or beads of a thermally conductive metal in the space between the interior wall of the heat exchange unit. The thermally conductive filings, turnings, shavings, pellets or beads act to reduce the Leidenfrost effect, particularly in a cryogenic liquid, such as liquid argon, nitrogen, helium, oxygen or compressed gas. The Leidenfrost effect is a phenomenon observed in liquids in contact or in very close contact with a mass significantly hotter than the liquid's boiling point. When the liquid is in close proximity to a mass significantly hotter than the liquid's boiling point, the liquid boils and produces an insulating vapor layer that keeps that liquid from boiling rapidly. Including the filings, turnings, shavings, pellets or beads of a thermally conductive metal reduces the Leidenfrost effect. An added benefit is the increase the surface area of thermal transfer within the heat exchange unit and the reduction in the amount of cryogen required to fill the heat exchange unit. The filings, turnings, shavings, pellets or beads of a thermally conductive metal in the heat exchange unit, alone or in combination with the thermal conducting fins attached to the conduit and extending through the cavity of the heat exchange unit in thermal communication with the filings, turnings, shavings, pellets or beads of a thermally conductive metal in the heat exchange unit, can serve as a very efficient heat sink for the transfer of thermal energy out of the fluid within the conduit, allowing for formation of a frozen plug of fluid without the need for diverting or arresting the flow of fluid through the conduit. One or more heat exchange units can be combined in series to increase the effective length of the heat exchange unit and thus the length of the heat sink.

In some embodiments, the cryo-thermodynamic valve can be activated remotely. This can be readily accomplished by providing a suitable source of cryogen. In surface applications where very rapid activation may be required such as during drilling operations, cryogenic liquid could be maintained on-site utilizing pressurized Dewar flask(s) or a tanker. Cryogenic refrigeration systems could obviate the need to for inventories of liquefied gases, for sub-sea applications or when operation may be needed over a long period, electrically activated cryogenic refrigeration technology is envisioned. Alternatively, Dewars of liquid cryogen could be maintained in reserve at a central location and transported to cryogenic valve via truck or helicopter should activation be required.

The flow of cryogen into the heat exchange unit and/or cryogen injector can be modulated, e.g., to allow for evaporation of the liquid cryogen in response to the transfer of heat from the conduit and fluid therein, with the vapor being exhausted from the heat exchange unit through output ports and from the fluid within the conduit with the flowing fluid. The flow of cryogen can be increased or decreased and adjusted to replenish evaporated cryogen. The rate and frequency at which cryogen can be introduced into the heat exchange unit and/or the cryogen injector can be determined by one skilled in the art, such as by sensing the temperature of the heat exchange unit or the flowing fluid within the conduit. This function can be performed manually or automatically with a temperature sensor, which can be in communication with a computer module. In some embodiments, additional cryogen can be injected into the heat exchange unit to replenish liquid cryogen that has evaporated when the temperature of the heat exchange unit increases to a predetermined temperature as indicated by a temperature sensor in thermal communication with the interior of the heat exchange unit.

All components of the cryo-thermodynamic valve system can be fabricated from material that is suitable for use with cryogens. For example, the system can be composed of any material that is relatively unaffected by cold temperatures and expected pressures. Exemplary materials that adequately withstand the expected temperatures and pressures of cryogenic liquids include, but are not limited to, steel, fiberglass, graphite, plastics, carbon fibers and combinations thereof. For example, steel alloys, particularly steel containing Cr, Ni or Si, can exhibit a high ductile fracture mode and a low brittle fracture mode. Alloys having a ductile fracture mode higher than steel and a brittle fracture mode lower than steel are known in the art. Exemplary alloys include those described in U.S. Pat. Nos. 5,352,304; 6,183,573; 6,212,891; 7,235,212; 7,648,597 and 7,727,463.

The heat exchange unit is in thermal contact with the metal conduit that is to be plugged when the system is activated and the cryogen injector module can be positioned so that it can be in fluid contact with the fluid within the conduit when activated. In some embodiments, an injector module is integrated into the heat exchange unit. In some embodiments, a heat exchange unit and a cryogen injector module can be in close proximity to each other or can be separated from each other by some distance. In embodiments where the heat exchange unit and the cryogen injector module of the cryo-thermodynamic valve system are in close proximity to each other, they can be connected to each other using any appropriate connecting means known in the art. In some embodiments, the individual units include flanges that can be used to connect the heat exchange unit to the cryogen injector module. The flange can include any of a protruding rim, edge, rib, or collar, or combination thereof, and means for attachment for attaching a flange on the heat exchange unit to a flange on the cryogen injector module. In some embodiments, the units can be joined by welding the flange of one unit to the flange of another unit to join the two units together. In some embodiments, the flange of one unit is joined to a flange of another unit using a connecting means, such as a screw connection, a bolt and nut connection, rivet bolts, a bayonet fitting, interlocking tabs or any combination thereof. In some embodiments, one unit, such as the heat exchange unit, can include an external thread portion that screws into a corresponding inside thread portion of the other unit, such as the cryogen injector module, such that the two units can be joined by screwing the units together. In some embodiments, seals, such as O-rings, are included between the heat exchange unit and the cryogen injector module to provide a watertight and/or airtight seal. The seals can be made of any material known in the art that is compatible with the expected temperatures and pressures of operation of the cryo-thermodynamic valve system.

In some embodiments, the CryoPlug cryo-thermodynamic valve system includes a heat exchange unit. The heat exchange unit can be of any diameter or length. The selection of the diameter and length of the heat exchange unit can be predicated on the dimensions of the conduit to which the unit is to be attached and from which the heat exchange unit is to extract thermal energy and the rate of flow of fluid through the conduit.

The heat exchange unit can be of any diameter or length. The selection of the diameter and length of the heat exchange unit can be predicated on the dimensions of the conduit to which the unit is to be attached and from which the heat exchange unit is to extract thermal energy or the rate of flow of fluid flowing through the conduit or combinations thereof. For example, the outer diameter of tubing and piping encountered in many well applications can vary from 1 inch to 500 inches or more. The length of a single riser or flow tubular in some applications can vary from about 5 feet to about 100 feet or more, and many risers or flow tubulars can be interconnected, resulting in a pipeline that can span many thousands of feet or miles. A typical heat exchange unit can be of a length that is any portion of a riser or flow tubular, including 10%, 15%, 20%, 25%, 30%, 35%, 40%, 45%, 50%, 55%, 60%, 65%, 70%, 75%, 80%, 85%, 90%, 95% or 99%. In some embodiments, the heat exchange unit has a length of 2 feet, 3 feet, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, 21 feet, 22 feet, 23 feet, 24 feet, 25 feet, 26 feet, 27 feet, 28 feet, 29 feet, 30 feet, 31 feet, 32 feet, 33 feet, 34 feet, 35 feet, 36 feet, 37 feet, 38 feet, 39 feet, 40 feet, 41 feet, 42 feet, 43 feet, 44 feet, 45 feet, 46 feet, 47 feet, 48 feet, 49 feet, 50 feet, 55 feet, 60 feet, 65 feet, 70 feet, 75 feet, 80 feet, 85 feet, 90 feet, 95 feet, 100 feet, 200 feet, 300 feet, 400 feet, 500 feet, 600 feet, 700 feet, 800 feet, 900 feet, 1000 feet, 2000 feet, 3000 feet, 4000 feet, 5000 feet or a length between 2 feet and 5000 feet.

Two or more heat exchange units can be used in series to increase the effective length of the heat exchange unit. When a plurality of heat exchange units are attached to a conduit, the heat exchange units can be interconnected, such that refrigerant flows from one heat exchange unit to the next before venting or exiting the system. In some embodiments, each heat exchange unit can be connected to its own separate refrigerant or cryogen supply module.

The inner dimension of the heat exchange unit generally is about the same dimension of the conduit to which it is attached and in thermal communication. In some embodiments, the inner dimension of the heat exchange unit is the same as the conduit because the conduit forms the inner dimension of the heat exchange unit. In some embodiments, the heat exchange unit includes an inner conduit, which is the conduit that carries, transports or conveys a fluid when connected to other conduits or tubulars; and an outer conduit of a larger diameter or dimension than the inner conduit so that a gap or channel between the inner conduit and the outer conduit is formed The dimension of the outer conduit of the heat exchange unit is selected to provide a channel that can be filled with thermally conductive materials provided as fibers, threads, filings, turnings, spurs, shavings, pellets, shot, microbeads, beads or fragments through which the refrigerant or cryogen passes when it circulates through the heat exchange unit.

The particle size and distribution of fibers, threads, filings, turnings, spurs, shavings, pellets, shot, microbeads, beads or fragments of thermally conductive materials can be selected to modulate the filled volume or the number, size and distribution of void areas in the channel through which refrigerant or cryogen can pass. Particle packing is a characteristic trait of materials based on the size, shape and particle size distributions. A uniform particle size distribution can result in a uniform or mostly uniform distribution of void areas while maintaining the intimate contact between the particles. Materials having a distribution of particle sizes can be selected that contain a number of particles sized to fill some of the those voids created by the largest particle size component of the blend to reduce the number, size or distribution of voids formed by the particles in the heat exchange device, thereby allowing selection of different flow characteristics through the device. Mathematical models for making blends of materials using a multimodal mix of materials are available. The particles can be packed into the heat exchange unit using any method know in the art, including, e.g., pouring the particles into the unit or uniformly distributing the particles, such as by use of a particle loader, as described in U.S. Pat. No. 5,324,159.

The inner dimension of the heat exchange unit can be between 1 inch to 500 inches or more. In some embodiments, the heat exchange unit includes a thermal conducting surface 11 which is in thermal contact with the conduit to which the heat exchange unit is attached. The inner dimension of the thermal conducting surface 11 is such that it is in thermal communication with the conduit from which thermal energy is to be extracted. Hence, the skilled artisan can select the appropriate inner dimension of the thermal conducting surface 11 based on the outer dimension of the conduit to which the heat exchange unit is to be connected. As an example, in an embodiment where the conduit is a pipe having an outer diameter of about 3 inches, a diameter of a thermal conducting surface is selected so that it fits snuggly to the outer surface of the conduit and is in thermal communication with the conduit, such as having an inner diameter of about 3 inches.

The outer diameter of the heat exchange unit can be of any dimension that results in a channel between the inner surface and the outer surface of the heat exchange unit. For example, the outer diameter of the heat exchange unit can be selected so that the resulting channel formed between the inner surface and the outer surface of the heat exchange unit was a width that is between about 0.05 inch to about 500 inches. In some embodiments, the channel formed between the inner surface and the outer surface of the heat exchange unit has a width that is between about 0.1 inches to about 100 inches. In some embodiments, the channel formed between the inner surface and the outer surface of the heat exchange unit has a width that is between about 0.2 inches to about 50 inches. In some embodiments, the channel formed between the inner surface and the outer surface of the heat exchange unit has a width that is between about 0.4 inches to about 40 inches. In some embodiments, the channel formed between the inner surface and the outer surface of the heat exchange unit has a width that is between about 0.5 inches to about 30 inches. In some embodiments, the channel formed between the inner surface and the outer surface of the heat exchange unit has a width that is between about 0.6 inches to about 25 inches. In some embodiments, the channel formed between the inner surface and the outer surface of the heat exchange unit has a width that is between about 0.1 inches to about 10 inches. In some embodiments, the channel formed between the inner surface and the outer surface of the heat exchange unit was a width that is between about 0.8 inches to about 8 inches. In some embodiments, the channel formed between the inner surface and the outer surface of the heat exchange unit has a width that is between about 0.5 inches to about 5 inches. In some embodiments, the channel formed between the inner surface and the outer surface of the heat exchange unit has a width that is between about 1 inch to about 4 inches. In some embodiments, the width of the channel within the heat exchange unit is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.5, 11, 11.5, 12, 12.5, 13, 13.5, 14, 14.5, 15, 15.5, 16, 16.6, 17, 17.5, 18, 18.5, 19, 19.5, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490 or 500 inches.

In some embodiments, the outer dimension of the heat exchange unit is selected so that the width of the channel formed between the inner surface and the outer surface of the heat exchange unit is between about 10% to about 500% of the inner diameter of the heat exchange unit. For example, in embodiments where the conduit is a pipe and the inner diameter of the heat exchange unit attached to the pipe is 5 inches, the outer dimension of the heat exchange unit can be between about 5.5 inches and about 25 inches, producing a channel having a width of between about 0.5 and 20 inches.

In some embodiments, the outer dimension of the heat exchange unit is selected so that the width of the channel formed between the inner surface and the outer surface of the heat exchange unit is between about 10% to about 300% of the inner diameter of the heat exchange unit. For example, in embodiments where the conduit is a pipe and the inner diameter of the heat exchange unit attached to the pipe is 5 inches, the outer dimension of the heat exchange unit can be between about 5.5 inches and about 15 inches, producing a channel having a width of between about 0.5 and 10 inches.

In some embodiments, the outer dimension of the heat exchange unit is selected so that the width of the channel formed between the inner surface and the outer surface of the heat exchange unit is between about 10% to about 150% of the inner diameter of the heat exchange unit. For example, in embodiments where the conduit is a pipe and the inner diameter of the heat exchange unit attached to the pipe is 5 inches, the outer dimension of the heat exchange unit can be between about 5.5 inches and about 12.5 inches, producing a channel having a width of between about 0.5 and 7.5 inches. As a further example, in embodiments where the conduit is a pipe and the inner diameter of the heat exchange unit attached to the pipe is 10 inches, the outer dimension of the heat exchange unit can be between about 11 inches and about 25 inches, producing a channel having a width of between about 1 and 15 inches. In some embodiment, the outer dimension of the heat exchange unit is selected so that the width of the channel formed between the inner surface and the outer surface of the heat exchange unit is between about 25% to about 100% of the inner diameter of the heat exchange unit.

In some embodiments, the cryo-thermodynamic valve system includes a cryogen injector module. In some embodiments, the cryo-thermodynamic valve system includes a heat exchange unit and a cryogen injector module. In some embodiments, the cryo-thermodynamic valve system includes a cryogen injector module but does not include a heat exchange unit. In some embodiments, the cryo-thermodynamic valve system includes a cryogen injector integrated into a heat exchange unit.

In embodiments of the cryo-thermodynamic valve system that include a heat exchange unit and a cryogen injector module, the system can be assembled in any configuration. In some embodiments, when installed on a conduit that contains or will contain a flowing fluid, one or more cryogen injector modules can be positioned to be closest to the source of the fluid flowing through the conduit and the heat exchange unit can be positioned after the cryogen injector module relative to the source of the fluid. In some embodiments, the cryogen injector module can include injectors that span the length or one or more lengths of casings of a riser. For example, one or more strings of casings can be configured to include injector devices of the cryogen injector module.

In some embodiments of the cryo-thermodynamic valve system, the system includes a heat exchange unit that includes a refrigerant. The heat exchange unit can include a thermal conducting surface that can be configured so that it is in intimate thermal contact with the outer surface of the conduit that is to be cooled. In some embodiments, the conduit to be cooled formed the inner surface of the heat exchange unit and is the thermal conducting surface. The heat exchange unit thermal conductor surface includes a thermally conducting material. Any thermally conductive material known to those skilled in the art can be used. Examples of such materials include copper, brass, beryllium, cadmium, cobalt, chrome nickel steel, gold, silver, iridium, iron, lead, magnesium, molybdenum, nickel, platinum, tin, zinc, carbon steel, stainless steel, aluminum and any combination or alloy thereof. In some embodiments, the heat exchange unit or a thermally conductive surface thereof contains a single metallic conductor. In some embodiments, the heat exchange unit or a thermally conductive surface thereof contains multiple metallic conductors. In some embodiments, the thermal conductors can include substantially pure copper, copper alloys, substantially pure aluminum, aluminum alloys, substantially pure silver, silver alloys, substantially pure gold, and gold alloys and mixtures thereof.

In some embodiments, the heat exchange unit can include baffles that can be configured to direct the flow of cryogen or refrigerant within the heat exchange unit. The baffles can be of any configuration or design suitable for modulating the flow of refrigerant or cryogen through the heat exchange unit. The baffles can be perpendicular to the conduit or positioned at any angle relative to the conduit. The baffles can be of equal length, or can be of differing lengths to produce a circuitous route of flow of refrigerant or cryogen through the heat exchange unit. In some embodiments, the baffles can be arranged spirally about the conduit or flow tubular within the heat exchange unit.

In embodiments where the conduit is horizontal and parallel to the ground, the heat exchange unit can include baffles that modulate the flow of refrigerant or cryogen along the lower side of the heat exchange unit away from the conduit due to the effects of gravity on the cryogen or refrigerant. The baffles within the heat exchange unit can be positioned along the inside wall of the heat exchange unit opposite of the surface of the conduit forming chambers. When cryogen or refrigerant is introduced into the heat exchange unit so configured, the cryogen or refrigerant can flow into the unit and to fill the first chamber, placing the cryogen or refrigerant into thermal communication with the conduit despite any gravitation effects on the fluid due to the horizontal position of the conduit and the attached heat exchange unit, prior to flowing to the next chamber. The next chamber then can fill with refrigerant or cryogen fluid directing the fluid upward toward the conduit, until that chamber fills, and the process continues until the heat exchange unit is filled with refrigerant or cryogen fluid and the refrigerant or cryogen flows out of the outlet tube.

In configurations where a conduit is perpendicular to the ground, baffles can be used to direct the refrigerant or cryogen to minimize any dead zones (areas devoid of refrigerant or cryogen in contact with the conduit) within the heat exchange unit. The baffles can be positioned in any configuration. In some embodiments, the baffles can be positioned along the inside wall of the heat exchange unit to form a spiral from the input port to the output port to direct the fluid to the surface of the conduit. In some embodiments, the baffles can bisect the interior of the heat exchange unit. In some embodiments, baffles can be used to create separate chambers parallel to the conduit, and multiple input ports can be used to introduce the refrigerant or cryogen into the bottom (i.e., closest to the ground) of each chamber, and the fluid flows from the bottom of the chamber to the top of the chamber exiting one or more output ports.

In some embodiments, the heat exchange unit contains or is filled with filings, turnings, shavings, pellets or beads of a thermally conductive metal, and the refrigerant or cryogen flows through the heat exchange unit by percolating through the filings, turnings, shavings, pellets or beads of a thermally conductive metal. Heat is removed from the filings, turnings, shavings, pellets or beads and transferred to the cryogen or refrigerant, and the absorbed heat can be transferred out of the heat exchange unit.

In some embodiments, the heat exchange unit can include thermally conducting fins attached to the conduit or fluid tubular. The thermally conducting fins can be positioned at any location near to or in thermal contact with the conduit to increase the heat conducting area of the thermal exchange unit, thereby allowing the thermal energy of the conduit and its contents to more rapidly transfer to the heat exchange unit, including the cryogen or refrigerant and/or the cooled filings, turnings, shavings, pellets or beads of a thermally conductive metal within the heat exchange unit. In some embodiments, the thermal conducting fins are in thermal communication with the conduit and facilitate energy transfer from conduit to the cryogen or refrigerant and the cooled filings, turnings, shavings, pellets or beads of a thermally conductive metal within the heat exchange unit. The filings, turnings, shavings, pellets or beads of a thermally conductive metal within the heat exchange unit increase surface area and can channel fluid flow or induce turbulence, which can increase the efficiency of thermal transfer.

The filings, turnings, shavings, pellets or beads of a thermally conductive metal within the heat exchange unit, alone or in combination with thermally conducting fins positioned at any location near to or in thermal contact with the conduit, with the cryogen or refrigerant that passes through or is regenerated and recirculated through the heat exchange unit, create a heat sink within the heat exchange unit. Because of the heat capacity of the cooled filings, turnings, shavings, pellets or beads of a thermally conductive metal within the heat exchange unit, and the large surface area of contact that allows for fast exchange of thermal energy (heat transfer) within the heat sink from the conduit and fluid therein, thermal energy rapidly is absorbed and removed from the flow tubular (conduit) and the liquid contained therein at a rate sufficient to freeze flowing fluid within the flow tubular or conduit.

In some embodiments, the heat exchange unit can include one or more heating channels that traverses a portion of the length or the full length of the heat exchange unit. The heating channel(s) can be used to introduce a fluid, such as a gas or liquid, of a temperature greater than the frozen plug, to impart thermal energy to the frozen plug and thereby melt at least a portion of the plug. The flow of fluid through the heating channel is maintained at a rate to prevent freezing of the heating fluid. It some embodiments, a heated gas is pumped through the heating channel(s).

In some embodiments, the heating channel(s) can include a means of heating the channel to provide heat unilaterally or directionally to the plug of frozen flow formed within the conduit. This directed application of thermal energy to the conduit in proximity to the frozen plug therein allows for directed melting of the plug, such as to form a channel through the plug through which liquid fluid can flow. This prevents launching the frozen plug through the conduit, and permits controlled restoration of flow through the conduit. In some embodiments, the heating channel is a conduit, tube or pipe in thermal communication with the conduit or flow tubular. In some embodiments, the heating channel can be contained within the wall of the flow tubular or conduit, such as by use of precision machining of the heating channel.

The means of heating the heating channel can include any heating unit known in the art. For example, one or more discrete, spaced-apart heating units, such as described in U.S. Pat. No. 4,849,611 can be positioned throughout the channel, thereby allowing directed thermal energy to be applied to the conduit adjacent to the frozen plug within. Other heating devices also can be positioned within the channel, such as Curie temperature heaters, described in U.S. Pat. No. 7,461, 691, or temperature limited heaters, as described in U.S. Pat. Pub. No. 2005-0092483, or conductor-in-conduit heat sources as described in U.S. Pat. Pub. No. 2004-0020642, or heater strips, as described in U.S. Pat. No. 3,793,716, or resistive heating strips, as described in U.S. Pat. No. 4,238, 640. Other heating elements that can be used to heat the heating channel include those described in U.S. Pat. Nos.

7,066,730; 4,238,640; 3,971,416; and 3,814,574. Other exemplary heating devices that can be included within the heating channel include Positive Thermal Coefficient ceramic heaters, thick film ceramic heaters, resistance wire or resistance ribbon heating devices, such as those containing nickel alloys, such as Nichrome 80/20 or Cupronickel (CuNi) or FeCrAl alloys, such as Kanthal. The resistance wire or resistance ribbon heating devices can be enclosed in a ceramic insulating binder (such as $TiO_2$, MgO, diatomaceous earth or alumina powder or combinations thereof). Commercial embodiments of such heating devices are available (Calrod™ heaters), which could be configured to conform to the size and shape of the heating channel.

The heating channel can be configured so that it is in thermal communication with the conduit but thermally isolated from the heat exchange unit. For example, the portion of the heating channel directed toward the heat exchange unit can be separated therefrom by using a thermally non-conducting material. Any thermally non-conducting material known to those of skill in the art can be used. Example of materials that are non-thermally conducting include acrylic glass, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester and combinations thereof and solid thermal insulators, such as silicon nitride ($Si_3N_4$), calcium silicate, low-density, high-purity silica ceramic, porous alumina, borosilicate glass, silica aerogel (foamed glass), ceramic/glass composites, fibrous refractory composite insulation, polyurea based aerogel, graphite, mullite, glass-filled silicone polymers or combinations thereof.

In some embodiments, the CryoPlug cryo-thermodynamic valve system can include a heat exchange unit and a cryogen injector module that are fully integrated and connected to a portion of conduit configured to be joinable to a conduit of the well line, such as the well casing or production tubular. In some embodiments, the conduit of the cryo-thermodynamic valve system includes an external thread at one end of the conduit and an internal thread at the other end of the conduit, where the threads match and mate to the threads of the conduit of the well line. In some embodiments, the cryo-thermodynamic valve system includes flanges that can be used to connect the cryo-thermodynamic valve system to the conduit of the well line. Any connecting means known in the art can be used to integrate the cryo-thermodynamic valve system into the well line. In some embodiments, the cryo-thermodynamic valve system can be configured to be attached to the well head. In some embodiments, the cryo-thermodynamic valve system can be attached to the well casing or a producing tubular.

In embodiments in which the cryo-thermodynamic valve system includes and is integrated onto a conduit, the conduit can include a cladding on the outside to facilitate thermal transfer in the area of application of the heat transfer unit. Any thermally conductive material known to those skilled in the art can be used as the cladding. Examples of such materials include copper, brass, beryllium, cadmium, cobalt, chrome nickel steel, gold, silver, iridium, iron, lead, magnesium, molybdenum, nickel, platinum, tin, zinc, stainless steel and any combination or alloy thereof. In some embodiments, the cladding can be copper or a copper alloy or aluminum or an aluminum alloy. In some embodiments, the cladding comprises substantially pure copper, a copper alloy, substantially pure aluminum, an aluminum alloy, substantially pure silver, a silver alloy, substantially pure gold, and a gold alloy and mixtures or combinations thereof.

Figure 10:
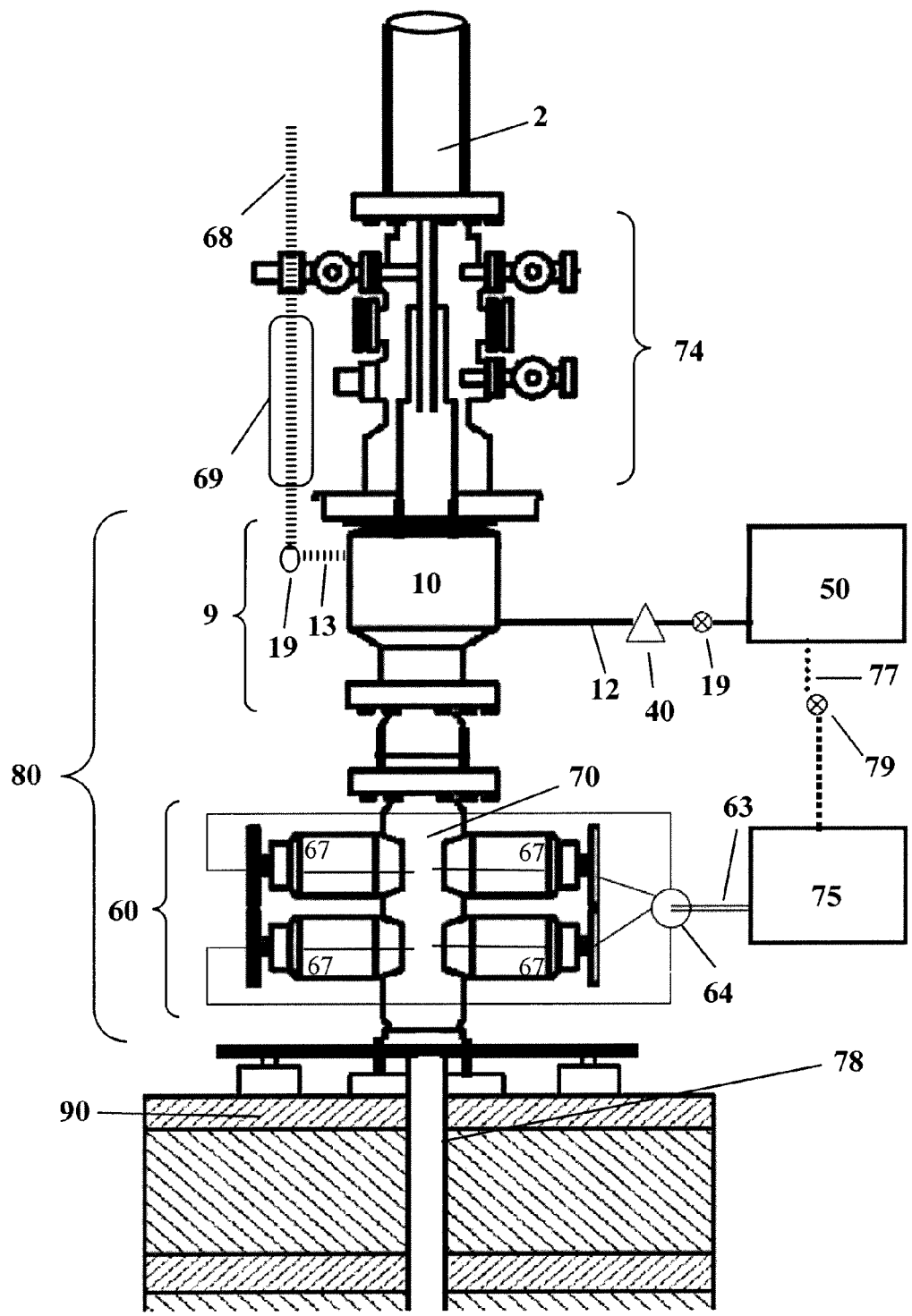
FIG. 10 is a side view of an example of a vertical embodiment of a well site with a prophylactic cryo-thermodynamic valve system that vents refrigerant to the environment.

FIG. 10 is a side view of an example embodiment of the cryo-thermodynamic valve reversible plugging system. A well site is shown. The cryo-thermodynamic valve system 80 includes a thermal transfer device 9 with a heat exchange unit 10 in close proximity and connected to an injector unit 60. The cryo-thermodynamic valve system 80 can be attached to a well casing 78. In some embodiments, the cryo-thermodynamic valve system 80 can be attached to a well head 74.

The cryogen injector module 60 is as described above, and can include injector devices 67 that eject liquid cryogen into fluid 70 within conduit 2. The injector module 60 is in fluid communication with cryogen supply module 75 via input port 63, which can be attached to modulating valve 72. The liquid cryogen is provided by the cryogen supply module 75, is warmed by contact with fluid 70, resulting in cryogen gas production, and the warmed cryogen and gas are carried away from the module with the flowing fluid 70 and the removal of thermal energy from the flowing fluid resulting in formation of a frozen plug of fluid. Once a frozen plug of fluid forms, flow of cryogen from the cryogen supply module 75 is stopped, such as by terminating the supply of cryogen to the cryogen supply module 75 or by adjusting modulating valve 72.

The thermal transfer device 9 can include a heat exchange unit 10 that can be a fluid-containing heat exchange unit (liquid, gas or compressed gas), a thermoelectric module or Peltier device or a magnetic thermal transfer device. In FIG. 10, the heat exchange unit 10 is shown as a fluid-containing heat exchange unit. The heat exchange unit 10 is in fluid communication with refrigerant supply module 50, connected through input port 12 to a pump module 40 and a control valve 19. Refrigerant for use in heat exchange units are known in the art. The refrigerant can include any fluid that can transfer thermal energy under the conditions of use. Exemplary fluid refrigerants can contain liquid carbon dioxide, liquid ammonia, liquefied chlorofluorohydrocarbons, liquefied gases such as liquid nitrogen, liquid oxygen, liquid neon, liquid argon, liquid nitrous oxide, hydrofluoroethane, pentafluoro-propane, trichloromonofluoromethane, dichlorodifluoromethane, or a mixture thereof.

The refrigerant provided by the refrigerant supply module 50 is warmed by contact with conduit 70. In some embodiments, the warmed refrigerant is vented from the system into the environment. An example of such an embodiment is shown in FIG. 10. As illustrated in FIG. 10, warmed refrigerant can be vented from the unit via output port 13, which is connected to vent tube 68 via a valve 19. The vent tube 68 can include a heating unit 69 to warm the vented material to ambient temperature to minimize or prevent ice formation on or around the vent tube 68.

Figure 11:
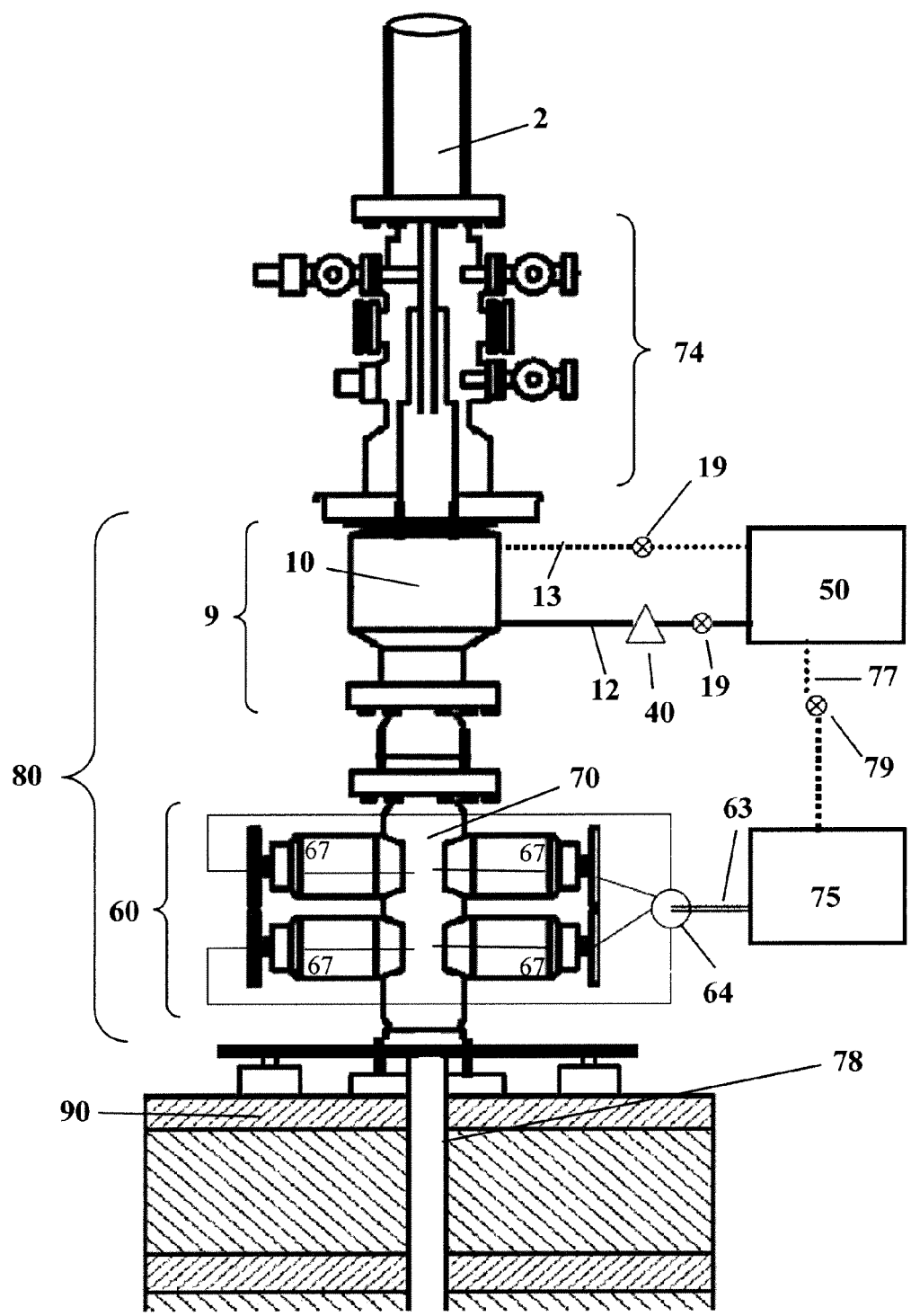
FIG. 11 is a side view of an example of a vertical embodiment of a well site with a prophylactic cryo-thermodynamic valve system that recirculates refrigerant.

In some embodiments, the warmed refrigerant can be recirculated to the refrigerant supply module 50. An example of such an embodiment is shown in FIG. 11. As illustrated in FIG. 11, warmed refrigerant in heat exchange unit 10 is vented from the unit via output port 13, which is connected to a return line to the refrigerant supply module 50. The return line can include valves 19 to modulate the flow of warmed refrigerant to the refrigerant supply module 50. In such a configuration, any closed loop refrigeration system known in the art can be used. Examples are described in U.S. Pat. Nos. 6,041,621; 6,105,388; 6,301,923 and 7,111,467. The refrigerant supply module 50 can include a refrigeration system. The refrigeration system can be an ultra-low temperature refrigeration system, the basic operation of which, the removal and relocation of heat, is well known in the art. It can include a compressor, a condenser, a filter drier and/or a refrigeration process, which can include an internal refrigerant flow path from high to low pressure. The compressor can be a gas compressor, preferably one suitable for use with any dry gas with a dew point below −100° C., such as helium or nitrogen or argon. The compressor can be any commercially available compressor, such as a reciprocating compressor, rotary compressor, screw compressor, or scroll compressor or a combination of compressors. The refrigeration process of the refrigeration system can include a series of heat exchangers with a phase separator interposed between them. The refrigeration process can include any refrigeration system or process known in the art, such as a single-refrigerant system, a mixed-refrigerant system, normal refrigeration processes, an individual stage of a cascade refrigeration processes or an auto-refrigerating cascade cycle, or modifications of any of these. For example, the system can be an auto-refrigerating cascade process, a single-phase separator system, a system as described in any of U.S. Pat. Nos. 3,768,273; 3,872,682; 4,535,597; 4,597,267; 4,951,474; 5,099,650; 6,722,145; 6,843,065; 7,111,467; 7,234,310 or variations on these processes, or any very low-temperature refrigeration process with zero, one, or more than one stages of phase separation. A reference for low-temperature and very low-temperature refrigeration can be found in Chapter 39 of the 1998 Handbook produced by the American Society of Heating, Refrigerating and Air-Conditioning Engineers (ASHRAE). In addition to the number of phase separators used, the number of heat exchangers and the number of internal throttle devices used can be increased or decreased in various arrangements as appropriate for the specific application.

In some embodiments, the conduit within the heat exchange unit 10 can be fitted with one or more thermally conducting fins (fins 26 in FIG. 13). The thermal conducting fins 26 can be positioned at any location near to or in thermal contact with the conduit 2 to increase the heat conducting area of the thermal exchange unit, thereby allowing the thermal energy of the conduit and its contents to more rapidly transfer to the refrigerant. In some embodiments, the thermal conducting fins 26 are in thermal communication with the conduit 2 and facilitate energy transfer from conduit 2 to the refrigerant within the heat exchange unit 10.

FIGS. 10 and 11 illustrate an example in which the heat exchange unit 10 can be fixedly connected to the well head 74 by threading a fixing nut on a bolt through a flange of the heat exchange unit 10 and the well head 74. The figures also show an example in which the heat exchange unit 10 can be fixedly connected to the cryogen injector unit 60 by threading a fixing nut on a bolt through a flange of the heat exchange unit 10 and the cryogen injector unit 60. Other configurations are contemplated.

In embodiments where conduits are to be retrofit, the system can be attached to the existing conduit by any means known in the art. For example, the system can be fabricated so that it is provided as two or more interlocking pieces that can be positioned and fastened in place on existing conduit. The pieces can be fastened using any mechanism known in the art, such as by welding, bolts, screws, seals, epoxy or any combination thereof. In above-ground conduits and subterranean or undersea conduits, the cryo-thermodynamic valve system can be manufactured to fit existing conduit. In some embodiments, excavation of an area around existing conduit may be necessary to accommodate the cryo-thermodynamic valve system.

The CryoPlug cryo-thermodynamic valve system 80 can include a shell 81 that encompasses the components attached to or in communication with the conduit. The shell 81 can be composed of any material that is relatively unaffected by cold temperatures and expected pressures. Exemplary materials that adequately withstand the expected temperatures and pressures of cryogenic liquids and/or deep sea well applications include, but are not limited to, steel, fiberglass, graphite, plastics, carbon fibers and combinations thereof. For example, steel alloys, particularly steel containing Cr, Ni or Si, can exhibit a high ductile fracture mode and a low brittle fracture mode. Alloys having a ductile fracture mode higher than steel and a brittle fracture mode lower than steel are known in the art. Exemplary alloys include those described in U.S. Pat. Nos. 5,352,304; 6,183,573; 6,212,891; 7,235,212; 7,648,597 and 7,727,463. Carbon fiber/binder wrapped containers using binders such as, but not limited to, epoxies such as polyacrylonitrile (PAN), resins such as polyesters and combinations thereof also can be used. Carbon fibers that are both strong and lightweight, as compared to steel, include, but are not limited to graphite, carbon composites, codified solid fibers, laminated carbon fibers, PAN-based carbon fibers, pitch-based carbon fibers and combinations thereof. In some embodiments, the shell of the cryo-thermodynamic valve system 80 can include an external coating containing carbon fibers. The coating can be configured so that the carbon fibers align diagonally about the integument of the module. Any carbon fiber can be used, such as, e.g., graphite, carbon composites, codified solid fibers, laminated carbon fibers, PAN-based carbon fibers, pitch-based carbon fibers, and combinations thereof. The shell of the cryo-thermodynamic valve system 80 can include a pressure relief valve for safety.

The shell 81 can include means for thermally isolating the cryogen injector unit 60 and the heat exchange unit 10 from the environment outside of shell 81. For example, the thermal isolation means can be a layer or coating of a thermally insulating material that is in contact with the shell on one or both sides of the shell. The thermal isolation means can include any thermally non-conductive material or a material having low thermal conductivity, or can include a casing that contains a thermally non-conductive material or a material having low thermal conductivity. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2-trichloro-trifluoroethane, 1,2-dichloro-tetrafluoroethane, tetrafluoroethane, argon, carbon dioxide, diethyl ether, isobutane, pentane, perfluoro-cyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

In some embodiments, the shell can form an airtight seal. In some of such embodiments, the air in the compartment within the shell can be replaced with a gas with lower thermal conductivity than air. Generally, dense gases, such as xenon and dichlorodifluoromethane, have low thermal conductivity. Gases that have a lower thermal conductivity than air include butane, krypton, trichloromethane, xenon, 1,1,2-trichloro-trifluoroethane, 1,2-dichloro-tetrafluoroethane, tetrafluoroethane, argon, carbon dioxide, diethyl ether, isobutane, pentane, perfluoro-cyclobutane, propane and tetrafluoromethane. In some embodiments, the air can be replaced with a liquid with low thermal conductivity. Examples of liquids having low thermal conductivity are CFC-11, HCFC-141b, methanol, ethanol, glycerol, ether, acetone, ethylene glycol, thermally non-conducting silicone fluid containing glass, such as glass fibers or glass beads, and propylene glycol.

The shell can include thermal monitoring devices for monitoring the thermal gradient along the conduit. The shell also can include heating elements for controlling the thermal gradient induced by the cryo-thermodynamic valve system in the conduit. In some embodiments, the shell can include distal heating elements that can be used to modulate the thermal gradient and/or minimize ice formation at the distal ends of the conduit. The heating elements can be controlled to minimize or eliminate thermally induced stress fractures in the conduit so that the conduit does not fail, such as due to the formation of cracks or breaches in the conduit.

Figure 12A:
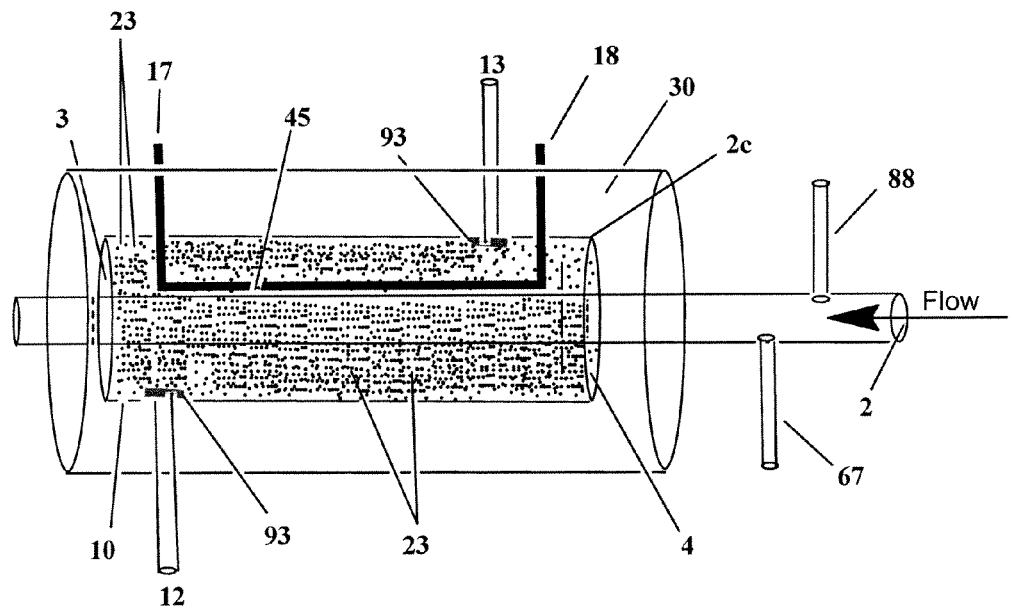
FIGS. 12A through 12F depict exemplary thermodynamic valve configurations.

Exemplary thermodynamic valve configurations are illustrated in FIGS. 12A through 12E. FIG. 12A depicts a heat exchange unit 10, which comprises a conduit 2 and an outer casing 2c. The heat exchange unit is attached a cryogen injector 67 that is configured to inject a cryogen into a fluid flowing in conduit 2. The thermodynamic valve of FIG. 12A depicts an optional auxiliary injector 88. An end plate 3 having an opening through which a portion of conduit 2 can pass is attached at the left of the outer casing 2c and around conduit 2 to seal the left side of the heat exchange unit 10. An end plate 4 having an opening through which a portion of conduit 2 can pass is attached at the right of the outer casing 2c and around conduit 2 to seal the right side of the heat exchange unit 10. The end plates can be attached to the conduit 2 and outer casing 2c by any means known in the art, such as via welding, bolts, screws, seals, epoxy or any combination thereof. With plates 3 and 4 attached, a sealed tube with a cavity between conduit 2 and casing 2c is formed, while allowing conduit 2 to protrude from both ends of the heat exchange unit.

The inner cavity of heat exchange unit 10 between conduit 2 and outer casing 2c is filled with particles, filings, turnings, shavings, threads, pellets or beads of a thermally conductive metal, filling the space between conduit 2 and casing 2c. A screen 93 keeps the particles, filings, turnings, shavings, threads, pellets or beads of a thermally conductive metal within the heat exchange unit 10 and prevents their expulsion by the cryogen when the heat exchange unit 10 is charged. The screens can be made of any material, including aluminum, steel, iron, plastic, reinforced resin, carbon fibers, glass fibers or any combination thereof. The flow of fluid through the device is indicated by the arrow.

Figure 12B:
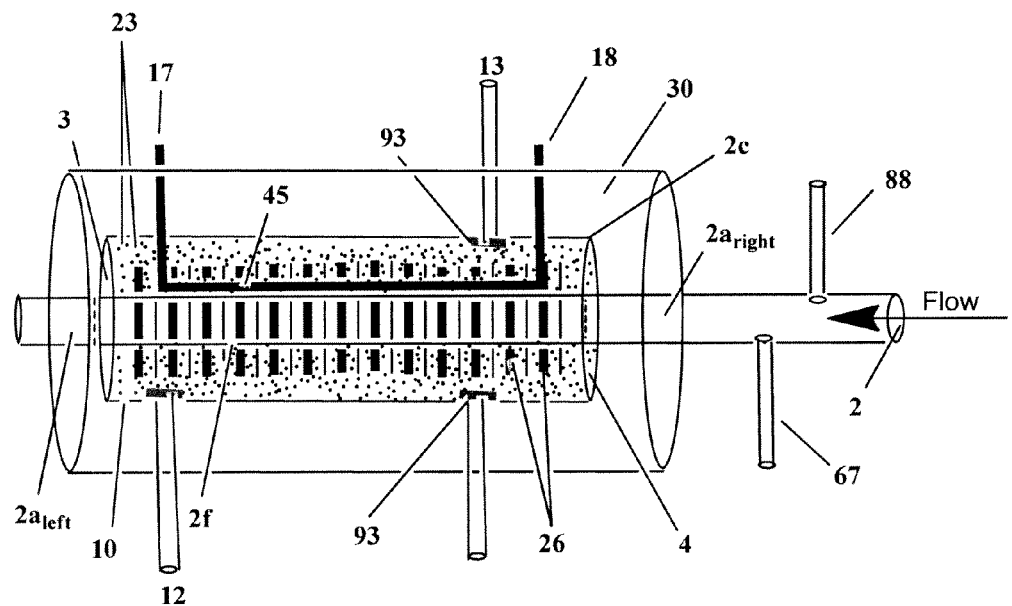
Figure 12C:
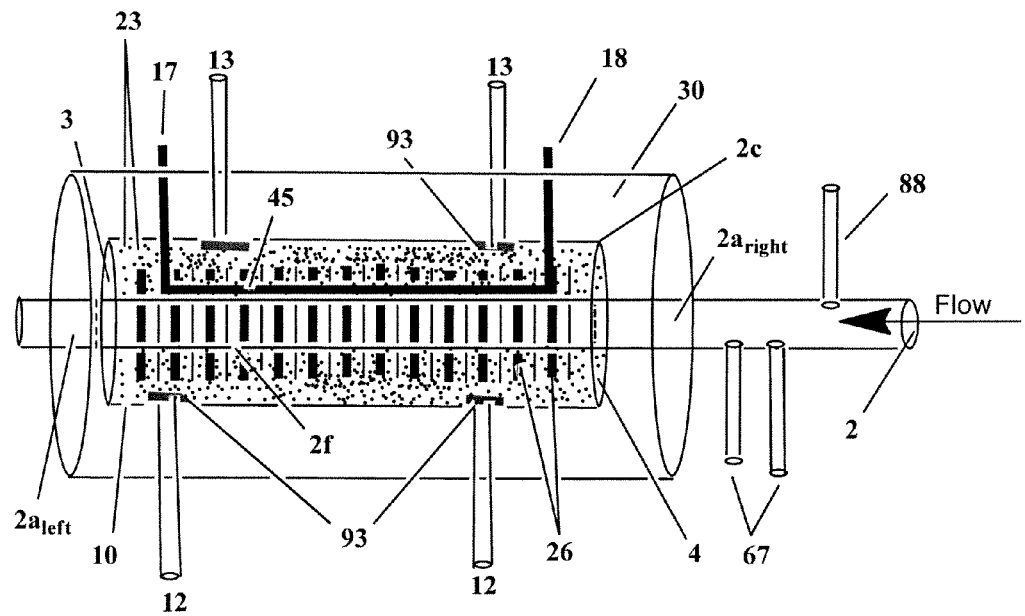
Figure 12D:
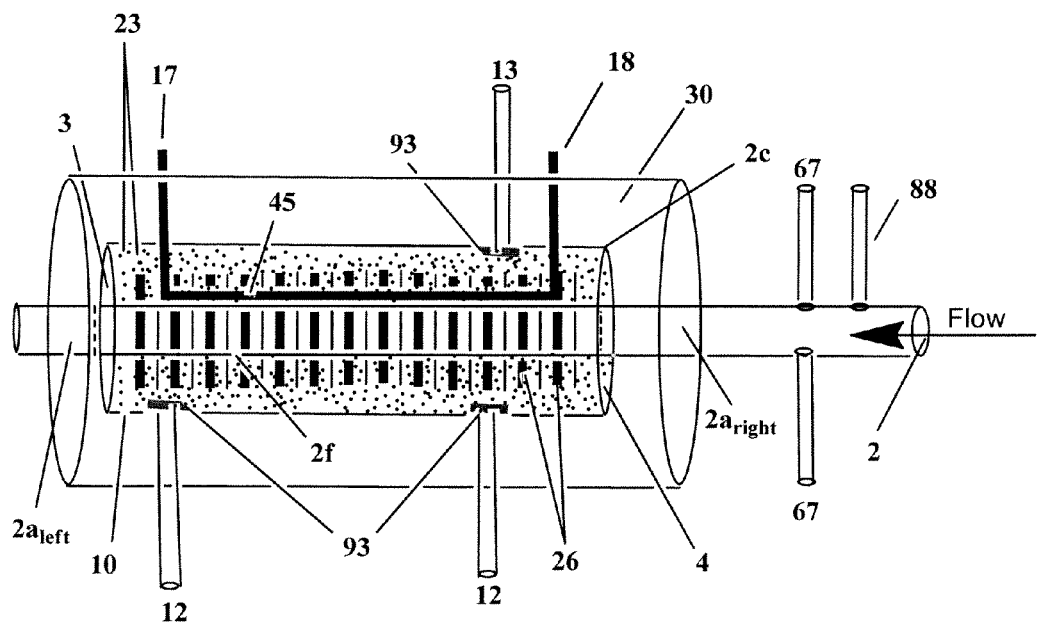

The casing 2c is fitted with plumbing fittings to form an input port 12 into heat exchange unit 10 for delivery of cryogen from the supply units into heat exchange unit 10. FIG. 12A depicts one input port 12, although any number of injector ports can be included. FIGS. 12B through 12D depict embodiments that includes two input ports 12. The casing 2c also was fitted with plumbing fittings to output port 13 out of the heat exchange unit 10 for venting of cryogen from the heat exchange unit 10. The inside openings of the output port 13 within heat exchange unit 10 was fitted with screen 93.

The thermodynamic valve of FIG. 12A also includes a cryogen injector 67. The optional auxiliary injector 88 shown in the Figure can be used to inject a composition, such as a bridging fluid or a surfactant composition, into the fluid within conduit 2. Also shown in FIG. 12A is heating channel 45, which is in thermal communication with conduit 2 within the heat exchange unit 10. Heating channel input 17 and heating channel outlet 18 provides access to heating channel 45. The heat exchange unit 10 as depicted also includes an insulating blanket 30 of a thermally insulating material attached to and/or enveloping the heat exchange unit 10.

FIG. 12B depicts a heat exchange unit 10, which comprises a conduit 2 and an outer casing 2c, similar to the unit depicted in FIG. 12A. As discussed above, the unit depicted in FIG. 12B includes two input ports 12. The thermodynamic valve depicted in FIG. 12B also includes a finned pipe $2f$. In this embodiment, the heat exchange unit 10 includes a conduit 2 which includes a finned pipe $2f$ and a segment $2a_{left}$ of non-finned pipe and a segment $2a_{right}$ of non-finned pipe at the right end of the finned tubing $2f$. The finned pipe $2f$ and a portion of each pipe $2a_{left}$ and $2a_{right}$ are encased in a casing 2c and end plates 3 and 4 are attached as discussed above. End plate 3 includes an opening through which a portion of conduit $2a_{left}$ can pass and end plate 4 has an opening through which a portion of conduit $2a_{right}$ can pass. With plates 3 and 4 in place, a sealed tube with a cavity between conduit 2 and casing 2c is formed, while allowing conduit $2a_{left}$ and $2a_{right}$ to protrude.

The inner cavity of heat exchange unit 10 between conduit 2 and outer casing 2c is filled with thousands of particles, filings, turnings, shavings, threads, pellets or beads of a thermally conductive metal, filling the space between the fins 26 of conduit 2 and between the finned conduit 2 and casing 2c. Screens 93 keeps the particles, filings, turnings, shavings, threads, pellets or beads of a thermally conductive metal within the heat exchange unit 10 and prevents their expulsion by the cryogen when the heat exchange unit 10 is charged.

Figure 12E:
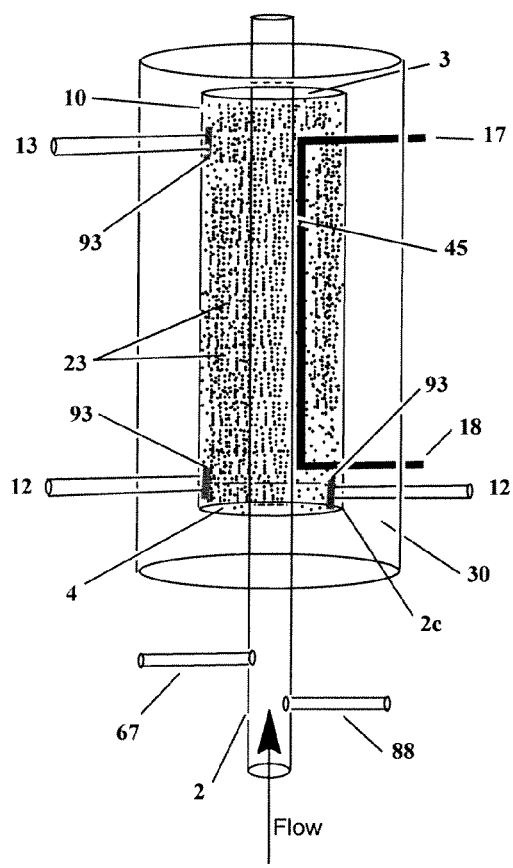
Figure 12F:
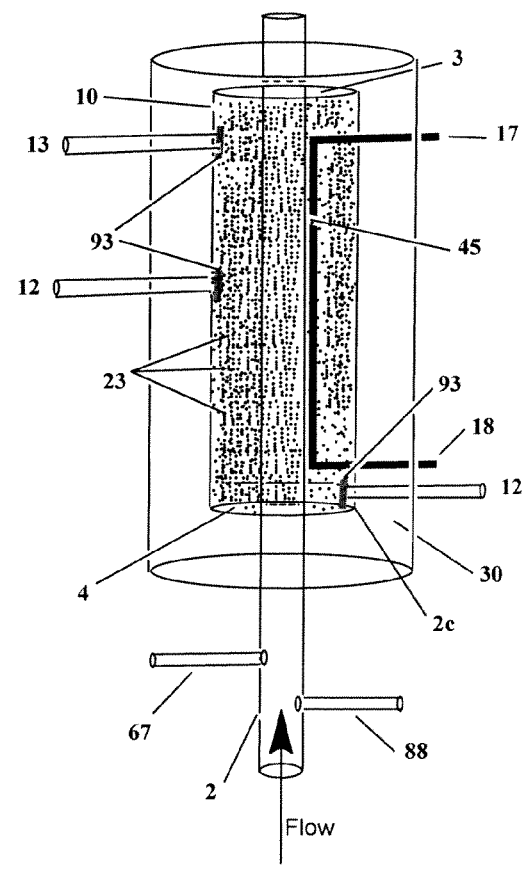

FIG. 12C depicts a heat exchange unit 10, which comprises a conduit 2 and an outer casing 2c, similar to the unit depicted in FIG. 12B. The embodiment depicted in FIG. 12C includes two cryogen injectors 67. In the depicted embodiment, the injectors are on the same side of the casing 2c but are separated by some distance. FIG. 12D depicts a heat exchange unit 10, which comprises a conduit 2 and an outer casing 2c, similar to the unit depicted in FIG. 12C, having two cryogen injectors 67, but in the depicted embodiment the cryogen injectors 67 are on opposite sides of the casing 2c. Although depicted as being opposed to each other, two or more injectors can be positioned radially about casing 2c with any degree of separation between them, such as 10°, 20°, 30°, 40°, 45°, 50°, 60°, 70°, 80° or 90°. Although FIGS. 12A through 12D depict the thermodynamic valve positioned horizontally, the valve can be positioned horizontally, vertically, or at any angle. In embodiments where the thermodynamic valve is to be positioned vertically, such as is depicted in FIGS. 12E and 12F, the valve can include multiple input ports 12 positioned radially about the casing 2c (FIG. 12E) or longitudinally about the casing 2c (FIG. 12F).

D. METHODS

When the devices and systems described herein are deployed, e.g., a thermal transfer device integrated or attached to a fluid-filled conduit and the device activated, the thermal transfer device can extract heat from the conduit, and can do so at a controlled rate so as not to cause thermal stress in the conduit. Over time, as the temperature of the conduit decreases, such as to temperatures between −10° C. to −80° C., the decreased temperature will thicken and solidify the material within the conduit, such as water or oil to form a plug of the conduit. In some embodiments of the methods provided herein, the temperature of the conduit can be decreased to a temperature of between −20° C. to −100° C., or −30° C. to −100° C., or −50° C. to −100° C., or −20° C. to −90° C., −30°

C. to −120° C., or −50° C. to −150° C., or −10° C. to −150° C. In some embodiments of the methods provided herein, the temperature of the conduit can be decreased to a temperature of −20° C. or lower. In some embodiments of the methods provided herein, the temperature of the conduit can be decreased to a temperature of −30° C. or lower. In some embodiments of the methods provided herein, the temperature of the conduit can be decreased to a temperature of −40° C. or lower. In some embodiments of the methods provided herein, the temperature of the conduit can be decreased to a temperature of −50° C. or lower. In some embodiments of the methods provided herein, the temperature of the conduit can be decreased to a temperature of −80° C. or lower. In some embodiments of the methods provided herein, the temperature of the conduit can be decreased to a temperature of −100° C. or lower. In some embodiments of the methods provided herein, the temperature of the conduit can be decreased to a temperature of −150° C. or lower. In some embodiments of the methods provided herein, the temperature of the conduit can be decreased to a temperature of −200° C. or lower.

The heat extraction by the thermal transfer device will slowly freeze layer upon layer of fluid, such as water or oil, within the frozen conduit, reducing the inside diameter of the conduit and ultimately forming a plug that seals the conduit with the frozen plug. The plug could be maintained until the conduit is repaired. It will take time for the thermal transfer device to freeze the conduit and for the frozen fluid within the conduit, such as water or oil, to accumulate and form a plug to prevent flow of the liquid trough the conduit. In some applications, such as in arctic locations or in deep sea drilling application, the ambient conditions can be very cold. In such applications, one would not need to chill the pipe and fluid therein a great deal in order to accumulate laminar frozen (crystallized) fluid oil or water deposits on the interior of the conduit.

In some embodiments, thermal transfer unit of the method is a thermoelectric module. In some embodiments, the thermal transfer unit of the method is a Peltier device. In some embodiments, the thermal transfer unit of the method is a liquid-containing heat exchange unit as described herein. In some methods, thermal transfer device attached to the conduit reduces the temperature of the conduit and the fluid therein to a temperature of at least −20° C. In some methods, thermal transfer device attached to the conduit reduces the temperature of the conduit and the fluid therein to a temperature of at least −25° C. or to a temperature of at least −30° C. or to a temperature of at least −35° C. or to a temperature of at least −40° C. or to a temperature of at least −45° C. or to a temperature of at least −50° C. or to a temperature of at least −55° C. or to a temperature of at least −60° C. to a temperature of at least −65° C. or to a temperature of at least −70° C. to a temperature of at least −75° C. In some methods, the thermal transfer device attached to the conduit reduces the temperature of the conduit and the fluid therein to a temperature between −40° C. and −60° C. or to a temperature between −20° C. and −250° C. In some methods, the thermal transfer device attached to the conduit reduces the temperature of the conduit and/or the fluid therein to a temperature between −30° C. and −240° C. or to a temperature between −40° C. and −220° C. or to a temperature between −50° C. and −200° C.

In some embodiments, the method includes attaching a thermal transfer device to a fluid-containing conduit; thermally isolating the thermal transfer device and at least a portion of the conduit from the environment; and activating the thermal transfer device for a sufficient time to form a frozen plug of fluid that prevents flow of the fluid through the conduit. In some embodiments, the thermal transfer device is attached to an intact conduit and is activated as an emergency shut off mechanism of the conduit in case of failure or breach of the conduit above the point of attachment of the thermal transfer device. In such embodiments, the system provided herein in prophylactic. In some embodiments, the system described herein can be used to provide a means of preventing fluid flow through a breached or broken conduit. In such embodiments, the method includes identifying a breach site in a conduit; deploying a thermal transfer device, such as described herein, to a point below the fracture, breach or break in an intact area of the conduit; and activating the thermal transfer device for a sufficient time to form a frozen plug of fluid that prevents flow of the fluid through the conduit. In some embodiments of the method, the thermal transfer device is maintained in active thermal exchange until repairs can be made to the conduit. In some embodiments, the method includes as a step increasing the temperature of the thermal transfer device so that it donates thermal energy to the conduit, thereby melting the frozen plug and restoring flow of the fluid through the pipe.

In some embodiments of the methods provided herein, the thermal transfer device is a refrigerant liquid-containing heat exchange unit, and the rate of thermal exchange between the heat exchange unit is modulated by controlling the flow of the refrigerant liquid through the system. In some embodiments of the methods, the warmed refrigerant liquid from the thermal transfer device is regenerated and re-used through the system, forming a closed loop system. In some embodiments of the methods, the warmed refrigerant liquid from the thermal transfer device is vented to the environment, forming on open loop system.

In some embodiments of the cooling phase of the methods provided herein, thermally conductive liquid refrigerant is circulated through the system, such as by one or more pumps or by a positive pressure on the refrigerant supply side of the system. As the liquid refrigerant passes through the conductive surface of the heat exchange unit in thermal contact with the conduit, heat is transferred from the relatively warm conduit and its contents to the cooler liquid refrigerant. The conductive surface of the heat exchange unit in thermal contact with the conduit can be designed to maximize this heat transfer by maximizing the surface area in contact the refrigerant fluid flowing therethrough. The refrigerant carrying the thermal energy absorbed from the conduit and its contents moves through a discharge tube or vent and its temperature can be raised to at least ambient temperature before the refrigerant is vented to the environment. The constant flow of fresh refrigerant through the heat exchange unit ensures that thermal energy of the conduit and its contents can be constantly transferred to the refrigerant liquid, cooling the conduit and its contents until at least a portion of the fluid contents of the conduit freezes and forms a plug.

In some embodiments of the warming phase of the methods provided herein, e.g., after repairs have been completed and it is desirous to remove the frozen plug and restore flow of fluid through the conduit, the temperature of the refrigerant liquid is slowly raised. The temperature of the refrigerant can be raised at a rate that does not subject the conduit to thermal stress and does not impact tensile or burst strength of the conduit. As the temperature of the refrigerant fluid increases, the temperature of the wall of the conduit increases. At a certain temperature, the frozen plug will begin to melt and detach from the inside surface of the conduit. Once the plug becomes detached from the inside surface of the conduit, fluid pressures within the conduit will dislodge the frozen plug, restoring flow of the fluid through the conduit.

In some embodiments of the warming phase of the methods provided herein, e.g., after repairs have been completed and it is desirous to remove the frozen plug and restore flow of fluid through the conduit, heaters within the heat transfer device are asymmetrically activated, providing thermal energy to only one side of the conduit. The temperature of the heaters can be raised at a rate that does not subject the conduit to thermal stress and does not impact tensile or burst strength of the conduit. As the temperature of the conduit on one side of the frozen plug increases, the temperature of the wall of the conduit at the point of thermal energy application increases. At a certain temperature, the frozen plug will begin to melt at the point of thermal energy application and detach from the inside surface of the conduit at the point of thermal energy application. Once the plug becomes detached from the inside surface of the conduit at the point of thermal energy application, fluid will begin to flow through the gap between the conduit and the frozen plug still attached to the opposite side of the conduit. This results in an increasing flow of fluid past the plug until the plug melts or becomes completely detached. Once the plug is melted or becomes completely detached from the conduit, flow of the fluid through the conduit is restored.

During start-up operations in deep sea drilling applications, in which the conduit is surrounded by water, it is necessary to prevent ice formation in or along the distal end of the conduit while the conduit is cooled to form a plug by freezing the oil within the conduit. This can be accomplished by including heating elements at the distal ends of the conduit to keep the localized temperature above freezing. Similarly, heating elements can be included along the vent or discharge tube to increase the temperature of the refrigerant to at least ambient prior to discharging the refrigerant liquid so as to minimize or eliminate ice formation at the discharge site.

Also provided are a method and system for controlled rate freezing of a fluid filled thermally conducting metal conduit. The presently disclosed system and method provide the ability to rapidly cool the conduit and the fluid contained therein via refrigerant liquid using a laminar flow of liquid refrigerant. The rapid cooling of the conduit can be achieved by precisely controlling and modulating the temperature of the refrigerant being introduced to the system as a function of time. In some embodiments, the method of controlled rate freezing of a conduit includes the steps of: (i) placing a thermal exchange unit in thermal contact with a conduit containing a fluid therein; (ii) activating the thermal exchange unit so that thermal energy is withdrawn from the conduit and the fluid therein and transferred to the thermal exchange unit; and (iii) promptly dissipating the heat absorbed by the thermal exchange unit so as to prevent recirculation of the heat from the thermal exchange unit back to the conduit.

In some embodiments, the methods use a liquid-filled heat exchange unit as the thermal exchange unit. In such embodiments, the method includes (i) placing a liquid refrigerant heat exchange unit in thermal contact with a conduit containing a fluid therein; (ii) preparing a liquid refrigerant by mixing a liquid cryogen with a solvent to produce a cold liquid refrigerant at a selected temperature profile, the temperature profile corresponding to a desired cooling rate of the conduit and the fluid within the conduit; (iii) delivering a uni-directional, laminar flow of the temperature adjusted liquid refrigerant through the heat exchange unit to uniformly cool the conduit and its contents; and (iv) promptly exhausting the liquid refrigerant from the heat exchanger so as to prevent recirculation of the liquid refrigerant within the heat exchange unit.

The presently disclosed systems and methods provide the ability to rapidly cool a thermally conductive conduit and a fluid contained in the conduit with a thermal exchange unit primarily via forced convective cooling using a laminar flow of liquid refrigerant in thermal communication with the thermally conductive conduit. In addition, the present system and method are capable of providing the rapid cooling of the conduit over a wide range of cooling rates and also hold the temperature of the conduit at any prescribed temperature where specified so as to create and maintain a frozen plug of the fluid within the conduit without inducing thermal stress in the conduit.

More specifically, the rapid cooling of the conduit is achieved by precisely controlling and adjusting the temperature of the liquid refrigerant being introduced to the system as a function of time. In one embodiment, the system can be adapted to provide a stepwise or quick drop in temperature to generate a higher degree of sub-cooling within the conduit thereby minimizing the exothermic effects of any phase transition (e.g., water-to-ice transformation) in the fluid in the conduit. In some embodiments, the controlled rate freezing or cryogenic chilling system and methods provided herein are adapted to provide a flow of liquid refrigerant to effect a ramp down of temperature of about $-5°$ C. per minute or of about $-10°$ C. per minute to provide rapid cooling of the conduit yet minimize any thermally induced stress in the conduit. In some embodiments, the flow of liquid refrigerant or cryogen can be increased to effect a ramp down of temperature of about $-15°$ C. per minute. In some embodiments, the flow of liquid refrigerant or cryogen can be increased to effect a ramp down of temperature of about $-20°$ C. per minute. In some embodiments, the flow of liquid refrigerant or cryogen can be increased to effect a ramp down of temperature of about $-25°$ C. per minute. In some embodiments, the flow of liquid refrigerant or cryogen can be increased to effect a ramp down of temperature of about $-30°$ C. per minute. In some embodiments, the flow of liquid refrigerant or cryogen can be increased to effect a ramp down of temperature of about $-40°$ C. per minute. In some embodiments, the flow of liquid refrigerant or cryogen can be increased to effect a ramp down of temperature of about $-50°$ C. per minute.

Temperatures of the liquid refrigerant introduced to the heat exchange unit can be adjusted or modulated by mixing or adding different solvents to a liquid cryogen, such as liquid nitrogen or liquid or solid carbon dioxide. In some embodiments, a refrigerant supply module can include two or more liquid refrigerants that contain different solvents mixed with a cryogen, and the temperature of the liquid refrigerant can be modulated by modulating the ratio of one liquid refrigerant to another liquid refrigerant. The mixed refrigerant liquid then is introduced and flowed throughout the heat exchange unit. Through the appropriate mixing of liquid refrigerants that have different temperatures, the present system can create a laminar flow of the liquid refrigerant across the entire cooling area targeted by the heat exchange unit. Because of the uniform flow of the liquid refrigerant flow, it has been found that precise control of the liquid refrigerant temperature and temperature gradient across the conduit has a direct correlation to the observed cooling rates of the conduit within the heat exchange unit.

At the freezing point of the solutions, the heat of crystallization keeps the solution temperature from dropping, and sometimes the temperature within the conduit also can rise. Using one or more thermal or temperature sensors 15 in or on the conduit, the temperature or flow rate of liquid refrigerant can be adjusted to minimize temperature deviation, as necessary. In other words, control of the system can be either pre-programmed or can be a real-time feedback based operation.

The ability to precisely control the cooling rate of the conduit can provide many benefits. For example, the conduit may experience various stresses during the freezing and subsequent thawing process that may impair the function or integrity of the conduit. Proper design of the freezing process can mitigate such stresses and the present systems and methods allow for the precise control of the freezing process to achieve uniformity in the freezing process while minimizing thermally induced stress in the conduit.

The temperature of the liquid refrigerant can be measured with a thermal monitoring device 15 or other temperature sensor such as a thermocouple disposed downstream of the refrigerant supply module. By precisely adjusting the flow of the refrigerant from the refrigerant supply module 50 to the heat exchange unit 10 it is possible to rapidly shift the temperature of the heat exchange unit 10, which allows cooling of the conduit 2 with a wide range of cooling profiles to optimize operating conditions and maximize freezing rate while minimizing thermally induced stresses in the conduit. In addition, by modulating the temperature of the refrigerant liquid, such as by blending two refrigerant liquids having initially different temperatures, providing a temperature modified refrigerant from the refrigerant supply module 50 to the heat exchange unit 10 makes it possible to rapidly shift the temperature of the heat exchange unit 10, which allows cooling of the conduit 2 with a wide range of cooling profiles to optimize operating conditions and maximize freezing rate while minimizing thermally induced stresses in the conduit.

Also provided are methods to form a temporarily frozen plug of fluid, such as oil or gas, in a conduit, such as a well, in order to stop the flow of fluid through the conduit. In some methods, the plug serves to temporarily halt production in an oil well. In some embodiments, the oil well can be an aboveground pipeline. In some embodiments, the oil well can be off-shore, and can be a deep sea oil well. There are many times when the flow of a fluid through a conduit, such as oil through a well, needs to be stopped. For example, the flow of oil in offshore oil well during storm conditions, or while performing maintenance on wellheads, or as an emergency shut off in case of a catastrophic event in which the conduit is damaged or ruptured, requires the use of a plug of some sort to stop the flow. In some instances, valves can be incorporated into the producing tubular or well casing that can be shut off to stop the flow. In other instances, a storm plug assembly containing a retrievable service packer and a hurricane valve can be used. Such storm plugs generally are placed in the cased hole at a location that can be about 200 feet below the mud line (i.e., 200 feet below the ocean floor). In traditional "shelf" applications, since jack-up rigs operate at maximum depths of around 200 to 300 feet, storm plugs can be set at depths of up to about 500 feet. In deep water applications, in which floating drill ships or semi-submersible rigs can operate in water depths of 6,000 feet or more, the setting depth for the storm plug can be perhaps 6,500 feet or more. Placement of the storm plug often can result in damage of valves or even conduit of the well due to hole deviation.

Therefore it would be beneficial to provide a system as provided herein that can produce a frozen plug that can be used to temporarily isolate a well, including wells in deep water, that do not require the mechanical placement of a plug into a pipeline. In the systems and methods provided herein, the plug can be formed in situ and can be easily removed by allowing the plug to melt, passively or by controlled modulation of the temperature of the heat exchange unit.

One embodiment is a method for temporarily preventing the flow of oil in a pipeline, including an offshore well, that includes attaching a thermal transfer device to the pipeline so that it is in thermal contact with at least one portion of the pipeline, and installing a cryogen injector module that when activated injects cryogen into the fluid in the pipeline, such as directly injecting cryogen into oil in a well. The cryogen injector device injects cryogen into the fluid to cool the fluid. In some embodiments, the cryogen is liquid nitrogen, liquid oxygen, liquid helium, liquid neon, liquid methane, liquid natural gas, liquid argon, liquid nitrous oxide, liquid carbon dioxide or solid carbon dioxide or combinations thereof. In some embodiments, the cryogen injector device is located closest to the source of fluid flowing through the pipeline so that the injection of cryogen into the fluid cools the fluid before it reaches the area of the pipeline to which the thermal transfer device is attached. In the methods, the thermal transfer device can be activated for a sufficient time to form a frozen plug of fluid that prevents flow of the fluid through the conduit and to maintain the frozen plug securely attached to the inner wall of the pipeline, thereby preventing flow of fluid past the plug in the pipeline. In some embodiments, the thermal transfer device can be attached to an intact conduit and can be activated as an emergency shut off mechanism of the conduit in case of failure or breach of the conduit above the point of attachment of the thermal transfer device. In such embodiments, the method serves as a prophylactic treatment for the prevention or minimization of oil spilled into the environment. In some embodiments, the method prevents fluid flow through a breached or broken conduit. In such embodiments, the method includes identifying a breach site in a conduit; attaching a thermal transfer device, such as described herein, to a point below the fracture, breach or break in an intact area of the conduit; attaching below the thermal transfer device a cryogen injector device to a point below the fracture, breach or break in an intact area of the conduit; and activating the thermal transfer device for a sufficient time to form a frozen plug of fluid that prevents flow of the fluid through the conduit. In some embodiments of the method, the thermal transfer device can be maintained in active thermal exchange until repairs can be made to the conduit. In some embodiments, the method includes as a step increasing the temperature of the thermal transfer device so that it donates thermal energy to the conduit, thereby melting the frozen plug and restoring flow of the fluid through the pipe.

Also provided are methods for temporarily isolating an oil well, the methods including the steps of attaching a thermal transfer device to a portion of a producing tubular in the oil well so that it is in thermal contact with at least one portion of the producing tubular, and installing a cryogen injector module that when activated injects cryogen into the fluid such as oil in the producing tubular, where the injection of cryogen into the oil reduces the temperature of the oil before it comes into contact with the area of the producing tubular to which the thermal transfer device can be attached, and the thermal transfer device extracts sufficient thermal energy from the oil that it freezes and forms a plug of frozen oil that reversibly attaches to the side walls of the producing tubular. In some embodiments, the cryogen can be liquid nitrogen, liquid oxygen, liquid helium, liquid neon, liquid methane, liquid natural gas, liquid argon, liquid nitrous oxide, liquid carbon dioxide or solid carbon dioxide or combinations thereof. In some embodiments, the thermal transfer device can be a liquid heat exchange unit that contains a refrigerant. In some embodiments, the refrigerant includes a cryogen and a solvent. In some embodiments, the refrigerant includes (a) liquid nitrogen, liquid oxygen, liquid helium, liquid neon, liquid methane, liquid natural gas, liquid argon, liquid nitrous oxide, liquid carbon dioxide or solid carbon dioxide or combinations thereof and (b) a solvent selected from among carbon tetrachloride, m-dichlorobenzene, nitromethane, bromobenzene, acetonitrile, chlorobenzene, m-xylene, n-butyl amine, n-octane, chloroform, t-butyl amine, trichloroethylene, butyl acetate, ethyl acetate, heptane, cyclopentane, hexane, methanol, cyclohexane, isooctane, acetaldehyde, methyl cyclohexane, m-pentane, 1,5-hexadiene, isopentane, 3-heptanone, cyclohexanone, diethyl carbitol, carbitol acetate, ethanol, acetone, isopropanol, ethyl methyl ketone, diethyl ether and combinations thereof.

In some embodiments, the method includes providing a refrigerant to the heat exchange unit and venting the spent refrigerant (after it has been warmed due to contact with the producing tubular) into the environment. In some embodiments, the method includes providing a refrigerant to the heat exchange unit and recirculating the spent refrigerant by passing it through a closed loop refrigeration system. In some embodiments, the method includes passing the spent refrigerant through an ultra-low temperature refrigeration system. In some methods, the method includes regenerating the spent refrigerant by passing it through a refrigeration system that includes a compressor, a condenser, a filter drier and/or a heat exchange unit. In some embodiments of the method, the spent refrigerant can be passed through a reciprocating compressor, a rotary compressor, a screw compressor, a scroll compressor or a combination of any one of these compressors. In some embodiments, the method includes passing the spent refrigerant through one or a series of heat exchangers.

In some embodiments, the cryogen injector unit can include a drill fitted with a hollow drill bit and activation of the cryogen injector unit includes powering of the drill so that it bores through the conduit so that the end of the hollow drill bit comes into fluid communication with the oil in the well casing. In some embodiments of the methods, once the hollow drill bit is in fluid communication with the oil in the producing tubular, a cryogen supply can be attached directly or indirectly to the hollow drill bit, so that the hollow drill bit functions as an injector of cryogen into the oil.

Also provided are a methods for producing a controlled rate of freezing of a fluid that is contained in a thermally conducting metal conduit. In some embodiments, the method includes the steps of: (a) installing a cryogen injector unit as described herein so that when activated the unit injects cryogen into the fluid; (b) installing a thermal exchange unit in thermal contact with a conduit containing a fluid therein at a point downstream from the cryogen injector unit; (c) activating the cryogen injector unit so that it injects cryogen into the fluid and thereby reduces the temperature of the fluid; (d) activating the thermal exchange unit so that thermal energy is absorbed by the refrigerant to form a spent refrigerant thereby withdrawing thermal energy from the conduit and the fluid therein and transferred to the thermal exchange unit; and (e) promptly dissipating the heat absorbed by the thermal exchange unit so as to prevent recirculation of the heat from the thermal exchange unit back to the conduit. In some embodiments, the heat absorbed by thermal exchange unit is dissipated by venting the spent refrigerant into the environment. In some embodiments, the spent refrigerant is regenerated by passing it through a refrigeration system to remove the thermal energy the spent refrigerant absorbed from the heat exchange unit in thermal communication with the conduit.

Also provided are a methods for producing a reversible plug in a flowing fluid that is contained in a thermally conducting metal conduit. In some embodiments, the method includes the steps of: (a) installing one or more heat exchange units in thermal contact with a conduit containing a fluid therein; and (b) activating the thermal exchange unit(s) so that thermal energy is absorbed by a refrigerant or cryogen within the heat exchange unit to form a spent refrigerant or cryogen thereby withdrawing thermal energy from the conduit and the fluid therein; and (c) promptly dissipating the heat absorbed by the thermal exchange unit(s) so as to prevent recirculation of the heat from the thermal exchange unit(s) back to the conduit and the fluid therein. In some embodiments, the heat absorbed by the thermal exchange unit(s) is dissipated by venting the spent refrigerant into the environment. In some embodiments, the spent refrigerant is regenerated by passing it through a refrigeration system to remove the thermal energy the spent refrigerant absorbed from the heat exchange unit(s) in thermal communication with the conduit.

Also provided are a methods for producing a reversible plug in a flowing fluid that is contained in a thermally conducting metal conduit by use of a heat exchange unit and the injection of a cryogen into the fluid. In some embodiments, the method includes the steps of: (a) installing one or more heat exchange units in thermal contact with a conduit containing a fluid therein; (b) installing one or more cryogen injectors so that when activated the one or more injectors can introduce cryogen into the fluid within the conduit; and (c) activating the thermal exchange unit so that thermal energy is absorbed by a refrigerant or cryogen within the heat exchange unit to form a spent refrigerant or cryogen thereby withdrawing thermal energy from the conduit and the fluid therein; (d) activating the one or more cryogen injectors to introduce cryogen into the fluid; and (e) promptly dissipating the heat absorbed by the thermal exchange unit(s) so as to prevent recirculation of the heat from the thermal exchange unit back to the conduit and the fluid therein. In some embodiments, the heat absorbed by the thermal exchange unit can be dissipated by venting the spent refrigerant into the environment. In some embodiments, the spent refrigerant can be regenerated by passing it through a refrigeration system to remove the thermal energy the spent refrigerant absorbed from the heat exchange unit in thermal communication with the conduit. In some embodiments, the cryogen injectors are positioned upstream of the heat exchange unit so that the cryogen-cooled fluid enters and flows through the heat exchange unit. In some embodiments, cryogen injectors can be positioned upstream and downstream of the heat exchange unit to allow for alternate activation if flow direction is modulated. The cryogen can be injected into the fluid until the fluid becomes viscous or until the fluid freezes or resists flow or becomes solid. The refrigerant or cryogen in the heat exchange unit can be maintained in the active state, such that the temperature of the heat exchange units remains lower than the conduit and the fluid therein so that the frozen plug does not melt.

In some embodiments, flow through the conduit is accomplished by activating one or more heating units within a heating channel in the heat exchange unit. The activation of the heating units can provide directed thermal energy to the conduit and the frozen plug therein, thereby allowing formation of a melting zone in the plug and forming a channel through the plug. The refrigerant or cryogen in the heat exchange unit helps to maintain adhesion of the rest of the plug to the conduit, thereby preventing launch of the plug as an "ice bullet" through the conduit. By manipulating the heating units in the heating channel, the method allows formation of a channel through the frozen plug, thereby restoring partial flow of fluid through the conduit and thereby controllably melting the frozen plug while it remains attached to the conduit wall.

In some embodiments, a bypass circuit can be include in the system to eliminate pressure differential in the heat exchange unit before thawing, and thereby minimize or eliminate the possibility of launching the partially frozen plug through the system as an "ice bullet." The bypass circuit would allow for the controlled fluid to pressurize the low pressure side of the conduit prior to thawing, thereby equalizing the pressure in the flow tubular or conduit.

In some embodiments, the plug formed in a hydrocarbon fluid by the extraction of thermal energy from the fluid is amorphous due to the different precipitation/freezing rates of molecules of higher molecular weight compared to lower molecular weight materials. In such embodiments, it has been determined that introduction of a surface active agent into the fluid prior to heat extraction and freezing of the hydrocarbon fluid results in a more homogeneous freeze of the fluid and promotes better adhesion of the frozen plug to the inside surface of the conduit. When a surface active agent was included, no high molecular weight material clumped out of the fluid, and a more homogeneous plug was formed.

Accordingly, also provided are methods of producing a frozen plug in a fluid, where the method includes introduction of a surface active agent into the fluid prior to freezing the fluid. An advantageous way to accomplish such a method is to use a device described herein that includes auxiliary injectors for introducing a surface active agent into a fluid prior to, after, or contemporaneously with the injection of a cryogen into a fluid within a conduit.

In some embodiments, the method includes the steps of: (1) installing a cryo-thermodynamic valve that includes (a) one or more heat exchange units in thermal contact with a conduit containing a fluid therein; (b) one or more cryogen injectors so that when activated the one or more injectors introduce cryogen into the fluid within the conduit; and (c) one or more auxiliary injectors that when activated the one or more auxiliary injectors introduce a surface active agent into the fluid within the conduit; (2) activating the cryo-thermodynamic valve so that: (a) thermal energy is absorbed by a refrigerant or cryogen within the heat exchange unit to form a spent refrigerant or cryogen thereby withdrawing thermal energy from the conduit and the fluid therein; (b) the cryogen injector(s) introduce(s) cryogen into the fluid; and (c) the auxiliary injector(s) introduce(s) surface active agent into the fluid; and (3) allowing sufficient time for the fluid within the conduit to become viscous and/or freeze solid, thereby stopping flow of fluid through the conduit. In the methods provided, the heat absorbed by the thermal exchange unit(s) is promptly dissipated to prevent recirculation of the heat from the thermal exchange unit back to the conduit and the fluid therein. In some embodiments, the heat absorbed by the thermal exchange unit is dissipated by venting the spent refrigerant into the environment. In some embodiments, the spent refrigerant is regenerated by passing it through a refrigeration system to remove the thermal energy the spent refrigerant absorbed from the heat exchange unit in thermal communication with the conduit. In some embodiments, the cryogen injectors are positioned upstream of the heat exchange unit so that the cryogen-cooled fluid flows through the heat exchange unit. In some embodiments, the cryogen injectors are positioned downstream of the heat exchange unit. In some embodiments, cryogen injectors are positioned upstream and downstream of the heat exchange unit. The cryogen can be injected into the fluid until the fluid becomes viscous or until the fluid freezes or resists flow or becomes solid. The refrigerant or cryogen in the heat exchange unit can be maintained in the active state, such that the temperature of the heat exchange units remains lower than the conduit and the fluid therein so that the frozen plug does not melt. In some embodiments, the auxiliary injectors are positioned upstream of the heat exchange unit and the cryogen injector. In some embodiments, the auxiliary injectors are positioned upstream of the heat exchange unit but downstream of the heat exchange unit cryogen injector.

In methods in which auxiliary injectors inject one or more surface active agents into a fluid within the conduit, any surface active agent can be used. For example, the surface active agent can include any anionic, cationic, zwitterionic, non-ionic, or silicone surfactant or combination thereof, including the exemplary surface active agents described herein, and such surface active agent compositions can be introduced into the fluid within the conduit or flow tubular using one or more auxiliary injectors.

In some embodiments, particularly in embodiments where the fluid is a gas, such as natural gas, a bridging fluid can be introduced into the fluid to promote formation of a frozen plug in the fluid.

Accordingly, also provided are methods of producing a frozen plug in a fluid, particularly a gas fluid, but not limited thereto, where the method includes introduction of a bridging fluid into the fluid prior to freezing the fluid. An advantageous way to accomplish such a method is to use a device described herein that includes auxiliary injectors for introducing a bridging fluid into a fluid prior to, after, or contemporaneously with the injection of a cryogen into the fluid within a conduit. In some embodiments, the method includes the steps of: (1) installing a cryo-thermodynamic valve that includes (a) one or more heat exchange units in thermal contact with a conduit containing a fluid therein; (b) one or more cryogen injectors so that when activated the one or more cryogen injectors introduce cryogen into the fluid within the conduit; and (c) one or more auxiliary injectors so that when activated the one or more auxiliary injectors introduce a bridging fluid into the fluid within the conduit; (2) activating the cryo-thermodynamic valve so that: (a) thermal energy is absorbed by a refrigerant or cryogen within the heat exchange unit to form a spent refrigerant or cryogen thereby withdrawing thermal energy from the conduit and the fluid therein; (b) the cryogen injector(s) introduce(s) cryogen into the fluid; and (c) the auxiliary injector(s) introduce(s) bridging fluid into the fluid in the conduit; and (3) allowing sufficient time for the fluid within the conduit to become viscous and/or freeze solid, thereby stopping flow of fluid through the conduit. In the methods provided, the heat absorbed by the thermal exchange unit(s) is promptly dissipated to prevent recirculation of the heat from the thermal exchange unit back to the conduit and the fluid therein. In some embodiments, the heat absorbed by the thermal exchange unit is dissipated by venting the spent refrigerant into the environment. In some embodiments, the spent refrigerant is regenerated by passing it through a refrigeration system to remove the thermal energy the spent refrigerant absorbed from the heat exchange unit in thermal communication with the conduit. In some embodiments, the cryogen injectors are positioned upstream of the heat exchange unit so that the cryogen-cooled fluid flows through the heat exchange unit. In some embodiments, the cryogen injectors are positioned downstream of the heat exchange unit. In some embodiments, cryogen injectors are positioned upstream and downstream of the heat exchange unit. The cryogen can be injected into the fluid until the fluid becomes viscous or until the fluid freezes or resists flow or becomes solid. The refrigerant or cryogen in the heat exchange unit can be maintained in the active state, such that the temperature of the heat exchange units remains lower than the conduit and the fluid therein so that the frozen plug does not melt. In some embodiments, the auxiliary injectors are positioned upstream of the heat exchange unit and the cryogen injector. In some embodiments, the auxiliary injectors are positioned upstream of the heat exchange unit but downstream of the heat exchange unit cryogen injector.

E. EXAMPLES

The following examples are included for illustrative purposes only and are not intended to limit the scope of the embodiments provided herein.

Example 1

Vertical Conduit

A CryoPlug cryo-thermodynamic valve system was fabricated and tested on a vertical conduit. An exemplary embodiment is illustrated schematically in FIG. 13. The vertical conduit configuration of example 1, as described in more detail below, had a flow rate of skim oil through the system of about 550 barrels per day or 10 feet per second (fps).

In this vertical conduit system, the system included a heat exchange unit 10 and a cryogen injector 67. In this Example, the heat exchange unit 10 included a conduit 2 which included 3 feet of carbon steel firmed pipe (carbon steel finned tubing, ⅝ inch fin height, ¼ inch fin spacing) having an inner diameter of ¹³⁄₁₆ inches and a 6 inch segment $1a_{top}$ of non-finned carbon steel tubing at the top end and a 6 inch segment $1a_{bottom}$ of non-finned carbon steel tubing at the bottom end of the finned tubing to yield an overall length of 4 feet of conduit. The conduit 2 and a portion of each pipe $1a_{top}$ and $1a_{bottom}$ were encased in a 3 inch diameter steel pipe 2c as an outer casing, and a ⅛ inch steel plate 4 having an opening through which a portion of conduit $2a_{bottom}$ passed was welded at the bottom of the outer casing 2c and around conduit $2a_{bottom}$ to seal the bottom of the heat exchange unit 10, thereby forming a sealed tube with a cavity between conduit 2 and casing 2c yet allowing conduit $2a_{bottom}$ to protrude. The end plate 4 was fitted with ⅜ inch steel plumbing fittings to form an input port 12 into heat exchange unit 10 for delivery of refrigerant from the supply unit 50 into heat exchange unit 10. The inside opening of input port 12 was fitted with an aluminum screen 93. A 180 liter Dewar of liquid argon (Air Products and Chemicals, Inc., Chicago, Ill., USA) served as the refrigerant supply module 50, providing liquid argon as the refrigerant. The input port 12 was attached via insulated ⅜ inch copper tubing to refrigerant supply unit 50. The flow of liquid argon from the refrigerant supply unit 50 (the Dewar of liquid argon) to the input port 12 of heat exchange unit 10 was regulated using the liquid argon supply valve of the Dewar 50.

The inner cavity of heat exchange unit 10 between conduit 2 and outer casing 2c was filled with thousands of steel pellets (BBs, 0.177 inch diameter), filling the space between the fins of conduit 2 and between the finned conduit 2 and the outermost 3 inch pipe casing 2c. An aluminum screen 8 through which conduit 2 passes was attached to the top of 2c and to the side of conduit 2 using hose clamps to keep the steel pellets within the heat exchange unit 10 and prevented their expulsion by the cryogen when the heat exchange unit 10 was charged. Square steel legs (not shown in FIG. 13) were welded to the 3 inch outer casing 2c to enable the prototype to be self-standing. The heat exchange unit 10 included an insulating blanket 30 of urethane foam as insulation. Duct tape was used to attach the urethane foam insulating blanket 30.

The vertically oriented cryo-thermodynamic valve system of this Example also included a cryogen injector 67. A ⅜ inch copper plumbing fitting was welded onto non-finned steel tube $2a_{bottom}$ as injector 67. The injector 67 was attached to the supply module 75 via insulated ⅜ inch copper tubing and a modulating valve 72 that regulated the flow of cryogen liquid from the outlet 76 of supply module 75. A 180 liter Dewar of liquid argon (Air Products and Chemicals, Inc., Chicago, Ill., USA) served as the cryogen supply module 75. The modulating valve 72 was connected to an inlet port 63 to provide cryogen to injector 67.

One inch steel fittings were used to attach insulated flexible 1 inch hose 92 to supply crude oil 70 from a plastic reservoir 95 to a pump module 40 and a pressure gauge 82 to the bottom of conduit 2. The crude oil 70 was skim oil separated from produced water at a saltwater disposal facility. Ten gallons of the skim oil was used and added to reservoir 95. A 1 hp centrifugal electric pump (W. W. Grainger, Inc., Lake Forest, Ill., USA, item number 4UA65) was used as the pump module 40. The pressure gauge 82 was a 2½", fluid filled, stainless steel pressure gauge (W. W. Grainger, Inc., Lake Forest, Ill., USA, item number 4CFH7).

One inch steel fittings were used to attach insulated flexible 1 inch hose 91 to the top of conduit 2 to return crude oil 70 from the heat exchange unit 10 back to reservoir 95. The temperature of the crude oil in the reservoir and/or returning from the heat exchange unit was monitored by one or more thermal monitoring devices 15 (Extech IR thermometers, Extech Instruments, Waltham, Mass., USA, model L-1004264, having a temperature range of −50° to 380° C.). Two Flip video minoHD video cameras with tripods (Cisco Systems, Inc., San Jose, Calif., USA) and an Olympus X-560WP video camera with tripod (Olympus America, Inc., Center Valley, Pa., USA) were positioned around the system to create a video record of the testing.

Test Procedure:

The flow of oil 70 from the reservoir 95 was initiated by activating pump 40, and the flow of oil 70 through the system was allowed to stabilize for at least 5 minutes. The temperature of the oil 70 in the reservoir 95 was 35° C. The pressure at pressure gauge 82 was approximately 0 psi (open system). The measured flow rate of pumped oil was 5 gallons in 18 seconds, or 0.28 gallons per second, which is 16.67 gallons per minute, which is equal to about 0.4 barrels per minute or about 570 barrels per day.

Argon refrigerant was introduced into the heat exchange unit 10 by activating the flow of argon from the argon Dewar (refrigerant supply unit 50) by adjusting valve 19 to allow argon to flow into inlet port 12. The initial flow was relatively slow to avoid expulsion of the BBs from the heat exchange unit 10. The flow rate of liquid argon from the Dewar was increased until the heat exchange unit 10 was filled with liquid refrigerant, as indicated by the visible spilling of argon from the top through screen 8 and dripping from the bottom of the heat exchange unit 10. Once the heat exchange unit 10 was filled with liquid argon, the temperature of oil 70 in the reservoir 95 was rechecked, and found to be 38° C.

Argon cryogen was injected into the system by gradually opening modulating valve 72 to initiate flow of argon cryogen through inlet line 63. Flow of argon cryogen was accompanied by rapid audible pulsing sounds. As the ⅜" copper inlet line 63 and injector 67 cooled, ice crystals formed on the outside of copper line and the line and injector turned white. Within a few seconds, the frequency of the audible pulsing slowed and then dramatically stopped, a whistling noise started and oil flow ceased. Modulating valve 72 was closed to stop flow of argon from the Dewar (refrigerant supply unit 50). The argon gas in the system continued to vent from the system through the flexible hose 91 return tubing to the reservoir 95 many seconds after oil ceased to flow. No further oil flow was observed. The pressure at pressure gauge 82 was 20 psi and the pump was making a loud noise as it struggled to pump against the frozen oil. The pump 40 was deactivated, valve 19 on Dewar 50 was closed and the system was allowed to thaw overnight. Produced oil typically is mixed with water. Water freezes at higher temperature than oil. Thus, produced oil is expected to be easier to freeze than the skim oil used in this example.

Example 2

Horizontal Conduit

A cryo-thermodynamic valve system was fabricated and tested on a horizontal conduit. An exemplary embodiment is illustrated schematically in FIGS. 14A and 14B.

Figure 14A:
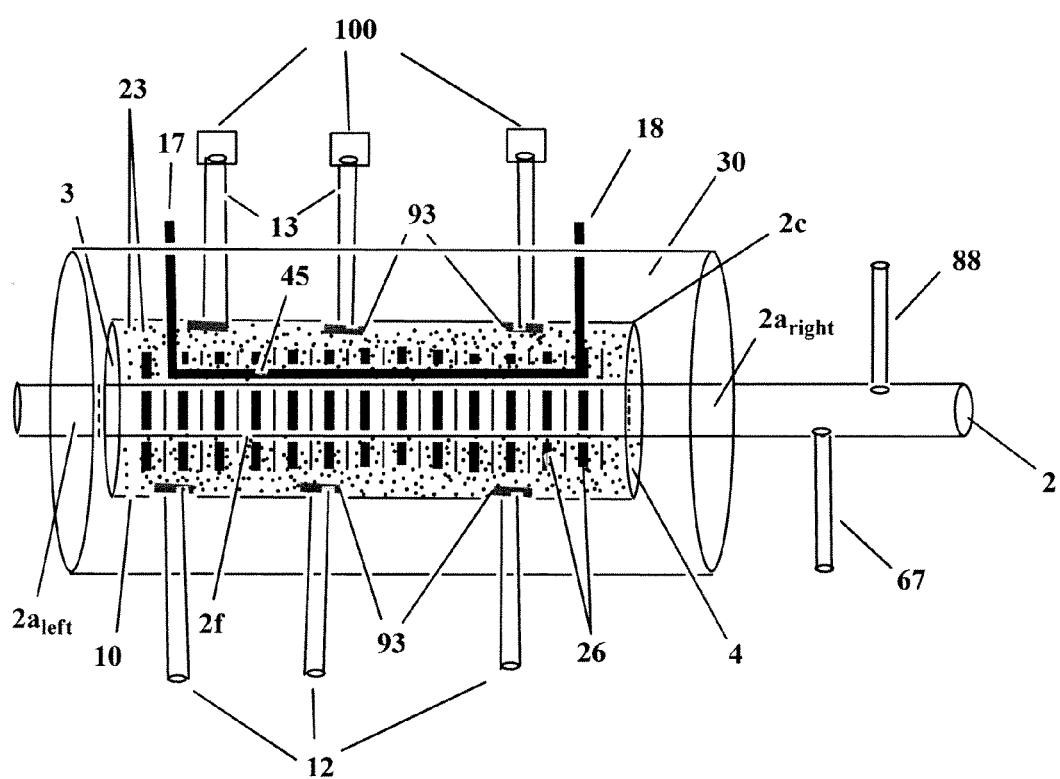
FIGS. 14A and 14B are side views of an example of a horizontal embodiment of a cryo-thermodynamic valve system.

In this horizontally oriented conduit system, the system included a heat exchange unit 10 and a cryogen injector 60, an enlarged view of which is shown in FIG. 14A. In this Example, the heat exchange unit 10 included a conduit 2 which included 6 feet of 304 stainless steel firmed pipe $2f$ (stainless steel firmed tubing, ¾ inch fin height, ¼ inch fin spacing) having an outer diameter of 3 inches (0.120" wall thickness) and a 12 inch segment $2a_{left}$ of non-finned stainless steel tubing at the left end and a 12 inch segment $2a_{right}$ of non-finned stainless steel tubing at the right end of the finned tubing $2f$ to yield an overall length of 8 feet of conduit. The finned pipe $2f$ and a portion of each pipe $2a_{left}$ and $2a_{right}$ were encased in a 5 inch diameter carbon steel pipe $2c$ as an outer casing. A ⅛ inch steel plate 3 having an opening through which a portion of conduit $2a_{left}$ passed was welded at the left of the outer casing $2c$ and around conduit $2a_{left}$ to seal the left side of the heat exchange unit 10. A ⅛ inch steel plate 4 having an opening through which a portion of conduit $2a_{right}$ passed was welded at the right of the outer casing $2c$ and around conduit $2a_{right}$ to seal the right side of the heat exchange unit 10. With plates 3 and 4 welded in place, a sealed tube with a cavity between conduit 2 and casing $2c$ was formed, while allowing conduit $2a_{left}$ and $2a_{right}$ to protrude.

The inner cavity of heat exchange unit 10 between conduit 2 and outer casing $2c$ was filled with thousands of steel pellets 23 (0.177 inch diameter), filling the space between the fins 26 of conduit 2 and between the finned conduit 2 and the outermost 3 inch pipe $2c$. The aluminum screens 93 keeps the steel pellets within the heat exchange unit 10 and prevents their expulsion by the cryogen when the heat exchange unit 10 is charged.

The casing $2c$ was fitted with ½ inch copper plumbing fittings to form input ports 12 into heat exchange unit 10 for delivery of cryogen from the supply units into heat exchange unit 10. In the Experiment, each input port 12 was connected to two Dewars of liquid nitrogen. The inside openings of the input ports 12 within heat exchange unit 10 were fitted with aluminum screens 93. The casing $2c$ also was fitted with ½ inch copper plumbing fittings, which formed output port 13 out of heat exchange unit 10 for venting of cryogen from the heat exchange unit 10. The inside openings of the output ports 13 within heat exchange unit 10 were fitted with aluminum screens 93. Mufflers 100 were attached to the ends of outlet ports 13 to minimize spraying of droplets of cryogen when the unit is activated.

The horizontally oriented cryo-thermodynamic valve system of this Example also included a cryogen injector 67. A ½ inch copper plumbing fitting was welded onto non-finned steel tube $2a_{right}$ as injector 67. The optional auxiliary injector 88 shown in the Figure was not included in the cryo-thermodynamic valve system of this Example. Also shown in FIG. 14A is heating channel 45, which is in thermal communication with finned pipe $2f$ within the heat exchange unit 10. Heating channel input 17 and heating channel outlet 18 provides access to heating channel 45. The heat exchange unit 10 included an insulating blanket 30 of urethane foam as insulation. Duct tape was used to attach the urethane foam insulating blanket 30.

Figure 14B:
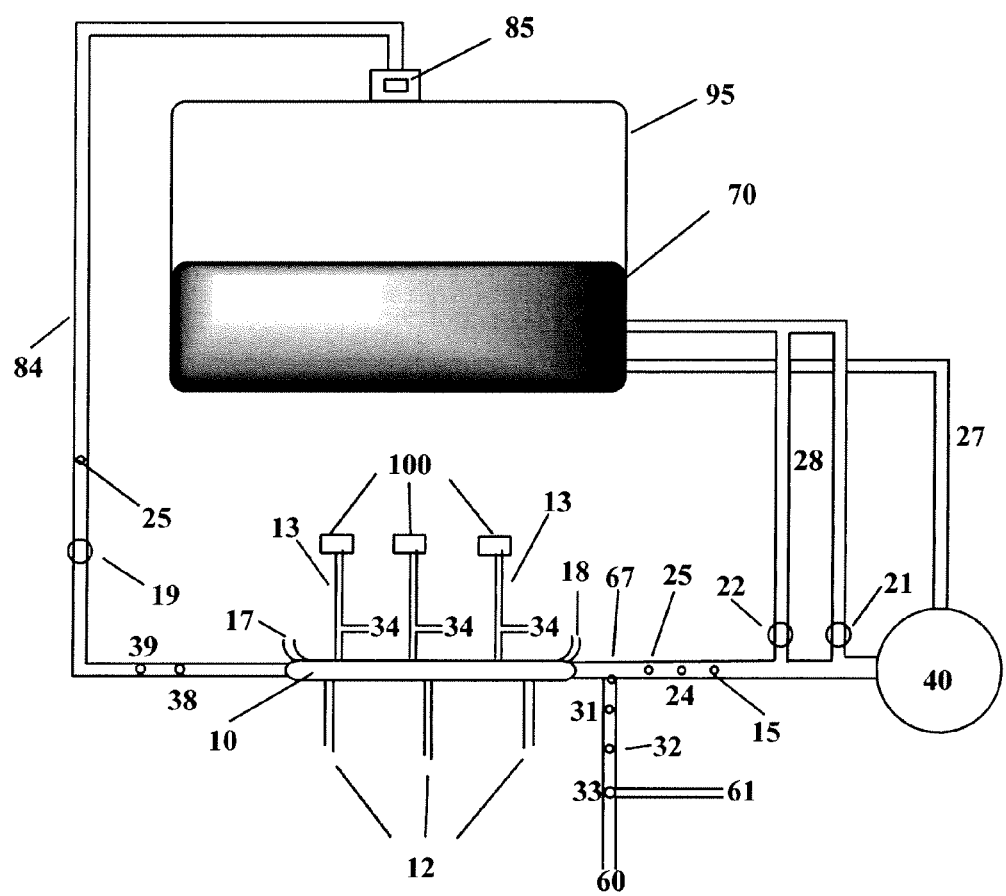

The cryo-thermodynamic valve system in a horizontal configuration is shown in FIG. 14B. As shown in the figure, heat exchange unit 10 was as described in FIG. 14A except that cryogen injector 67 was replaced with cryogen injector module 60, which included a cryogen injector 67, a cryogen diverter valve 33, a cryogen pressure relief valve 32 and a cryogenic check valve 31 in line with the cryogen injector prior to its connection to non-finned steel tube $2a_{right}$. The injector module 60 was upstream of heat exchange unit 10. The injector module 60 was connected to two Dewars of liquid nitrogen (Air Products and Chemicals, Inc., Chicago, Ill., USA), which served as a cryogen supply module. The cryogen outlet ports 13 of this Experiment also included a cryogen full vent 34 from which liquid cryogen can escape when the heat exchange unit 10 is filled with liquid cryogen.

The non-finned steel tube $2a_{right}$ was connected to a 40 hp pump 40, which was located upstream of injector 67. Pump 40 was connected to reservoir 95 via tubing or piping, shown in FIG. 14B as suction line 27. When activated, pump 40 draws fluid 70 from reservoir 95 through suction line 27 and delivers fluid 70 past injector 67 and into heat exchange unit 10. In-line between the injector 67 and pump 40 are optional monitoring devices. In this Experiment, pressure sensor 24 and thermal monitoring device 15 were included upstream of the injector 67, located between injector 67 and pump 40. Also included in the line between pump 40 and injector 67 were a pressure relief valve 21 and a manual by-pass valve 22 and a by-pass circuit 28 for return of fluid 70 to reservoir 95 if necessary. The system of this Example also included a downstream temperature sensor 38, a downstream ultrasonic flow rate sensor 25, and a downstream pressure sensor 39. Primary fluid return line 84 was connected to the exit of the heat exchange unit 10 via a connection to non-finned steel tube $2a_{left}$. The primary fluid return line 84 was connected to an inlet on reservoir 95, which included an observation window 85.

Fluid 70 was skim oil separated from produced water at a saltwater disposal facility. The temperature of the crude oil 70 in the reservoir 95 and/or returning from the heat exchange unit 10 was monitored by one or more thermal monitoring devices 38. Digital video cameras were positioned around the system to videotape the testing.

Test Procedure:

The flow of oil 70 from the reservoir 95 was initiated by activating pump 40, and the flow of oil 70 through the system was allowed to stabilize for at least 5 minutes to reach a target flow rate of 2 barrels per minute. The rate of flow was modulated by adjusting the valves 21 and 22 in combination with valve 19. The temperature of the oil 70 in the reservoir 95 was measured and determined to be 24° C. The rate of flow of fluid 70 was measured and the pump was adjusted to achieve a flow rate of 2.5 feet per second.

Liquid nitrogen cryogen was introduced into the heat exchange unit 10 by activating the flow of liquid nitrogen from the nitrogen Dewar connected to cryogen injector module 60 by adjusting valves on the Dewar to allow liquid nitrogen to flow into inlet port 12 and through manifold 29 into the heat exchange unit 10. The flow rate of liquid nitrogen from the Dewar was increased until the heat exchange unit 10 was filled with liquid refrigerant, as indicated by nitrogen liquid exiting through full vent 34. During this experiment, complete fill of heat exchange unit 10 with liquid nitrogen was not achieved.

Cryogen then was injected into the cryo-thermodynamic valve system by gradually opening a modulating valve on the liquid nitrogen Dewar to initiate flow of liquid nitrogen through cryogen injector module 60. Within about 45 seconds, flow through the heat exchange unit 10 was zero and no flow resumed until after stopping injection of liquid nitrogen through cryogen injector module 60. Liquid downstream and upstream of the plug was removed and the plug was observed visually using a wireless borescope (DeWalt 12-Volt Max Inspection Camera Kit) and tactically (by pressing the borescope against the plug). The plug was firmly attached to the conduit walls.

This experiment was repeated using a blend of liquid nitrogen and liquid argon in the heat exchange unit, which also resulted in formation of a frozen plug in the flowing fluid.

While various embodiments of the subject matter provided herein have been described, it should be understood that they have been presented by way of example only, and not limitation.

Since modifications will be apparent to those of skill in this art, it is intended that this invention be limited only by the scope of the appended claims.

The invention claimed is:

1. A thermal transfer device for modulating thermal energy of a thermally conducting conduit containing a fluid, comprising:
   a cryogen injection device for injecting a cryogen through an injector into the fluid in the conduit; and
   a heat exchange unit through which a fluid refrigerant flows, comprising:
   a first wall having an inner surface and an outer surface, wherein:
      (a) the first wall is a portion of the conduit containing the fluid; or
      (b) when the device is attached to the conduit, the outer surface of the first wall is in thermal contact with the conduit;
   a second wall having an inner surface and an outer surface, wherein the outer surface is oriented toward the environment; and
   a space between the inner surface of the first wall and the inner surface of the second wall;
   wherein:
   the space contains or is filled with filings, turnings, shavings, pellets or beads of a thermally conductive metal, wherein at least a portion of the filings, turnings, shavings, pellets or beads of a thermally conductive metal are in thermal communication with at least a portion of the conduit;
   the fluid refrigerant flows across the surface of the filings, turnings, shavings, pellets or beads of thermally conductive material; and
   the space has a width that is between about 0.05 inches and about 500 inches; or
   the space has a width that is between about 10% and about 500% of the inner diameter of the heat exchange unit.

2. The device of claim 1, further comprising a Peltier device or a magnetic refrigerator or combinations thereof.

3. The device of claim 1, wherein the filings, turnings, shavings, pellets or beads of a thermally conductive metal comprise a material selected from among copper, brass, beryllium, cadmium, cobalt, chrome nickel steel, gold, silver, iridium, iron, lead, magnesium, molybdenum, nickel, platinum, tin, zinc, carbon steel, stainless steel, aluminum and any combination or alloy thereof.

4. The device of claim 1, wherein the heat exchange unit further comprises one or more heating channels that traverse a portion of the length or the full length of the heat exchange unit, wherein:
   the heating channels are configured to contain a fluid; or
   the heating channels are configured to comprise one or more heating units.

5. The device of claim 4, wherein the heating unit is selected from among a Curie temperature heater, a temperature limited heater, a conductor-in-conduit heat source, a heater strip, a resistive heating strip, a Positive Thermal Coefficient ceramic heater, a thick film ceramic heater, a resistance wire or a resistance ribbon heating device.

6. A system for extracting thermal energy from a conduit containing a fluid, comprising:
   a thermal transfer device of claim 1; and
   a control system adapted to adjust the heat extraction from the conduit by the thermal transfer device in response to a targeted temperature within the conduit.

7. The system of claim 6, further comprising:
   an intake circuit coupled to a liquid refrigerant supply module and adapted for providing a flow of refrigerant liquid to the heat exchange unit; and
   an exhaust circuit including a vent tube adapted to vent the liquid refrigerant from the system.

8. The system of claim 6, wherein the refrigerant comprises a cryogen, a liquid solvent or combinations thereof.

9. The system of claim 8, wherein the cryogen comprises liquid nitrogen, liquid oxygen, liquid helium, liquid neon, liquid methane, liquid natural gas, liquid argon, liquid nitrous oxide, liquid carbon dioxide or solid carbon dioxide or combinations thereof.

10. The system of claim 8, wherein the solvent comprises carbon tetrachloride, m-dichlorobenzene, nitromethane, bromobenzene, acetonitrile, chlorobenzene, m-xylene, n-butyl amine, n-octane, chloroform, t-butyl amine, trichloroethylene, butyl acetate, ethyl acetate, heptane, cyclopentane, hexane, methanol, cyclohexane, isooctane, acetaldehyde, methyl cyclohexane, m-pentane, 1,5-hexadiene, isopentane, 3-heptanone, cyclohexanone, diethyl carbitol, carbitol acetate, ethanol, acetone, isopropanol, ethyl methyl ketone, diethyl ether and combinations thereof.

11. The system of claim 6, further comprising a thermal isolation means for thermally isolating the thermal exchange unit, the underlying conduit and at least a portion of the conduit on one or both sides of a point of attachment of the thermal exchange unit from the environment.

12. The system of claim 11, wherein the thermal isolation means comprises a thermally insulating layer or coating that comprises bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, a non-thermally conducting gas that has a lower thermal conductivity than air selected from among butane, krypton, trichloromethane, xenon, 1,1,2-trichloro-trifluoroethane, 1,2-dichloro-tetrafluoroethane, tetrafluoroethane, argon, carbon dioxide, diethyl ether, isobutane, pentane, perfluoro-cyclobutane, propane and tetrafluoromethane, CFC-11, HCFC-141b, methanol, ethanol, glycerol, ether, acetone, ethylene glycol, a thermally non-conducting silicone fluid containing glass fibers or glass beads, or propylene glycol, or combinations thereof.

13. The system of claim 6, further comprising:
one or more than one heating element; or
one or more than one thermal monitoring devices; or
a pump for pumping refrigerant through the system; or
one or more flow-control metering valves; or
any combination of a heating element, thermal monitoring device, pump, flow-control metering valve and computer module.

14. The system of claim 7, wherein the refrigerant supply module comprises:
a source of cryogen; or
a combination, comprising:
  a source of cryogen;
  a source of one or more solvents;
  a mixing device to mix the cryogen with one or more solvents; and
  a computer module;
    wherein the computer module is in communication with the cryogen source, solvent source and mixing device and varies the proportion and type of solvent mixed with the cryogen.

15. The system of claim 6, wherein the thermal transfer device further comprises:
a Peltier module with a cold side and a hot side;
a system for supplying electrical energy to the Peltier module;
a cooling head thermally coupled to the cold side of the Peltier module, wherein the cooling head has a concave curved surface;
a heat dissipation element thermally coupled to the hot side of the Peltier module; and
a reservoir for a thermally conductive liquid thermally coupled to the heat dissipation element.

16. A method of freezing or chilling a fluid within a thermally conductive conduit, comprising:
activating a thermal transfer device of claim 1 attached to the conduit to inject cryogen into the fluid and to extract thermal energy from the conduit and the fluid contained therein, wherein:
the injection of cryogen into the fluid reduces the temperature of the fluid before it comes into contact with the area of the conduit to which the thermal transfer device is attached, and
the thermal transfer device extracts sufficient thermal energy from the fluid that the fluid freezes and forms a plug of frozen fluid that reversibly attaches to the side walls of the conduit.

17. The method of claim 16, wherein the activation step comprises introducing cryogen or a refrigerant into the thermal transfer device, wherein the heat is extracted from the conduit and the fluid therein by flowing the refrigerant or cryogen through the heat exchange unit to produce a warmed refrigerant or cryogen and removing the warmed refrigerant or cryogen from the heat exchange unit.

18. The method of claim 17, wherein the cryogen is selected from among liquid nitrogen, liquid oxygen, liquid helium, liquid neon, liquid argon, liquid nitrous oxide, liquid carbon dioxide and solid carbon dioxide and combinations thereof.

19. A system for cooling or freezing a fluid within a thermally conducting conduit, comprising:
a thermal transfer device of claim 1 thermally coupled to the conduit, wherein the thermal transfer device receives cooled liquid refrigerant and generates heated liquid refrigerant by transfer of heat from the conduit and fluid therein to the liquid refrigerant;
a cryogen supply module for supplying cryogen to the cryogen injection device of the thermal transfer device;
a liquid refrigerant supply module;
a liquid refrigerant pathway for delivery of the liquid refrigerant from the liquid refrigerant supply module to the heat exchange unit of the thermal transfer device;
a venting pathway for delivery of the liquid refrigerant from the heat exchange unit to an output vent; and
a forced circulation means disposed between the heat exchange unit and the liquid refrigerant supply module forcing transportation of cooled liquid refrigerant from the liquid refrigerant supply module to the heat transfer units and of heated liquid coolant from the heat exchange units to the venting pathway;
wherein:
the circulation means produces a pressure and a flow rate; and
the pressure and flow rate of the liquid refrigerant can be modulated to provide flow through the heat exchange unit.

20. A thermal transfer device for modulating thermal energy of a thermally conducting conduit containing a fluid, comprising:
a cryogen injection device for injecting a cryogen through an injector into the fluid in the conduit;
an auxiliary injection device for injecting a surfactant or bridging fluid or a combination thereof through an injector into the fluid in the conduit; and
a heat exchange unit through which a fluid refrigerant flows, comprising:
  a thermal transfer surface; and
  particles of a thermally conductive material;
wherein:
when the thermal transfer device is attached to the conduit, the thermal transfer surface is in thermal communication with the conduit and at least a portion of the particles are in thermal communication with the thermal transfer surface; and
the fluid refrigerant flows across the surface of the particles of thermally conductive material and the thermal transfer surface of the heat exchange unit.

21. The device of claim 20, wherein the heat exchange unit further comprises:
a first wall having an inner surface and an outer surface, wherein the outer surface is in thermal contact with the conduit;
a second wall having an inner surface and an outer surface, wherein the outer surface is oriented toward the environment; and
a space between the inner surface of the first wall and the inner surface of the second wall, wherein:
the space has a width that is between about 0.05 inches and about 500 inches; or
the space has a width that is between about 10% and about 500% of the inner diameter of the heat exchange unit.

22. The device of claim 20, wherein the thermal transfer surface or the particles or both comprise a thermally conductive material selected from among copper, brass, beryllium, cadmium, cobalt, chrome nickel steel, gold, silver, iridium, iron, lead, magnesium, molybdenum, nickel, platinum, tin, zinc, carbon steel, stainless steel, aluminum and any combination or alloy thereof.

23. A system for extracting thermal energy from a conduit containing a fluid, comprising:
a thermal transfer device of claim 20;
a cryogen supply module; and
a control system to adjust the flow of a cryogen from the supply module to the thermal transfer device or the flow of cryogen through the injector or both.

24. The system of claim 23, further comprising:
one or more than one heating element; or
one or more than one thermal monitoring device; or
a pump for pumping refrigerant through the system; or
one or more flow-control metering valves; or
a computer module; or
any combination of a heating element, thermal monitoring device, pump, flow-control metering valve and computer module.

25. A method of freezing or chilling a fluid within a thermally conductive conduit, comprising:
activating a thermal transfer device of claim 20 attached to the conduit to inject cryogen into the fluid and to extract thermal energy from the conduit and the fluid contained therein, wherein:
the injection of cryogen into the fluid reduces the temperature of the fluid before it comes into contact with the area of the conduit to which the thermal transfer device is attached, and
the thermal transfer device extracts sufficient thermal energy from the fluid that the fluid freezes and forms a plug of frozen fluid that reversibly attaches to the side walls of the conduit.

26. A thermal transfer device for modulating thermal energy of a thermally conducting conduit containing a fluid, comprising:
a cryogen injection device for injecting a cryogen through an injector into the fluid in the conduit; and
a heat exchange unit through which a fluid refrigerant flows, comprising:
a thermal transfer surface; and
particles of a thermally conductive material;
wherein:
when the thermal transfer device is attached to the conduit, the thermal transfer surface is in thermal communication with the conduit and at least a portion of the particles are in thermal communication with the thermal transfer surface;
the fluid refrigerant flows across the surface of the particles of thermally conductive material and the thermal transfer surface of the heat exchange unit; and
the heat exchange unit comprises:
an end plate 3 and an end plate 4;
an inlet port 12 for introducing cryogen or refrigerant into the heat exchange device;
an outlet port 13 for venting cryogen or refrigerant from the heat exchange device;
an outer conduit 2c having diameter Dc2; and
an inner conduit 2 having diameter D2, wherein the inner conduit 2 comprises:
a pipe 2f;
a pipe $2a_{left}$ at the left distal end of pipe 2f and a pipe $2a_{right}$ at the right distal end of the pipe 2f;
the end plate 3 has an opening through which a portion of pipe $2a_{left}$ passes;
the end plate 4 has an opening through which a portion of pipe $2a_{right}$ passes;
the end plate 3 is attached one distal end of the outer conduit 2c and around conduit $2a_{left}$;
the end plate 4 is attached at the other distal end of the outer conduit 2c and around pipe $2a_{right}$;
the inner conduit 2 and the outer conduit 2c form a cavity having a width of approximately Dc2 minus D2 minus the thickness of D2 minus the thickness of Dc2;
the cavity between the inner conduit 2 and the outer conduit 2c is filled with particles, filings, turnings, shavings, pellets or beads of a thermally conductive metal; and
the pipe 2f is in thermal communication with one or more of the particles, filings, turnings, shavings, pellets or beads of the thermally conductive metal.

27. The device of claim 26, wherein pipe 2f comprises thermally conducting fins to form a finned pipe 2f.

28. The device of claim 26, further comprising one or more heating channels that traverse a portion of the length or the full length of the heat exchange unit and that are in thermal communication with the inner conduit 2, wherein:
the heating channels are configured to contain a fluid; or
the heating channels are configured to comprise one or more than one heating unit.

29. The device of claim 28, wherein the heating unit is selected from among a Curie temperature heater, a temperature limited heater, a conductor-in-conduit heat source, a heater strip, a resistive heating strip, a Positive Thermal Coefficient ceramic heater, a thick film ceramic heater, a resistance wire and a resistance ribbon heating device.

30. The device of claim 26, wherein the inlet port 12 comprises an input manifold attached to 2 or more openings in the heat exchange unit to distribute the cryogen or refrigerant to two or more injection sites in the heat exchange unit.

31. The device of claim 30, wherein:
the input manifold distributes the cryogen or refrigerant to two or more injection sites radially located in the heat exchange unit; or
the input manifold distributes the cryogen or refrigerant to two or more injection sites longitudinally located in the heat exchange unit; or
the input manifold distributes the cryogen or refrigerant to two or more injection sites longitudinally located in the heat exchange unit and to two or more injection sites axially located in the heat exchange unit.

32. The device of claim 26, wherein the outlet port 13 comprises a vent manifold that vents the cryogen or refrigerant from the heat exchange unit at two or more vent sites in the heat exchange unit.

33. The device of claim 26, further comprising one or more baffles that modulate the flow of cryogen or refrigerant within the heat exchange unit.

34. The device of claim 27, wherein the finned pipe 2f comprises:
fins disposed radially along the pipe; or
fins disposed longitudinally along the pipe; or
fins disposed radially and longitudinally along the pipe, wherein:
the fins are configured to have the same length; or
the fins are configured to have two or more different lengths.

35. The device of claim 27, wherein the fins of finned pipe 2f are notched or perforated or both.

36. The device of claim 27, wherein two or more of the fins of finned pipe 2f extend the width or length of the cavity within the heat exchange unit, thereby creating one or more channels.

37. The device of claim 36, wherein multiple channels are formed by the fins of finned pipe 2f.

38. The device of claim 37, wherein the channels are adjacent to each other or are staggered around the radius of the inner conduit 2 or about the length of inner conduit 2.

39. The device of claim 38, wherein cryogen injectors are attached to the heat exchange unit to inject cryogen into the channels formed by the fins of finned pipe 2f.

40. The device of claim 26, wherein the thermal transfer surface or the particles or both comprise a thermally conductive material selected from among copper, brass, beryllium, cadmium, cobalt, chrome nickel steel, gold, silver, iridium, iron, lead, magnesium, molybdenum, nickel, platinum, tin, zinc, carbon steel, stainless steel, aluminum and any combination or alloy thereof.

41. A system for extracting thermal energy from a conduit containing a fluid, comprising:
- a thermal transfer device of claim 26;
- a cryogen supply module; and
- a control system to adjust the flow of a cryogen from the supply module to the thermal transfer device or the flow of cryogen through the injector or both.

42. The system of claim 41 further comprising:
- one or more than one heating element; or
- one or more than one thermal monitoring device; or
- a pump for pumping refrigerant through the system; or
- one or more flow-control metering valves; or
- a computer module; or
- any combination of a heating element, thermal monitoring device, pump, flow-control metering valve and computer module.

43. A method of freezing or chilling a fluid within a thermally conductive conduit, comprising: activating a thermal transfer device of claim 26 attached to the conduit to inject cryogen into the fluid and to extract thermal energy from the conduit and the fluid contained therein, wherein:
- the injection of cryogen into the fluid reduces the temperature of the fluid before it comes into contact with the area of the conduit to which the thermal transfer device is attached, and
- the thermal transfer device extracts sufficient thermal energy from the fluid that the fluid freezes and forms a plug of frozen fluid that reversibly attaches to the side walls of the conduit.

* * * * *

UNITED STATES PATENT AND TRADEMARK OFFICE
CERTIFICATE OF CORRECTION

PATENT NO.         : 8,763,411 B2
APPLICATION NO.    : 13/161411
DATED              : July 1, 2014
INVENTOR(S)        : Wray et al.

It is certified that error appears in the above-identified patent and that said Letters Patent is hereby corrected as shown below:

IN THE TITLE PAGES:

In Item (56) References Cited, at page 2, column 1, between lines 75 and 76, please add "5,778,919 A   7/1998           Petrone .................. 62/3.1."

IN THE SPECIFICATION:

At column 5, line 24, please replace "to for in a liquid" with —to form a liquid—;

At column 5, lines 41-42, please replace "between thermal transfer device" with —between the thermal transfer device—;

At column 6, line 27, please replace "from thermal exchange unit" with —from the thermal exchange unit—;

At column 12, line 8, please replace "are foamed" with —are formed—;

At column 14, line 50, please replace "a thermal transfer device of claim 10" with —a thermal transfer device—;

At column 15, line 18, please replace "a thermal exchange unit of claim 10" with —a thermal exchange unit—;

At column 16, line 44, please replace "interne" with —internet—;

At column 21, line 66, please replace "zone of thermal transfer device" with —zone of the thermal transfer device—;

At column 28, line 20, please replace "In some embodiment" with —In some embodiments—;

At column 28, line 44, please replace "thermal plug" with —the thermal plug—;

At column 29, line 4, please replace "permits ae controlled" with —permits controlled—;

At column 31, line 20, please replace "then sally" with —thermally—;

Signed and Sealed this
Twentieth Day of January, 2015

Michelle K. Lee
*Deputy Director of the United States Patent and Trademark Office*

CERTIFICATE OF CORRECTION (continued)

At column 38, lines 12-13, please replace "discharge vent tube 36" with —discharge vent tube 35—;

At column 44, line 26, please replace "thermal energy transfer system" with —the thermal energy transfer system—;

At column 48, line 65 to column 49, line 12, please replace "Polyquarternium-4, Polyquaternium-6, Polyquaternium-7, Polyquaternium-10, Polyquarternium-11, Polyquartemium-16, Polyquaternium-22, Polyquarternium-24, Polyquarternium-28, Polyquaternium-29, Polyquarternium-32, Polyquarternium-33, Polyquarternium-35, Polyquarternium-37, Polyquarternium-39, Polyquaternium-44, Polyquaternium-46, Polyquarternium-47, Polyquarternium-52, Polyquarternium-53, Polyquarternium-55, Polyquarternium-59, Polyquarternium-61, Polyquaternium-64, Polyquaternium-65, Polyquaternium-67, Polyquarternium-69, Polyquaternium-70, Polyquarternium-71, Polyquarternium-72, Polyquarternium-73, Polyquaternium-74, Polyquarternium-76, Polyquaternium-77, Polyquaternium-78, Polyquaternium-79, Polyquaternium-80, Polyquarternium-81, Polyquaternium-82, Polyquaternium-84, Polyquaternium-85, Polyquaternium-87" with —Polyquaternium-4, Polyquaternium-6, Polyquaternium-7, Polyquaternium-10, Polyquaternium-11, Polyquaternium-16, Polyquaternium-22, Polyquaternium-24, Polyquaternium-28, Polyquaternium-29, Polyquaternium-32, Polyquaternium-33, Polyquaternium-35, Polyquaternium-37, Polyquaternium-39, Polyquaternium-44, Polyquaternium-46, Polyquaternium-47, Polyquaternium-52, Polyquaternium-53, Polyquaternium-55, Polyquaternium-59, Polyquaternium-61, Polyquaternium-64, Polyquaternium-65, Polyquaternium-67, Polyquaternium-69, Polyquaternium-70, Polyquaternium-71, Polyquaternium-72, Polyquaternium-73, Polyquaternium-74, Polyquaternium-76, Polyquaternium-77, Polyquaternium-78, Polyquaternium-79, Polyquaternium-80, Polyquaternium-81, Polyquaternium-82, Polyquaternium-84, Polyquaternium-85, Polyquaternium-87—;

At column 62, line 20, please replace "In some embodiment" with —In some embodiments—;

At column 66, line 45, please replace "conduit 70" with —fluid 70—;

At column 70, line 67 to column 71, line 1, please replace "-20° C. to -90° C., -30° C. to -120° C." with — -20° C. to -90° C., or -30° C. to -120° C.—;

At column 71, line 36, please replace "thermal transfer unit" with —the thermal transfer unit—;

At column 71, line 41, please replace "thermal transfer device" with —the thermal transfer device—;

At column 71, lines 43-44, please replace "thermal transfer device" with —the thermal transfer device—;

At column 77, line 59, please replace "thermal exchange unit" with —the thermal exchange unit—;

At column 80, lines 8-9, please replace "the heat exchange unit cryogen injector" with —the cryogen injector—;

At column 81, line 8, please replace "the heat exchange unit cryogen injector" with —the cryogen injector—;

At column 81, line 30, please replace "firmed pipe" with —finned pipe—;

At column 83, line 27, please replace "firmed pipe" with —finned pipe—;

At column 83, line 28, please replace "firmed tubing" with —finned tubing—.